United States Patent
Kanaoka et al.

(10) Patent No.: US 7,727,654 B2
(45) Date of Patent: Jun. 1, 2010

(54) MEMBRANE-ELECTRODE ASSEMBLY FOR SOLID POLYMER ELECTROLYTE FUEL CELL AND METHOD OF PRODUCING THE SAME

(75) Inventors: Nagayuki Kanaoka, Saitama (JP); Masaru Iguchi, Saitama (JP); Hiroshi Sohma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 914 days.

(21) Appl. No.: 11/445,371

(22) Filed: Jun. 2, 2006

(65) Prior Publication Data

US 2006/0280987 A1    Dec. 14, 2006

(30) Foreign Application Priority Data

Jun. 8, 2005    (JP)    ............................. 2005-167744

(51) Int. Cl.
*H01M 8/10* (2006.01)

(52) U.S. Cl. .................. 429/33; 502/101; 427/115; 521/27

(58) Field of Classification Search .................. 429/33; 502/101; 427/115; 521/27
See application file for complete search history.

(56) References Cited

U.S. PATENT DOCUMENTS 5,403,675 A    4/1995    Ogata et al.

FOREIGN PATENT DOCUMENTS

| JP | H07-220741 A | 8/1995 |
|---|---|---|
| JP | 2001-342241 A | 12/2001 |
| JP | 2002-293889 A | 10/2002 |
| JP | 2002-298855 A | 10/2002 |
| JP | 2004-137444 A | 5/2004 |
| JP | 2004-244517 A | 9/2004 |
| JP | 2004-345667 A | 12/2004 |
| JP | 2004-346163 A | 12/2004 |
| JP | 2004-346164 A | 12/2004 |
| JP | 2005-036125 A | 2/2005 |
| JP | 2005-060625 A | 3/2005 |
| JP | 2005-116517 A | 4/2005 |
| JP | 2005-135652 A | 5/2005 |

OTHER PUBLICATIONS

Takeshi Kobayashi et al, "*Preparation of Thermally Stable Proton Conducting Polymer*", 1993, pp. 2490-2492, vol. 42, No. 7, Polymer Preprints, Japan.

Takeshi Kobayashi et al, "*Preparation of Thermally Stable Proton Conducting Polymer*", 1994, p. 736, vol. 43, No. 3, Polymer Preprints, Japan.

Takeshi Kobayashi et al, "*Preparation of Thermally Stable Proton Conducting Polymer*", 1993, p. 730, vol. 42, No. 3, Polymer Preprints, Japan.

*Primary Examiner*—Jane Rhee
(74) *Attorney, Agent, or Firm*—Arent Fox LLP

(57) ABSTRACT

Membrane-electrode assemblies are provided having a solid polymer electrolyte membrane that exhibits higher proton conductivity over a wide temperature range, and exhibits superior hot water resistance, chemical stability, toughness and mechanical strength. The membrane-electrode assemblies utilized for solid polymer electrolyte fuel cells include an anode electrode, a cathode electrode and a solid polymer electrolyte membrane, the anode electrode and the cathode electrode disposed on opposite sides of the solid polymer electrolyte membrane. The solid polymer electrolyte membrane contains a polyarylene copolymer with a specific constitutional unit having a fluorine atom and nitrile group introduced in their principal chains.

8 Claims, No Drawings

MEMBRANE-ELECTRODE ASSEMBLY FOR SOLID POLYMER ELECTROLYTE FUEL CELL AND METHOD OF PRODUCING THE SAME

This application is based on and claims the benefit of priority from Japanese Patent Application No. 2005-167744, filed on 8 Jun. 2005, the content of which is incorporated herein by reference.

BACKGROUND OF THE INVENTION

1. Field of the Invention

The present invention relates to membrane-electrode assemblies, which are utilized for solid polymer electrolyte fuel cells, which may provide the fuel cells with higher power-generating performance due to superior proton conductivity, and which include solid polymer electrolyte membranes having superior toughness and hot-water resistance.

2. Related Art

The solid polymer electrolyte membranes of the membrane-electrode assemblies for fuel cells are generally classified into inorganic and organic types.

The inorganic type is typically exemplified by those containing uranyl phosphate hydrate; however, proton-conductive materials formed of such inorganic compounds typically exhibit poor workability; that is, when electrode layers are being connected, the adhesiveness is often insufficient at the interfaces between the electrode layers and the proton-conductive materials, thus resulting in lower power generating performance due to insufficient proton conductivity at the interfaces.

On the other hand, examples of the organic type include so-called cationic exchange polymers, sulfonated vinyl polymers such as polystyrene sulfonic acid, perfluoroalkyl sulfonic acid polymers such as Nafion (product name, by DuPont), perfluoroalkyl carboxylic acid polymers, and organic polymers of such heat resistant polymers as polybenzimidazoles and polyetheretherketone having sulfonic or phosphoric group introduced therein (see Non-patent Documents 1 to 3 described below).

These organic polymers are typically utilized in the form of a film of a solid polymer electrolyte membrane. In contrast to inorganic materials, the organic polymers may be advantageously processed such that a conductive membrane can be connected onto an electrode because organic polymers are soluble in solvents and are thermoplastic.

Furthermore, Patent Document 1 proposes a solid polymer electrolyte membrane formed of a rigid sulfonated polyphenylene, which is based on a polymer produced by polymerizing an aromatic compound having a phenylene chain and introducing a sulfonic acid group through a reaction with a sulfonating agent.

Non-patent Document 1: Polymer Preprints, Japan, Vol. 42, No. 7, pp. 2490-2492(1993)
Non-patent Document 2: Polymer Preprints, Japan, Vol. 43, No. 3, pp. 736 (1994)
Non-patent Document 3: Polymer Preprints, Japan, Vol. 42, No. 3, pp. 730 (1993)
Patent Document 1: U.S. Pat. No. 5,403,675

However, most of these organic polymers suffer from such problems as insufficient proton conductivity, insufficient durability, decrease of proton conductivity at higher temperatures, e.g., no less than 100 degrees C., significant decrease of mechanical properties, e.g., elastic modulus in particular, significant fluctuation of proton conductivity under various humidity conditions, unsatisfactory adhesion with electrodes, and decrease of strength or disintegration of assemblies induced from excessive swelling due to hydroscopic polymer structures. As such, there exist a variety of problems in the organic polymers, described in the Non-patent Documents for example, for applying to solid polymer electrolyte membranes.

In addition, the organic polymers described in Patent Document 1 described above may provide higher proton conductivity when the additional amount of sulfonic acid group is increased; however, there simultaneously arise problems in that mechanical properties of sulfonated polymers, for example, breaking elongation, folding resistance and toughness, and also hot water resistance, are remarkably impaired.

Accordingly, an object of the present invention is to provide membrane-electrode assemblies (hereinafter referred to sometimes as "MEA") for solid polymer electrolyte fuel cells that may display superior proton-conductive power generating performance and also exhibit excellent toughness and hot water resistance.

SUMMARY OF THE INVENTION

As a result of vigorous efforts to achieve the objects, we have found that MEAs with superior hot water resistance may be prepared by an aromatic unit having a fluorene skeleton being employed as the polymer that constitutes the solid polymer electrolyte membrane, and also a polymer unit, containing a sulfonic acid group and forming a phenylene bond, being combined with the polymer depending on the requirements. Specifically, the present invention provides membrane-electrode assemblies for solid polymer electrolyte fuel cells as follows.

According to a first aspect of the present invention, a membrane-electrode assembly utilized for solid polymer electrolyte fuel cells, includes: an anode electrode; a cathode electrode; and a solid polymer electrolyte membrane, the anode electrode and the cathode electrode disposed on opposite sides of the solid polymer electrolyte membrane, wherein the solid polymer electrolyte membrane contains an aromatic polymer which includes a constitutional unit expressed by formula (1) below, a constitutional unit expressed by formula (2-1) or (2-2) below and a constitutional unit expressed by formula (3) below;

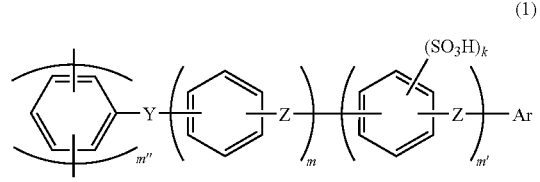

(1)

in the formula (1), Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—; Z represents independently a single bond, or at least a group selected from the group consisting of —O—, —S—, —(CH$_2$)$_j$— (j is an integer of 1 to 10) and —C(CH$_3$)$_2$—; Ar represents an aromatic group having a substituent expressed by —SO$_3$H, —O—(CR$_2$)$_e$SO$_3$H or —S—(CR$_2$)$_e$SO$_3$H, in which R is an atom or a group selected from the group consisting of a hydrogen atom, fluorine atom, alkyl group and partly or fully halogenated alkyl group; e is an integer of 1 to 20; m is an integer of 0 to 10; m' is an integer of 0 to 10; m" is an integer of 1 to 100; and k is an integer of 1 to 4;

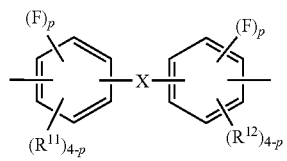
(2-1)

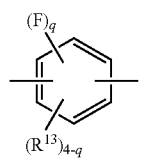
(2-2)

in the formulas (2-1) and (2-2), X represents a divalent group or a single bond; R$^{11}$ to R$^{13}$ represent independently of each other a hydrogen atom or alkyl group; p is an integer of 1 to 4; and q is an integer of 1 to 4;

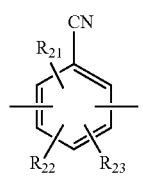
(3)

in the formula (3), R$^{21}$ to R$^{23}$ represent independently of each other at least an atom or a group selected from the group consisting of a hydrogen atom, fluorine atom, alkyl group, partly or fully halogenated alkyl group, allyl group, aryl group and nitrile group.

According to a second aspect of the present invention, in the membrane-electrode assembly utilized for solid polymer electrolyte fuel cells, the aromatic polymer further includes a constitutional unit expressed by formula (4-1) or (4-2) below;

(4-1)

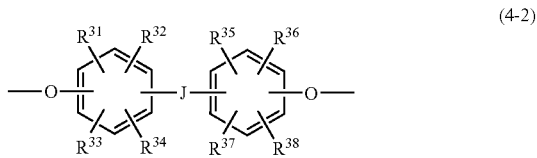
(4-2)

in the formulas (4-1) and (4-2), R$^{31}$ to R$^{38}$ represent independently of each other at least an atom or a group selected from the group consisting of a hydrogen atom, fluorine atom, alkyl group, partly or fully halogenated alkyl group, allyl group and aryl group; J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

According to a third aspect of the present invention, in the membrane-electrode assembly utilized for solid polymer electrolyte fuel cells, the aromatic polymer includes 30 to 70 mole % of a constitutional unit expressed by the formula (1), 10 to 30 mole % of a constitutional unit expressed by the formula (2-1) or (2-2) and 5 to 30 mole % of a constitutional unit expressed by the formula (3).

According to a fourth aspect of the present invention, in the membrane-electrode assembly utilized for solid polymer electrolyte fuel cells, the solid polymer electrode membrane contains 0.5 to 3.0 meq/g of sulfonic acid group.

According to a fifth aspect of the present invention, in the membrane-electrode assembly utilized for solid polymer electrolyte fuel cells, the solid polymer electrode membrane contains 6 mass % or more of fluorine atom.

According to a sixth aspect of the present invention, a method of producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, includes the steps of: reacting a compound expressed by formula (5-1) or (5-2), a compound expressed by formula (6-1) or (6-2), a compound expressed by formula (7), and a compound expressed by formula (8-1) or (8-2) to prepare an aromatic polymer; forming the solid polymer electrolyte membrane by use of the aromatic polymer; and forming an anode electrode and a cathode electrode on the solid polymer electrolyte membrane;

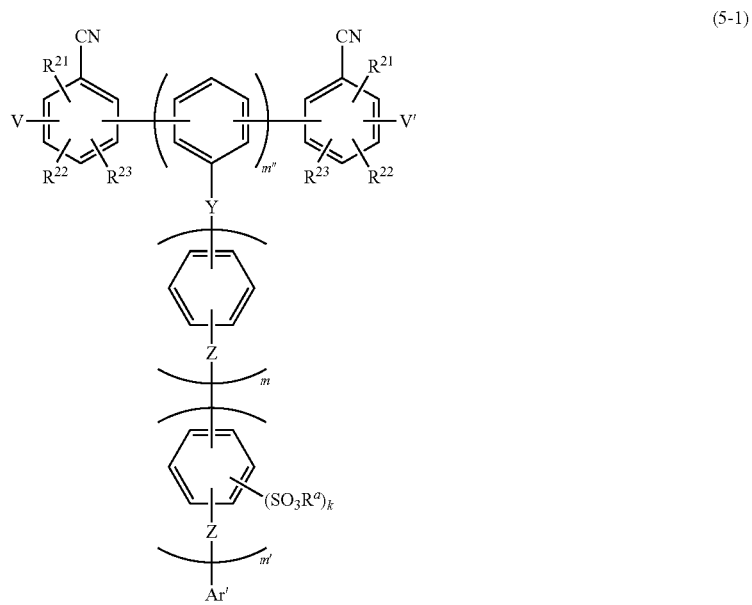

(5-1)

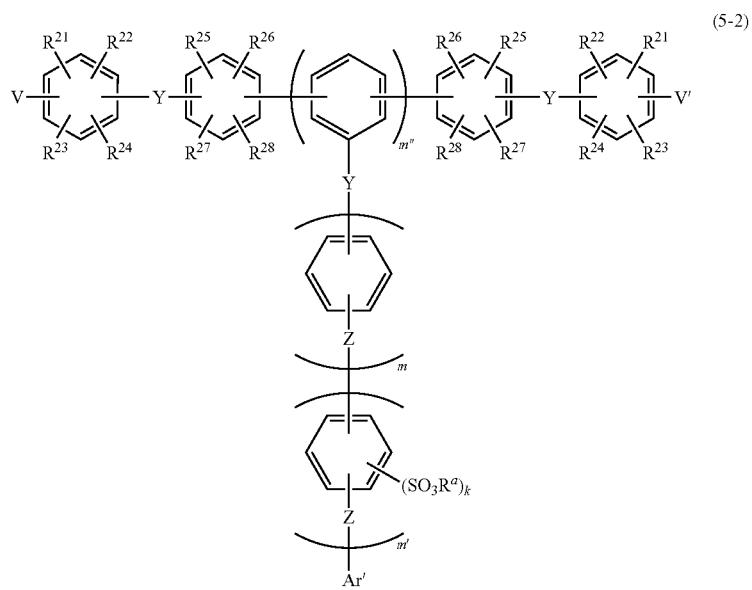

(5-2)

in the formulas (5-1) and (5-2), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group; Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—; Z represents independently a single bond, or at least a group selected from the group consisting of —O—, —S—, —(CH$_2$)$_j$— (j is an integer of 1 to 10) and —C(CH$_3$)$_2$—; m is an integer of 0 to 10; m' is an integer of 0 to 10; m" is an integer of 1 to 100; and k is an integer of 1 to 4; $R^a$ represents a hydrocarbon group having carbon atoms of 1 to 20, a hydrogen atom or alkaline metal atom; Ar' represents an aromatic group having a substituent expressed by —SO$_3$R$^b$, —O—(CR$_2$)$_e$SO$_3$R$^b$ or —S—(CR$_2$)$_e$SO$_3$R$^b$, in which R$^b$ represents a hydrocarbon group having carbon atoms of 1 to 20, a hydrogen atom or alkaline atom, and R represents an atom or a group selected independently from the group consisting of a hydrogen atom, fluorine atom, alkyl group, and partly or fully halogenated alkyl group; e is an integer of 1 to 20; and V and V' represent independently of each other fluorine or chlorine atom;

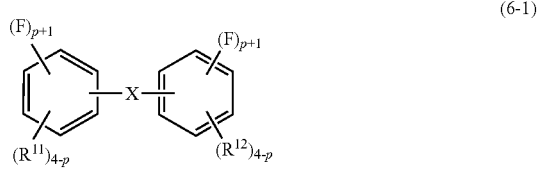

(6-1)

-continued (6-2)

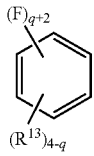

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

(7)

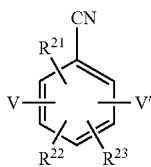

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other fluorine or chlorine atom;

(8-1)

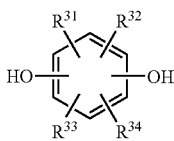

(8-2)

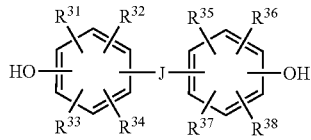

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

According to a seventh aspect of the present invention, a method for producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, includes the steps of: reacting a compound expressed by formula (5-3) or (5-4), a compound expressed by formula (6-1) or (6-2), a compound expressed by formula (7) and a compound expressed by formula (8-1) or (8-2) to prepare an aromatic polymer; sulfonating the aromatic polymer; forming the solid polymer electrolyte membrane by use of the sulfonated aromatic polymer; and forming an anode electrode and a cathode electrode on the solid polymer electrolyte membrane;

(5-3)

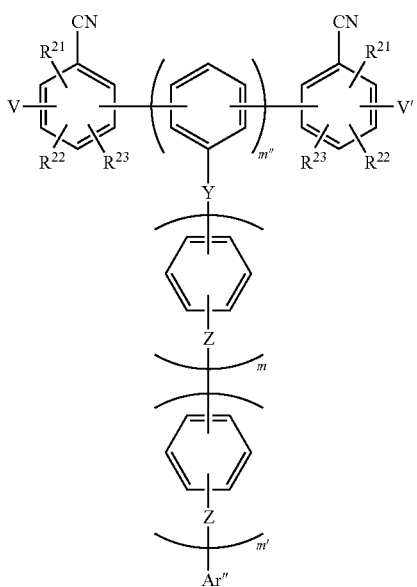

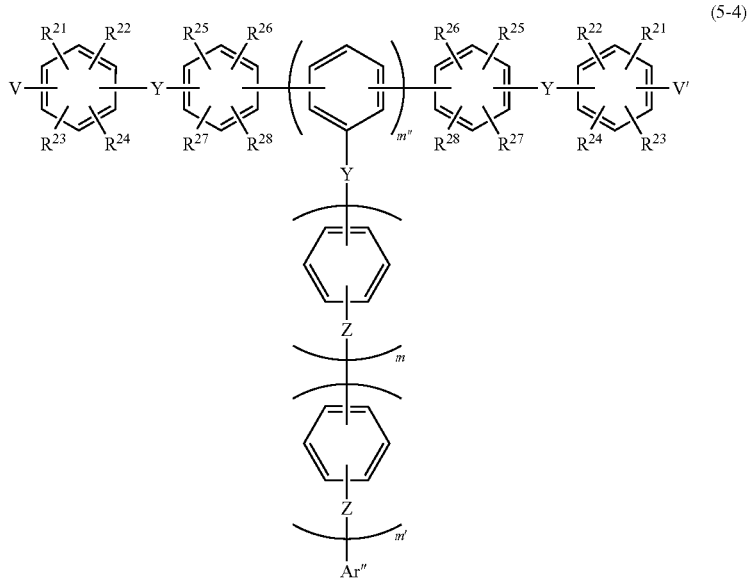
(5-4)

in the formulas (5-3) and (5-4), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group; Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—; Z represents independently a single bond, or at least a group selected from the group consisting of —O—, —S—, —(CH$_2$)$_j$— (j is an integer of 1 to 10) and —C(CH$_3$)$_2$—; m is an integer of 0 to 10; m' is an integer of 0 to 10; m" is an integer of 1 to 100; Ar" represents an aromatic group having no substituent; and V and V' represent independently of each other fluorine or chlorine atom;

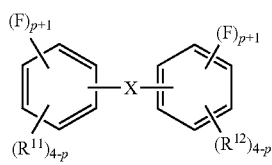
(6-1)

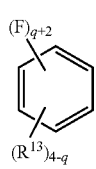
(6-2)

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

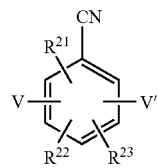
(7)

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other fluorine or chlorine atom;

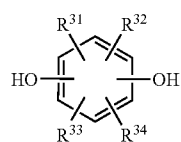
(8-1)

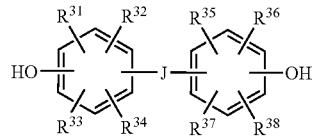
(8-2)

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

tional group with a compound expressed by the formula (9-1) or (9-2); forming the solid polymer electrolyte membrane by use of the sulfonated aromatic compound; and forming an anode electrode and a cathode electrode on the solid polymer electrolyte membrane;

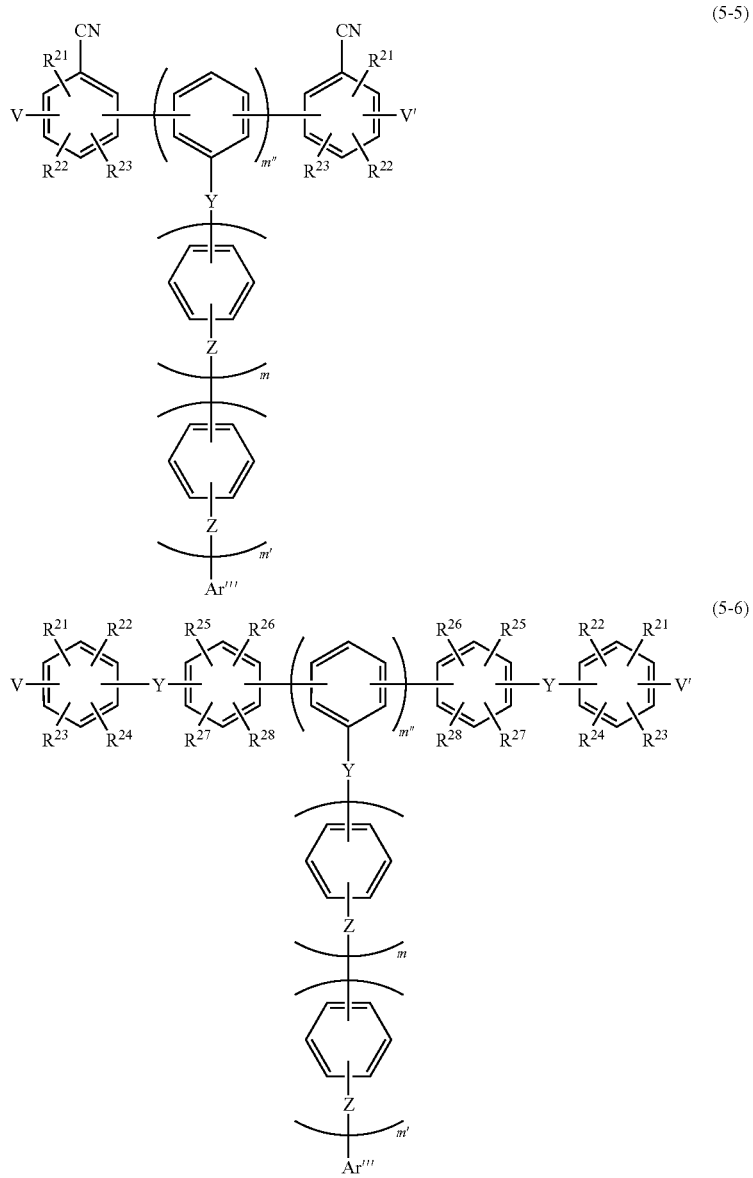

According to a eighth aspect of the present invention, a method for producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, includes the steps of: reacting a compound expressed by formula (5-5) or (5-6), a compound expressed by formula (6-1) or (6-2), a compound expressed by formula (7), and a compound expressed by formula (8-1) or (8-2) to prepare an aromatic polymer having a functional group; reacting secondarily the aromatic polymer having a funcin the formulas (5-5) and (5-6), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group; Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—; Z represents independently a single bond, or at least a group selected from the group consisting of —O—, —S—, —(CH$_2$)$_j$— (j is an integer of 1 to 10) and —C(CH$_3$)$_2$—; m is an integer of 0 to 10; m' is an integer of 0 to 10; m" is an integer of 1 to 100; Ar''' represents an aromatic group having a substituent expressed by —OM or —SM; M represents a hydrogen atom or alkaline metal atom; and V and V' represent independently of each other a fluorine or chlorine atom;

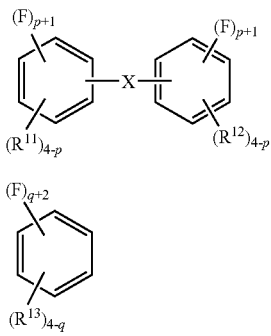

(6-1)

(6-2)

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

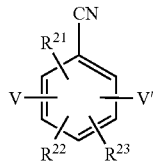

(7)

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other a fluorine or chlorine atom;

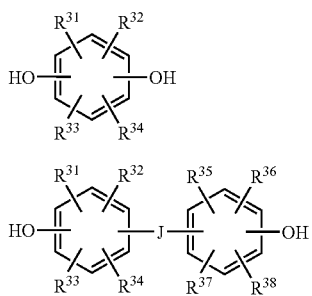

(8-1)

(8-2)

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—;

(9-1)

(9-2)

in the formulas (9-1) and (9-2), R represents independently at least an atom or a group selected from the group consisting of a hydrogen atom, fluorine atom, alkyl group and partly or fully halogenated alkyl group; e is an integer of 1 to 20; and L represents a chlorine, bromine, or iodine atom; and M represents a hydrogen atom or alkaline metal atom.

In accordance with the present invention, MEAs may be provided with superior hot water resistance, less dimensional changes in heat cycles and higher chemical stability; in particular the MEAs may exhibit superior radical resistance in terms of Fenton reagent resistance as well as excellent toughness and mechanical strength by virtue that polyarylene copolymers of aromatic polymers are utilized for the solid polymer electrolyte membranes or proton conductive membranes of the MEAs.

Furthermore, the polyarylene copolymers easily control the amount of the introduction of sulfonic acid groups, and therefore, the MEAs may display higher proton conductivity over a wide temperature range and superior adhesiveness with substrates or electrodes.

DETAILED DESCRIPTION OF THE INVENTION

Polyarylene Copolymer

The MEAs according to the present invention will be explained more specifically below. The solid polymer electrolyte membranes or proton conductive membranes of MEAs are characterized in that they are formed from polyarylene copolymers of an aromatic polymer.

The polyarylene copolymers (hereinafter sometimes referred to as "sulfonated polyarylene") have a constitutional unit expressed by the formula (1) (hereinafter sometimes referred to as "constitutional unit (1)"), a constitutional unit expressed by the formula (2-1) (hereinafter sometimes referred to as "constitutional unit (2-1)") or a constitutional unit expressed by the formula (2-2) (hereinafter sometimes referred to as "constitutional unit (2-2)") (hereinafter, constitutional units (2-1) and (2-2) are sometimes collectively referred to as "constitutional unit (2)"), and a constitutional unit expressed by the formula (3) (hereinafter sometimes referred to as "constitutional unit (3)"). The sulfonated polyarylenes may be formed solely from the constitutional units (1), (2) and (3), or the sulfonated polyarylenes may additionally contain a constitutional unit expressed by the formula (4-1) (hereinafter sometimes referred to as "constitutional unit (4-1)"), a constitutional unit expressed by the formula (4-2) (hereinafter sometimes referred to as "constitutional unit (4-2)") or the like (hereinafter, constitutional units (4-1) and (4-2) are sometimes collectively referred to as "constitutional unit (4)").

The sulfonated polyarylenes in accordance with the present invention contain 10 to 90 mole %, preferably 20 to 80 mole %, more preferably 30 to 70 mole % of the constitutional unit (1), 3 to 40 mole %, preferably 6 to 35 mole %, more preferably 10 to 30 mole % of the constitutional unit (2), and 1 to 40 mole %, preferably 3 to 35 mole %, more preferably 5 to 30 mole % of the constitutional unit (3), with a proviso that the total of the constitutional units (1) to (3) is 100 mole %. Preferably, the sulfonated polyarylenes in accordance with the present invention contain no less than 6 mass %, preferably 7.5 to 45 mass %, more preferably 10 to 35 mass % of fluorine atom; the fluorine content of this range may lead to sufficient hot water resistance.

Constitutional Unit (1)

In the formula (1) described above, Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—; among these, more preferable are —CO and —SO$_2$—. Z represents independently a single bond or at least a structure selected from the group consisting of —O—, —S—, —(CH$_2$)$_j$— (j is an integer of 1 to 10) and —C(CH$_3$)$_2$—; among these, more preferable are a single bond and —O—. Ar represents an aromatic group having a substituent expressed by —SO$_3$H, —O—(CR$_2$)$_e$SO$_3$H or —S—(CR$_2$)$_e$SO$_3$H, in which R represents at least an atom or a group selected independently from a hydrogen atom, fluorine atom, alkyl group and partly or fully halogenated alkyl group; e is an integer of 1 to 20. Examples of the aromatic groups include phenyl, naphthyl, anthryl, phenanthryl groups and the like; among these, phenyl and naphthyl groups are more preferable. The aromatic group should have at least a substituent expressed by —SO$_3$H, —O(CR$_2$)$_e$SO$_3$H or —O(CR$_2$)$_e$SO$_3$H; preferably, the aromatic group is substituted by at least two substituents in the case that the aromatic group have a naphthyl group. The m is an integer of 0 to 10, preferably 0 to 2; m' is an integer of 0 to 10, preferably 0 to 2; m" is an integer of 1 to 100; and k is an integer of 1 to 4.

Examples of the preferable constructional unit (1) are as follows:

(i) m=0, m'=0; Y is —CO—, Ar is a phenyl group with a substituent of —SO$_3$H;

(ii) m=1, m'=0; Y is —CO—, Z is —O—, and Ar is a phenyl group with a substituent of —SO$_3$H;

(iii) m=1, m'=1, k=1; Y is —CO—, Z is —O—, and Ar is a phenyl group with a substituent of —SO$_3$H;

(iv) m=1, m'=0; Y is —CO—, and Ar is a naphthyl group with two substituents of —SO$_3$H; and (v) m=1, m'=0; Y is —CO—, Z is —O—, and Ar is a phenyl group with a substituent of —O(CH$_2$)$_4$SO$_3$H.

Constitutional Unit (2)

X in the formulas (2-1) and (2-2) represents a divalent group or a single bond; examples of the divalent bond include —CO—, —CONH—, —(CF$_2$)$_i$— (i is an integer of 1 to 10), —C (CF$_3$)$_2$—, —COO—, —SO$_2$—, —O—, —S—, —(CH$_2$)$_j$— (j is an integer of 1 to 10) and —C(CH$_3$)$_2$. R$^{11}$ to R$^{13}$ represents a hydrogen atom or alkyl group; examples of the alkyl group include methyl, ethyl, propyl, butyl, amyl, hexyl, cyclohexyl and octyl groups. R$^{11}$, R$^{12}$ and R$^{13}$ may be identical or different from each other; n is an integer of 1 to 4; and p is an integer of 1 to 4.

Constitutional Unit (3)

In the formula (3) described above, R$^{21}$ to R$^{23}$, which may be identical or different from each other, represent at least an atom or a group selected from a hydrogen atom, fluorine atom, alkyl group, partly or fully halogenated alkyl group, allyl group, aryl group and nitrile group. Examples of the alkyl groups include methyl, ethyl, propyl, butyl, amyl, hexyl, cyclohexyl and octyl groups. Examples of the partly or fully halogenated alkyl groups include trifluoromethyl, pentafluoroethyl, perfluoropropyl, perfluorobutyl, perfluoropentyl and perfluorohexyl groups; among these, more preferable are trifluoromethyl and pentafluoroethyl groups. A example of the allyl group includes a propenyl group; examples of the aryl groups include phenyl and pentafluorophenyl groups.

Constitutional Unit (4)

R$^{31}$ to R$^{38}$ in the formulas (4-1) and (4-2) represent independently of each other at least an atom or a group selected from the group consisting of a hydrogen atom, fluorine atom, alkyl group, partly or fully halogenated alkyl group, allyl group and aryl group. J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

Method for Producing Sulfonated Polyarylene

The sulfonated polyarylenes may be produced by various methods; for example, hydrolyzing a polyarylene copolymer having a sulfonic ester group; sulfonating a polyarylene copolymer having neither sulfonic acid group nor sulfonic ester group (hereinafter sometimes referred to as "non-sulfonated polyarylene") by use of a sulfonating agent; or reacting a compound having a structure capable of forming a sulfonic acid group with a non-sulfonated polyarylene having a reactive functional group.

1. Production Method Through Hydrolyzing Sulfonic Ester Group

The sulfonated polyarylenes in accordance of the present invention may be produced by reacting a compound expressed by formula (5-1) or (5-2) (hereinafter sometimes referred to as "compound (5-1)" or "compound (5-2)"), a compound expressed by formula (6-1) or (6-2) (hereinafter sometimes referred to as "compound (6-1)" or "compound (6-2)"), a compound expressed by formula (7) (hereinafter sometimes referred to as "compound (7)"), and a compound expressed by formula (8-1) or (8-2) (hereinafter sometimes referred to as "compound (8-1)" or "compound (8-2)"), thereby to synthesize a polyarylene copolymer having a sulfonic ester group, then the polyarylene copolymer is hydrolyzed to convert the sulfonic ester group into the corresponding sulfonic acid group. The sulfonated polyarylenes in this method possess the constitutional units (1) to (4).

Compound (5-1)

In the formula (5-1), the meanings of Y, Z, m, m', m" and k are the same as those defined in formula (1), the meanings of R$^{21}$ to R$^{23}$ are the same as those defined in formula (3).

R$^a$ represents a hydrocarbon group having carbon atoms of 1 to 20, a hydrogen atom or an alkaline metal atom. The hydrocarbon group having carbon atoms of 1 to 20 may be a linear hydrocarbon group, branched hydrocarbon group, alicyclic hydrocarbon group, or hydrocarbon group with a five-membered heterocyclic ring, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamanthyl, adamantanemethyl, 2-ethylhexyl, bicyclo[2.2.1]heptyl, bicyclo[2.2.1]heptylmethyl, tetrahydrofurfuryl, 2-methylbutyl, 3,3-dimethyl-2,4-dioxolanemethyl, cyclohexylmethyl, adamanthylmethyl or bicyclo[2.2.1]heptylmethyl group. Among these, n-butyl, neopentyl, tetrahydrofurfuryl, cyclopentyl, cyclohexyl, cyclohexylmethyl, adamanthylmethyl and bicyclo[2.2.1]heptylmethyl groups are more preferable, in particular a neopentyl group is preferable.

Ar' represents an aromatic group having a substituent expressed by —SO$_3$R$^b$, —O—(CR$_2$)$_e$SO$_3$R$^b$ or —S—(CR$_2$)$_e$SO$_3$R$^b$. Examples of the aromatic groups include phenyl, naphthyl, anthryl and phenanthryl groups. Among these, phenyl and naphthyl groups are more preferable. The meanings of the R and e are the same as those defined in formula (1).

R$^b$ represents a hydrocarbon group having carbon atoms of 1 to 20, specific examples thereof are the same as the hydrocarbons in terms of R$^a$. Preferably, the hydrocarbon group is n-butyl, neopentyl, tetrahydrofurfuryl, cyclopentyl, cyclohexyl, cyclohexylmethyl, adamanthylmethyl or bicyclo[2.2.1]heptylmethyl group, in particular neopentyl group is preferable.

The substituents expressed by —SO$_3$R$^b$, —O(CR$_2$)$_e$SO$_3$R$^b$ or —S—(CR$_2$)$_e$SO$_3$R$^b$ should be substituted by at least a substituent; preferably, the aromatic group has at least two substituents in the case that the aromatic group is a naphthyl group.

It is preferred that R$^a$ and R$^b$ groups be respectively derived from a primary alcohol including a tertiary or quaternary carbon, more preferably a quaternary carbon, at its beta-position, from the viewpoint that the polymerization can proceed stably and polymerization inhibition and/or cross linking due to sulfonic acid formed from de-esterification be prevented.

V and V', which may be identical or different from each other, are a fluorine or chlorine atom, preferably a fluorine atom.

Examples of the compounds (5-1) are as follows:

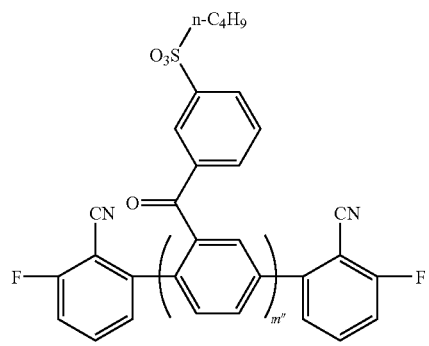

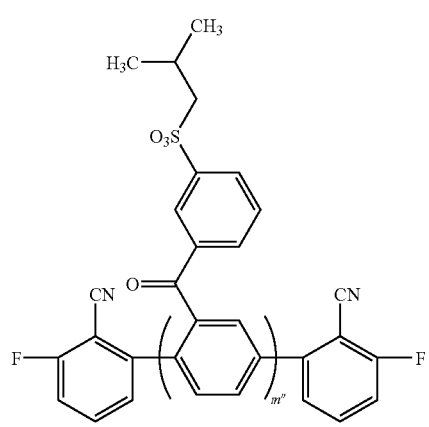

-continued

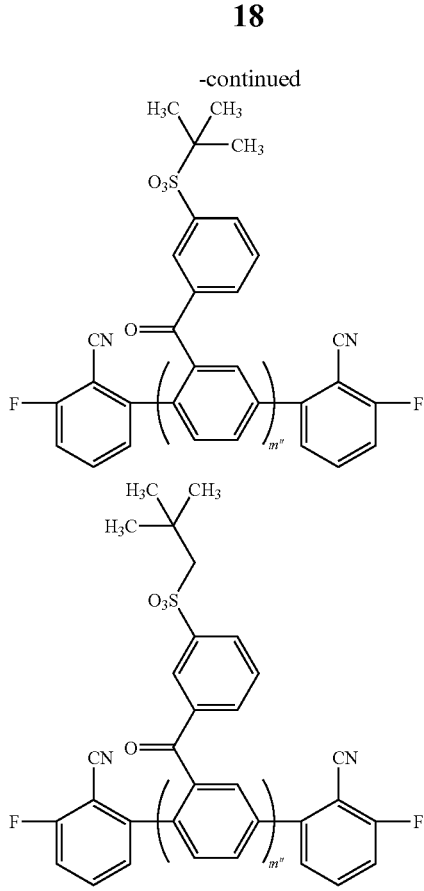

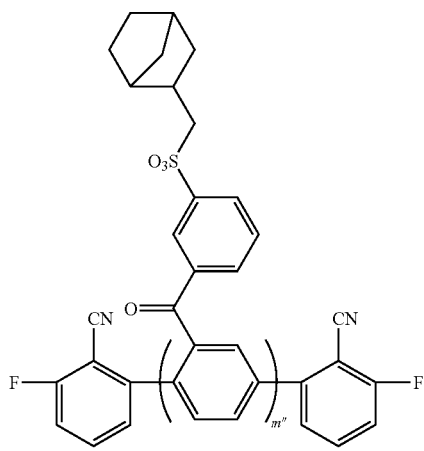

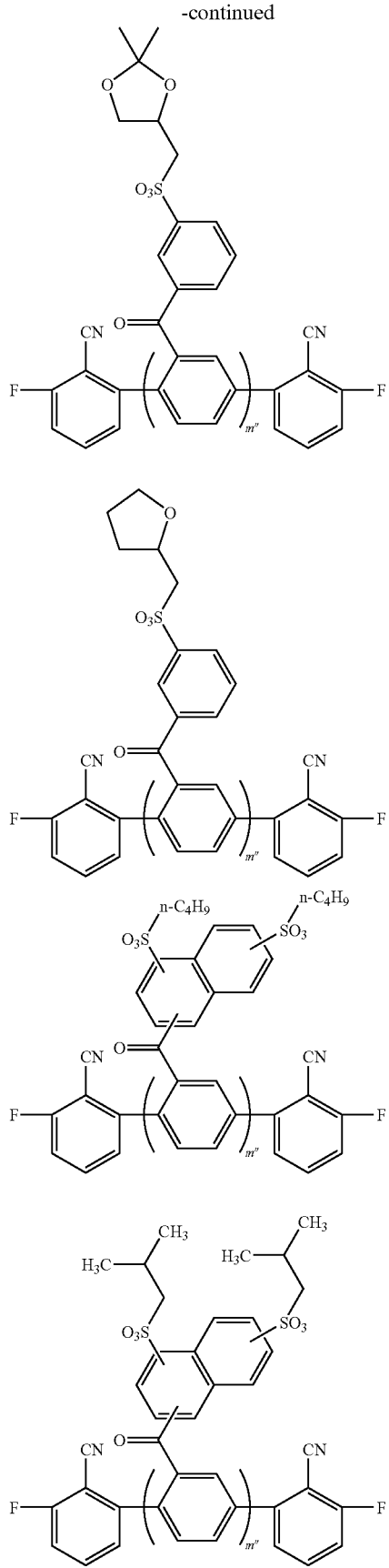
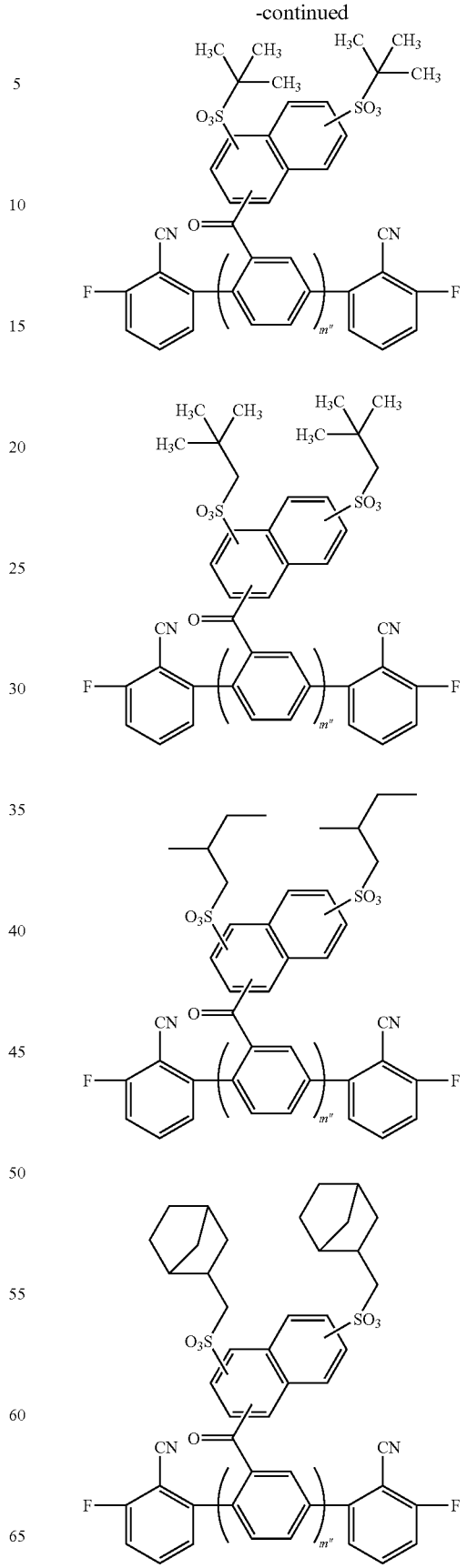

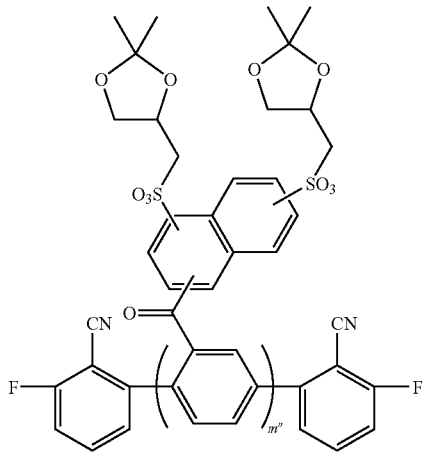
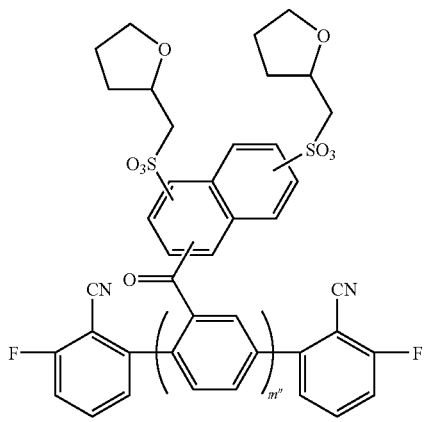
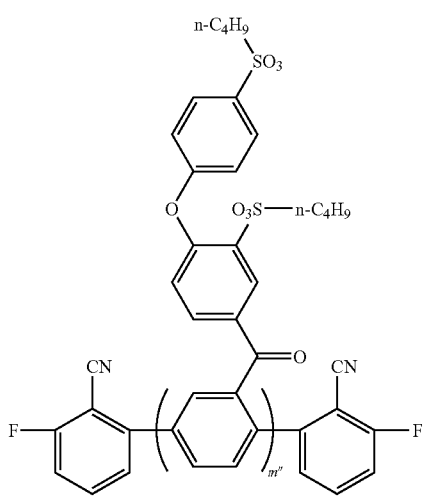
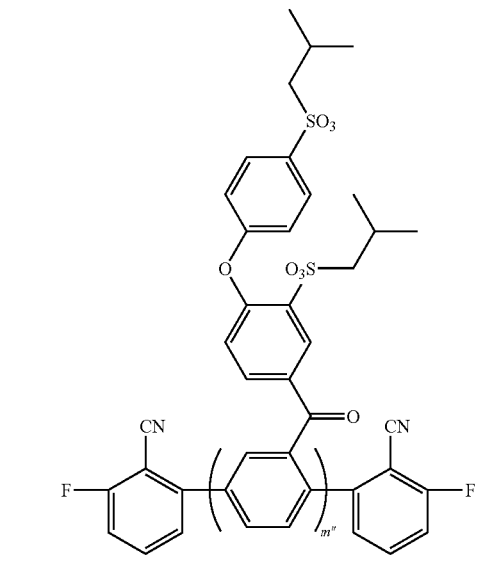
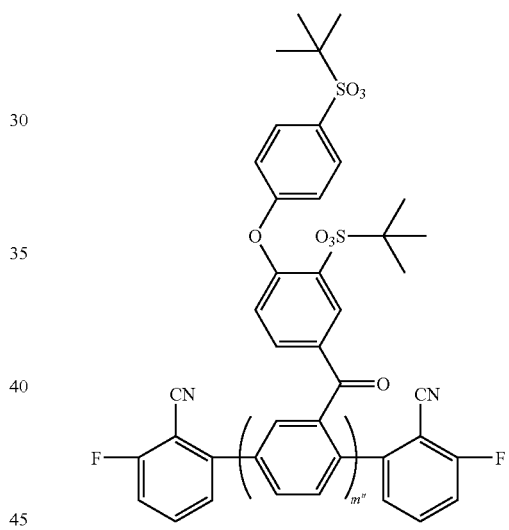
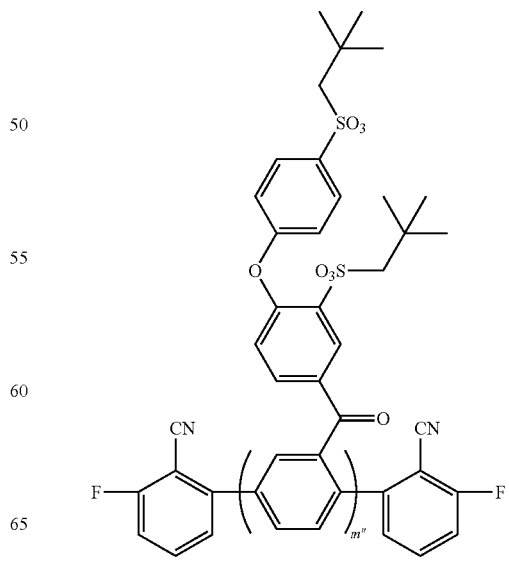

23
-continued
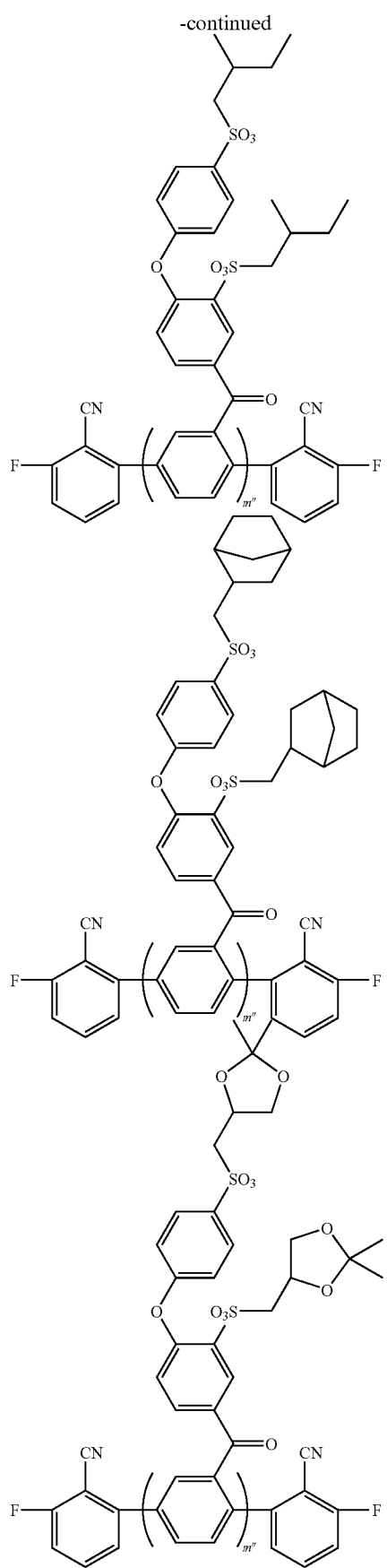
24
-continued
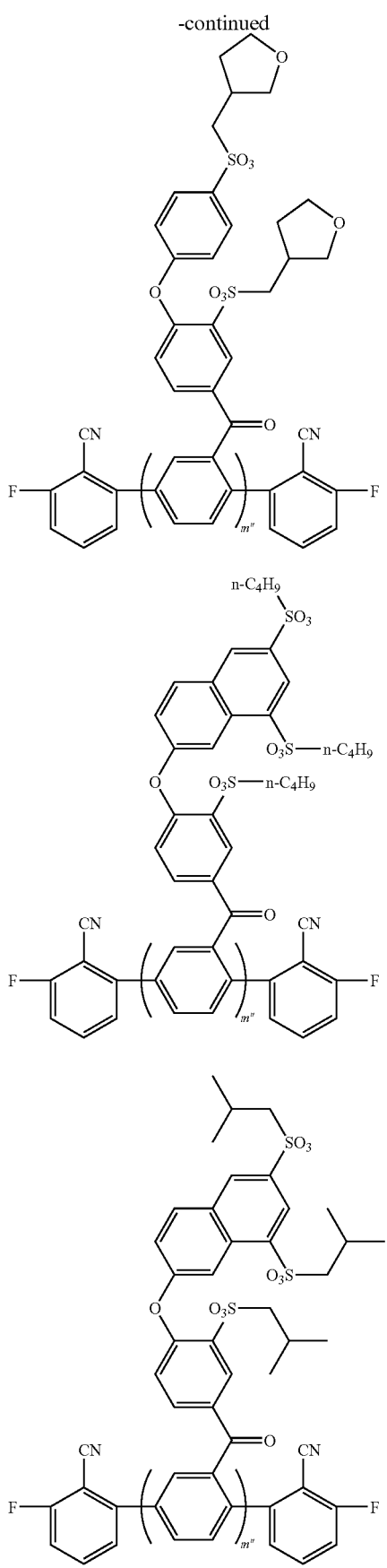

-continued
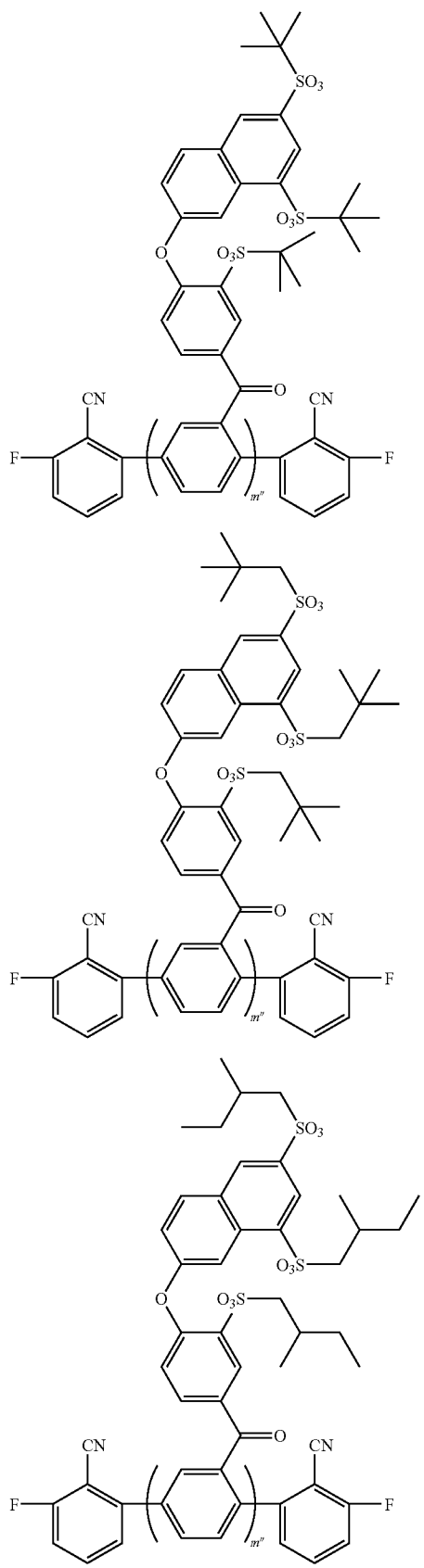
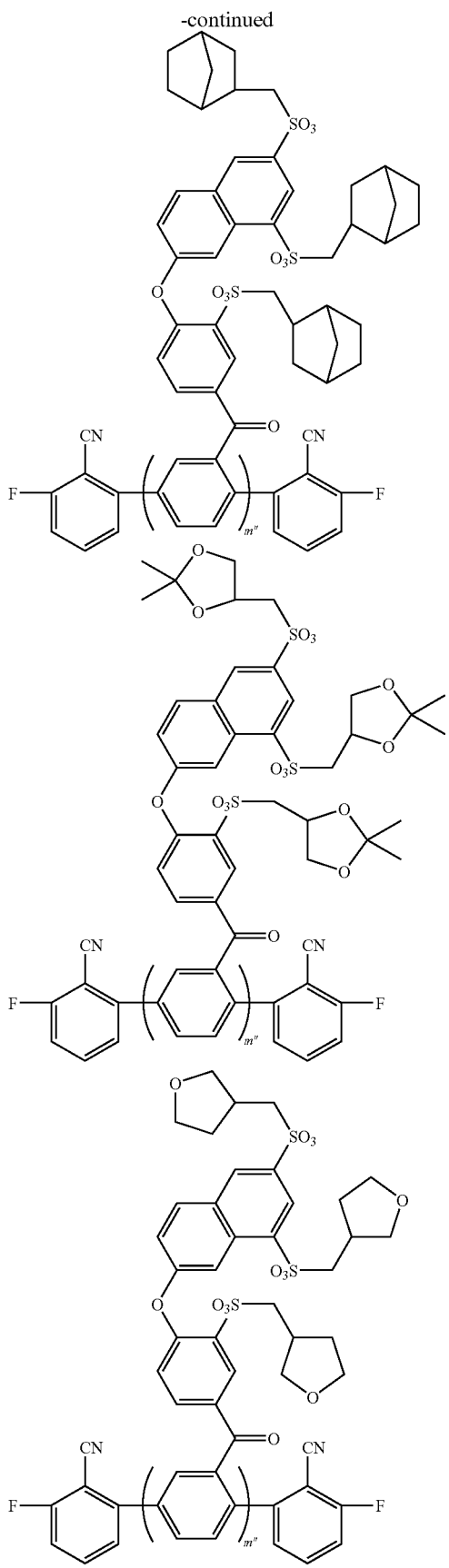

The compounds (5-1) may be synthesized by such a method that a compound capable of forming the constructional unit expressed by the formula (10) shown below (hereinafter sometimes referred to as "compound (10)") and a compound capable of forming the constructional unit expressed by the formula (11) shown below (hereinafter sometimes referred to as "compound (11)") are employed as monomers and reacted together.

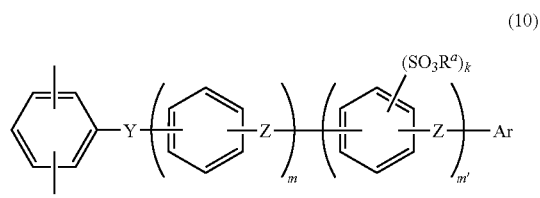
(10)

In the formula (10), the meanings of Y, Z, $R^a$, Ar', m and m' are the same as those defined in formula (5-1).

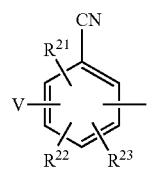
(11)

In the formula (11), the meanings of $R^{21}$ to $R^{23}$ and V are the same as those defined in formula (7). The compounds (5-1) contain 5 to 99.99 mole %, preferably 10 to 99.99 mole %, more preferably 20 to 99.99 mole % of the constitutional unit expressed by the formula (10), and 0.01 to 95 mole %, preferably 0.01 to 90 mole %, more preferably 0.01 to 80 mole % of the constitutional unit expressed by the formula (11), and have a number average molecular weight of 5000 to 500,000, preferably 10,000 to 200,000.

The compounds (10) may be the sulfonic esters described, for example, in Japanese Unexamined Patent Application Laid-Open Nos. 2004-137444, 2004-345997 and 2004-346163.

Preferable examples of the compounds (11) described above are shown below.

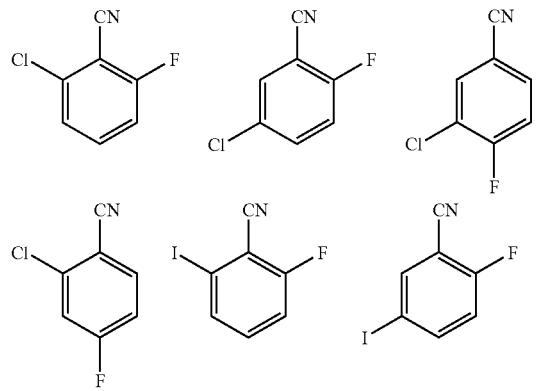

-continued

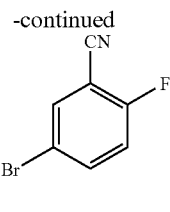

As such, the compounds having a fluorine atom and a halogen atom other than the fluorine atom are appropriately employed to prepare active fluoro-terminated compounds since the fluorine atom is inactive and the other halogen atoms are active in such compounds under reactions that utilize a catalyst described later.

The catalysts, utilized for preparing the compound (5-1) by reaction between the compound (10) and the compound (11), contain a transition metal compound; the catalysts contain essentially (i) a transition metal salt and a ligand compound (hereinafter sometimes referred to as "ligand component") or a transition metal complex with a coordinate ligand (including copper salt) and (ii) a reducing agent, and additionally an optional "salt" in order to increase the polymerization reaction rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Among these, nickel chloride and nickel bromide are preferable in particular.

Examples of the ligand components include triphenylphosphine, tri(2-methylphenyl)phosphine, tri(3-methylphenyl)phosphine, 2,2'-bipyridine, 1,5-cyclooctadiene, 1,3-bis(diphenylphosphine)propane, and 1,2-bis(diphenylphosphine)ethane. Among these, triphenylphosphine, tri(2-methylphenyl)phosphine, tri(3-methylphenyl)phosphine and 2,2'-bipyridine are more preferable. The compounds for ligand components may be used alone or in combination.

Examples of the transition metal complexes having a coordinate ligand include nickelchloride bis (triphenylphosphine), nickelbromide bis (triphenylphosphine), nickeliodide bis(triphenylphosphine), nickelnitrate bis(triphenylphosphine), nickelchloride(2,2'-bipyridine), nickelbromide(2,2'-bipyridine), nickeliodide(2,2'-bipyridine), nickelnitrate(2,2'-bipyridine), bis(1,5-cyclooctadiene)nickel, tetrakis(triphenylphosphine)nickel, tetrakis(triphenylphosphite)nickel and tetrakis (triphenylphosphine)palladium. Among these, nickelchloride bis(triphenylphosphine) and nickelchloride 2,2'-bipyridine are more preferable.

Examples of the reducing agents, usable with the catalysts, include iron, zinc, manganese, aluminum, magnesium, sodium and calcium; among these, zinc, magnesium and manganese are more preferable. These reducing agents may be more activated by contacting with acids such as organic acids.

Examples of the reducing agents, usable with the catalysts, include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Among these, sodium bromide, sodium iodide, potassium bromide, tetraethylammonium bromide and tetraethylammonium iodide are preferable in particular.

With respect to the amounts of the respective components in the catalysts, the amount of transition metal salts or transition metal complexes is usually 0.0001 to 10 moles, preferably 0.01 to 0.5 mole based on one mole of the monomers (total of the compounds (10) and (11)). When the amount is below this level, the polymerization reaction tends to progress insufficiently, and when the amount is above this level, the molecular weight may be lower.

In a case in which transition metal salts and ligand components are employed, the amount of the ligand components is usually 0.1 to 100 moles, preferably 1 to 10 moles based on one mole of the transition metal salts. When the amount is below this level, the catalyst activity is likely to be insufficient, and when the amount is above this level, the molecular weight may be lower.

The amount of the reducing agents is usually 0.1 to 100 moles, preferably 1 to 10 moles based on one mole of the entire monomers. When the amount is below this level, the polymerization reaction tends to progress insufficiently, and when the amount is above this level, the resulting polymer may be difficult to purify.

In a case in which "salts" are utilized with the catalysts, the amount of the salts is usually 0.001 to 100 moles, preferably 0.01 to 1 mole based on one mole of the entirety of the monomers. When the amount is below this level, the intended effect to increase the polymerization rate tends to be insufficient, and when the amount is more than the level, the resulting polymer may be hardly purified.

Examples of solvents utilized in the reaction with the catalysts described above include tetrahydrofuran, cyclohexanone, dimethyl sulfoxide, N,N-dimethyl formamide, N,N-dimethyl acetamide, N-methyl-2-pyrrolidone, gamma-butyrolactone and gamma-butyrolactam; among these, tetrahydrofuran, N,N-dimethyl formamide, N,N-dimethyl acetamide and N-methyl-2-pyrrolidone are more preferable. Preferably, these solvents are utilized in the reaction after being dehydrated such that the water content of the solvents is no more than 500 ppm, preferably no more than 100 ppm, more preferably no more than 50 ppm.

The concentration of the entirety of the monomers in the solvents is usually 1 to 90 mass %, preferably 5 to 60 mass %; the reaction temperature is usually 0 to 200 degrees C., preferably 50 to 120 degrees C.; the reaction period is usually 0.5 to 100 hours, preferably 1 to 40 hours.

A reaction scheme to prepare a compound (5-1) from compounds (10) and (11) is exemplarily shown below.

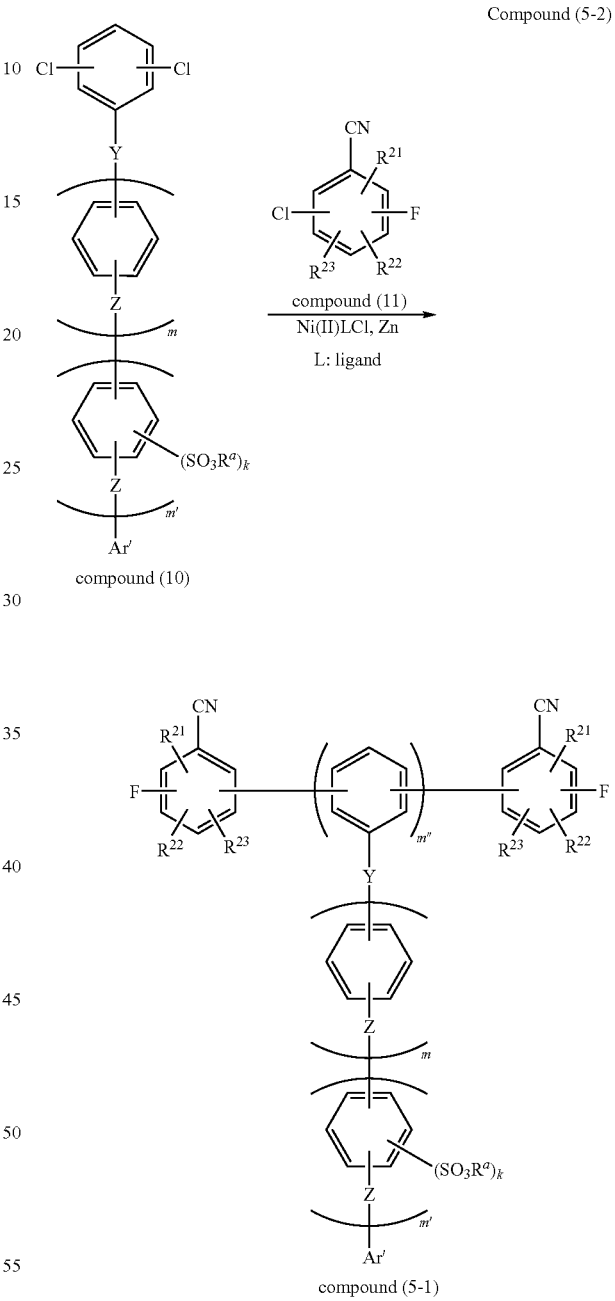

In the formula (5-2), $R^{21}$ to $R^{28}$ may be identical or different from each other, and represent at least an atom or a group selected from a hydrogen atom, fluorine atom, alkyl group, partly or fully halogenated alkyl group, allyl group, aryl group and nitrile group. The meanings of Y, Z, m, m', m" and k are the same as those defined in formula (1); the meanings of $R^8$, Ar', V and V' are the same as those defined in formula (5-1).

Examples of compounds (5-2) include those shown below.
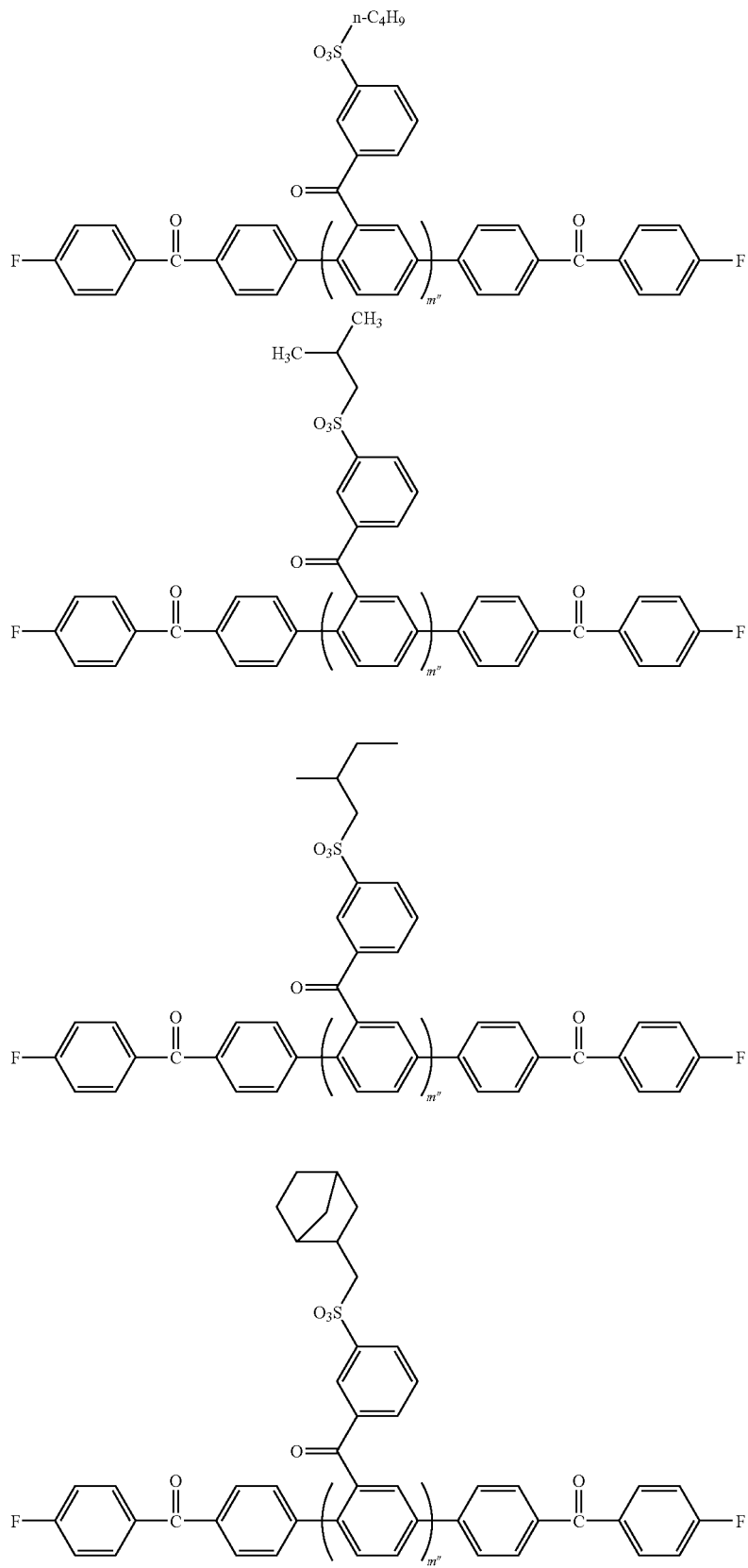

-continued
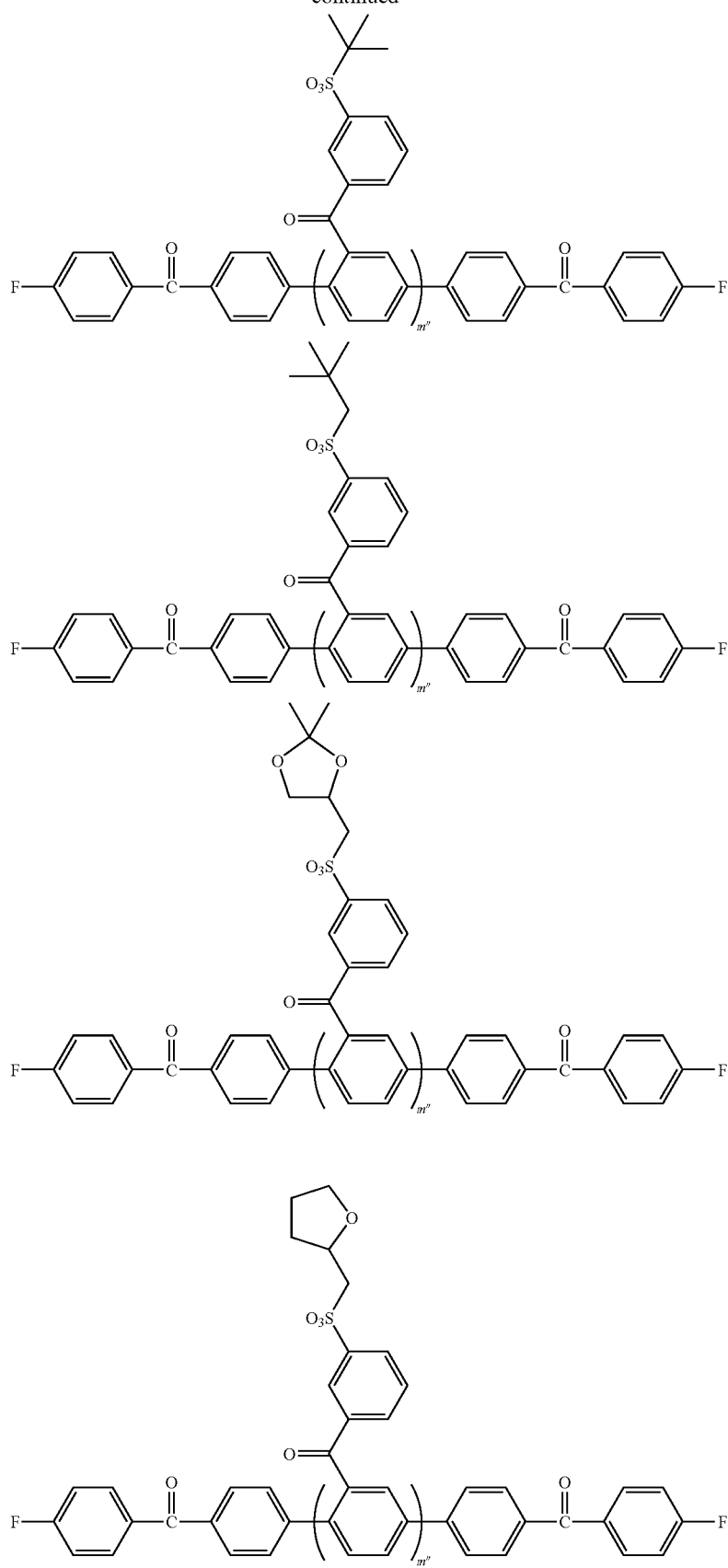

-continued
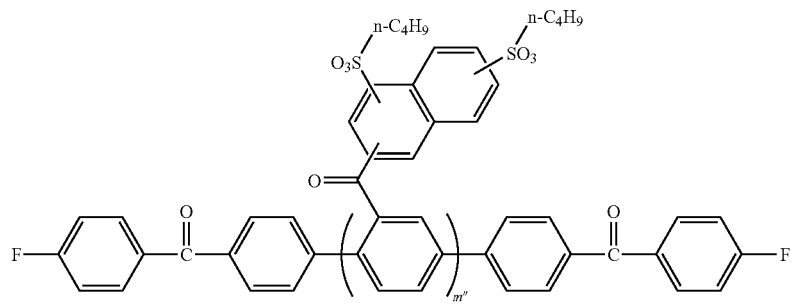
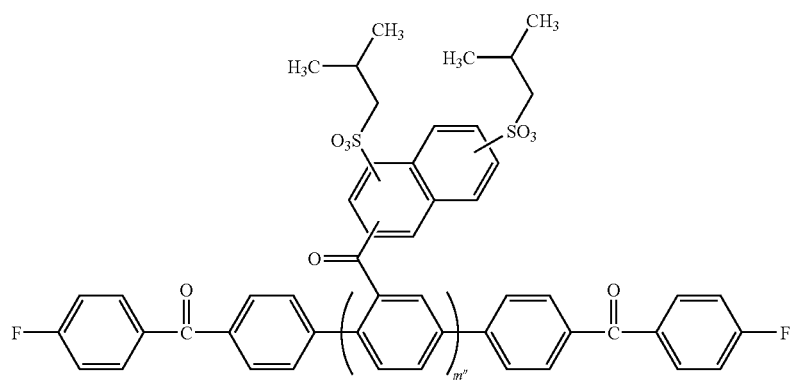
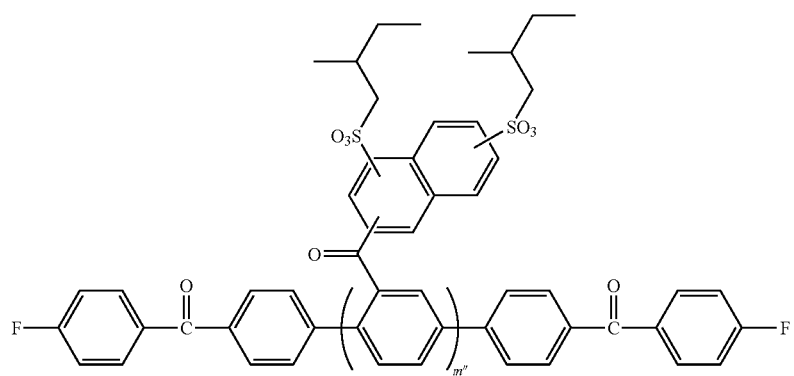
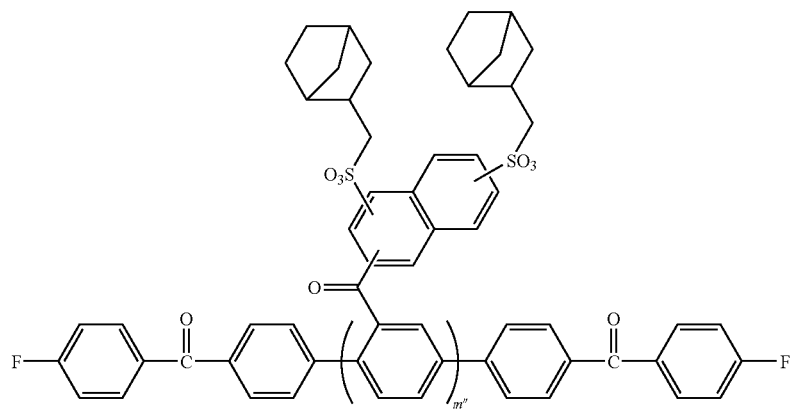

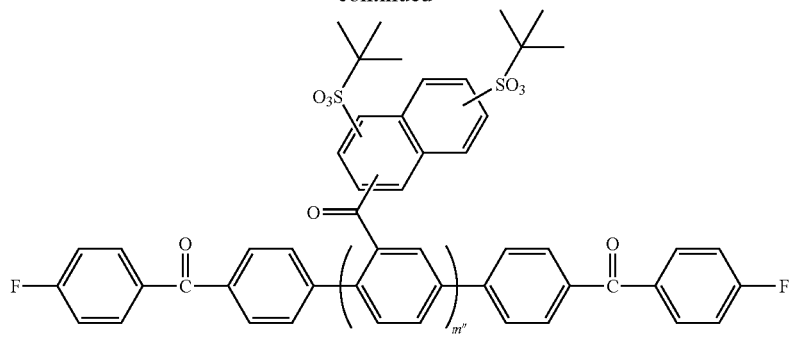
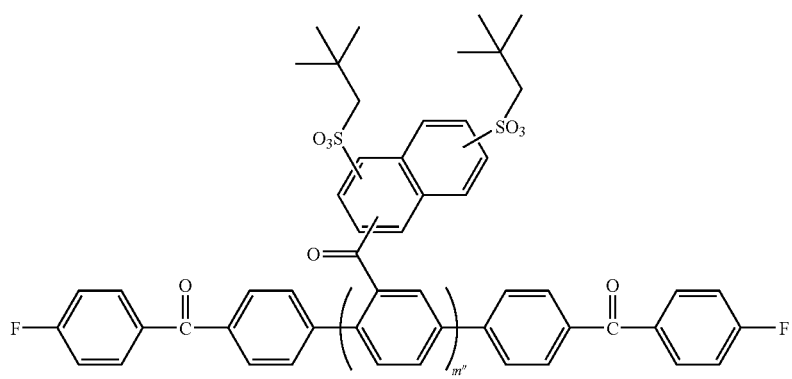
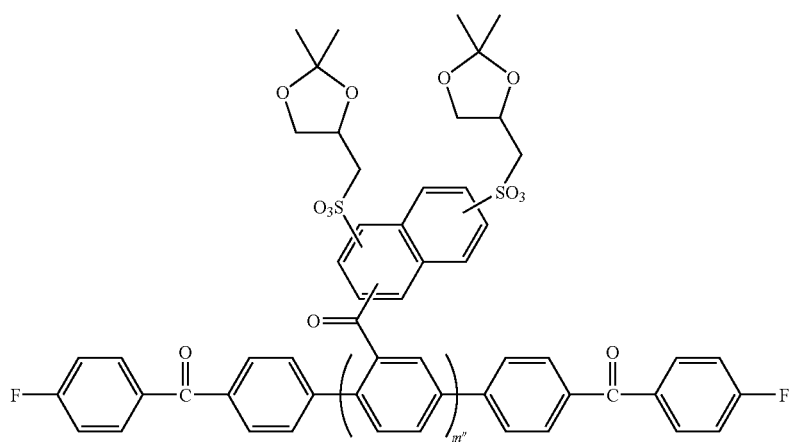
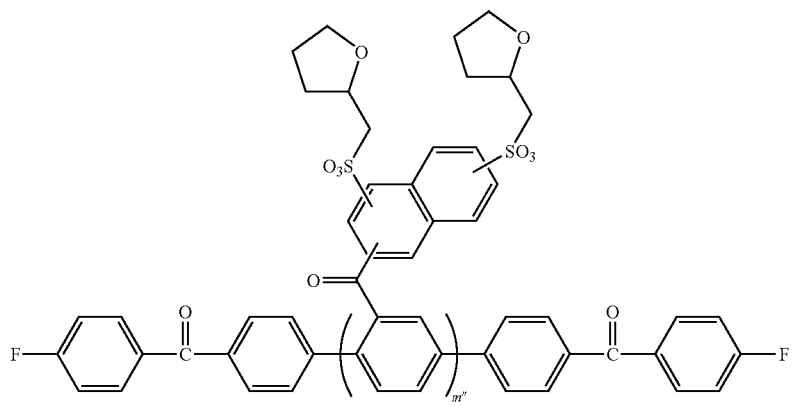

-continued
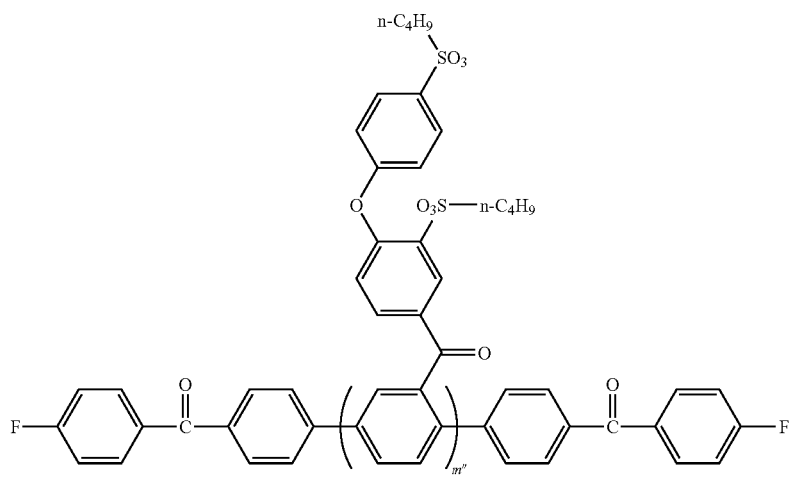
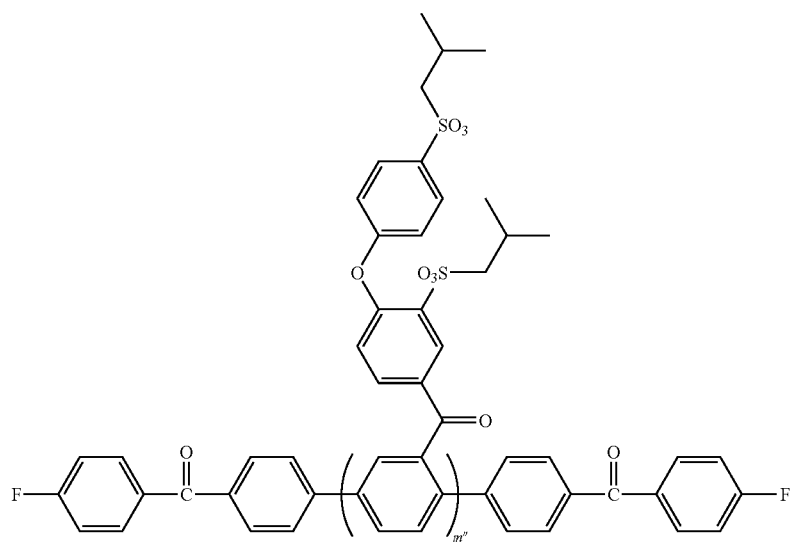
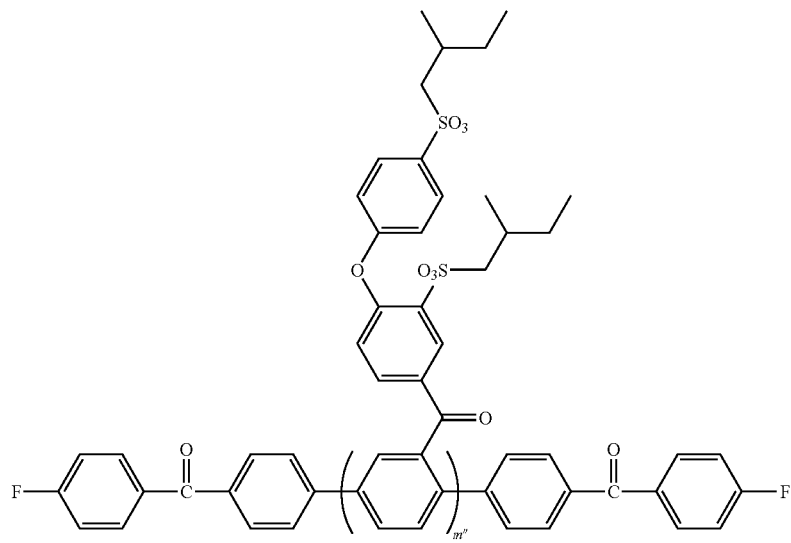

-continued
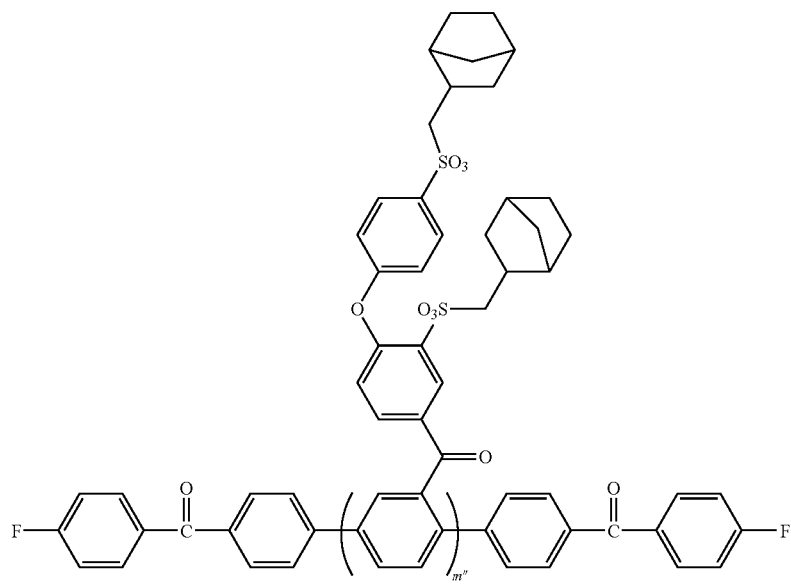
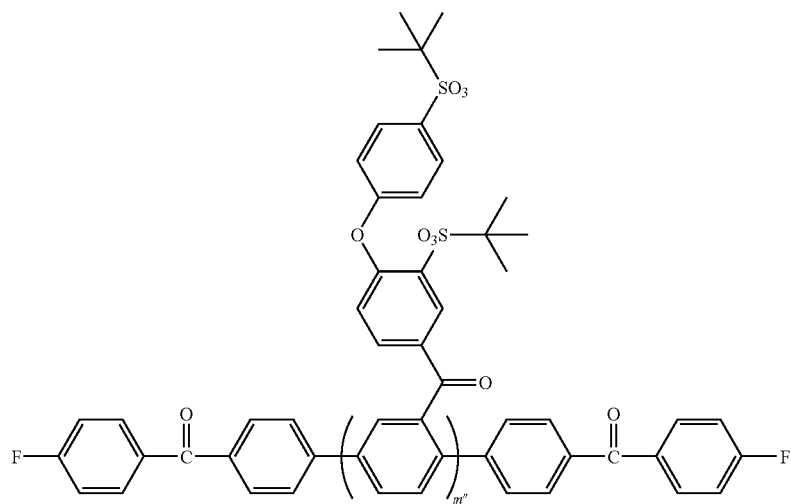
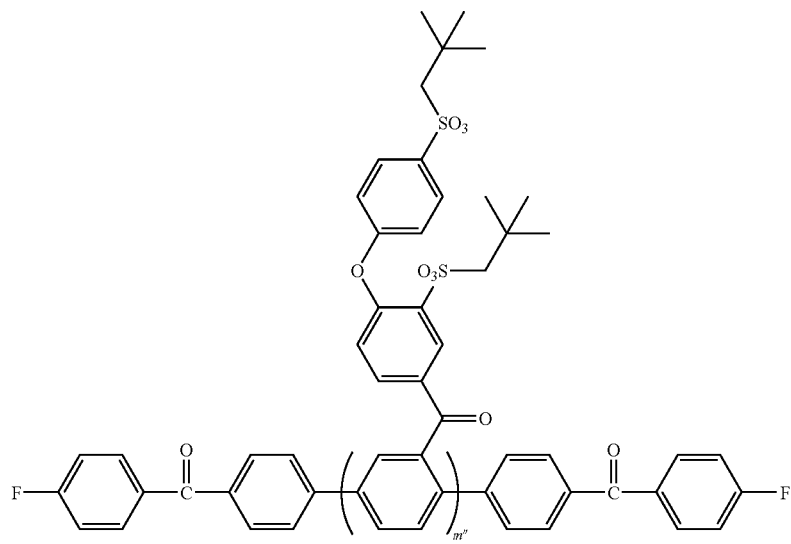

-continued
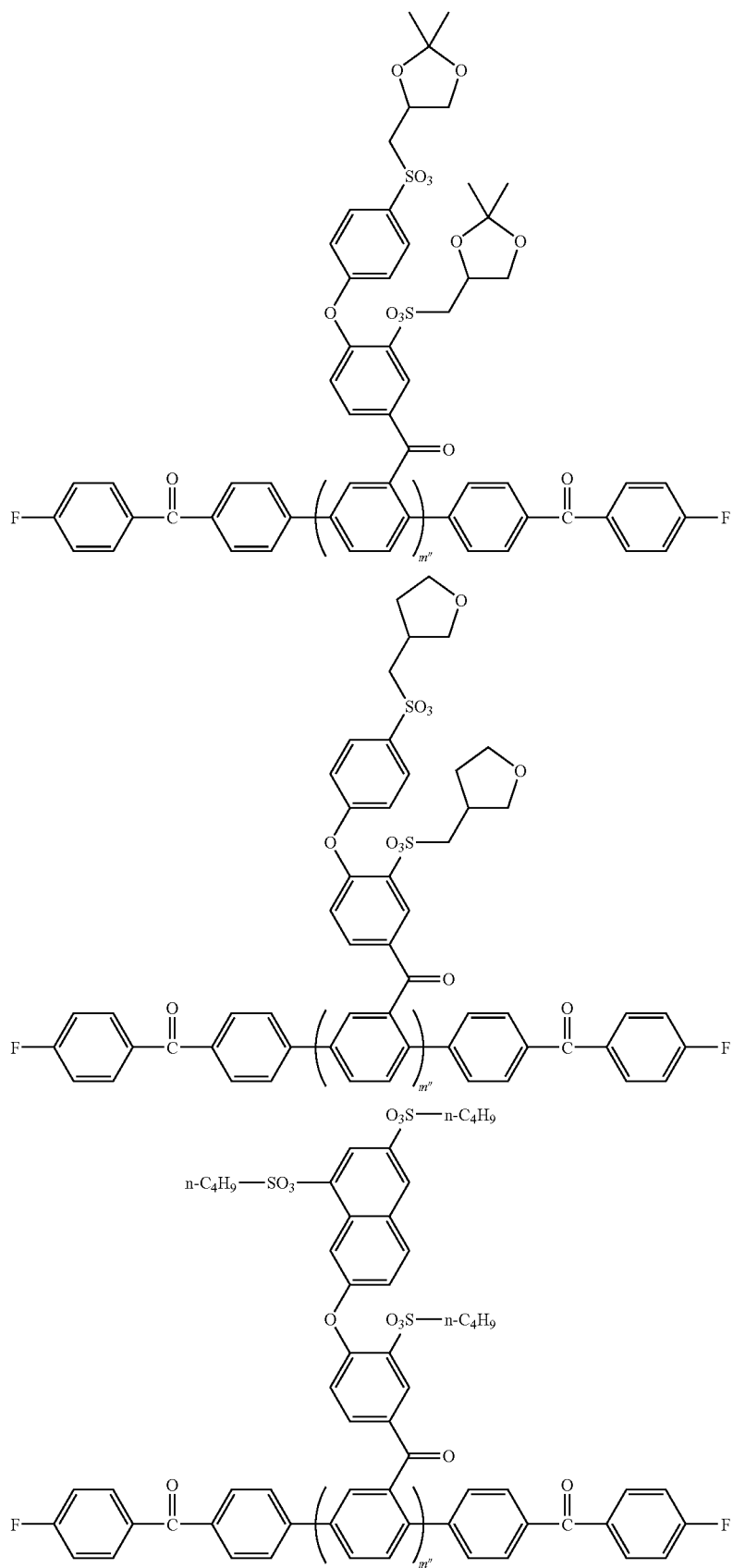

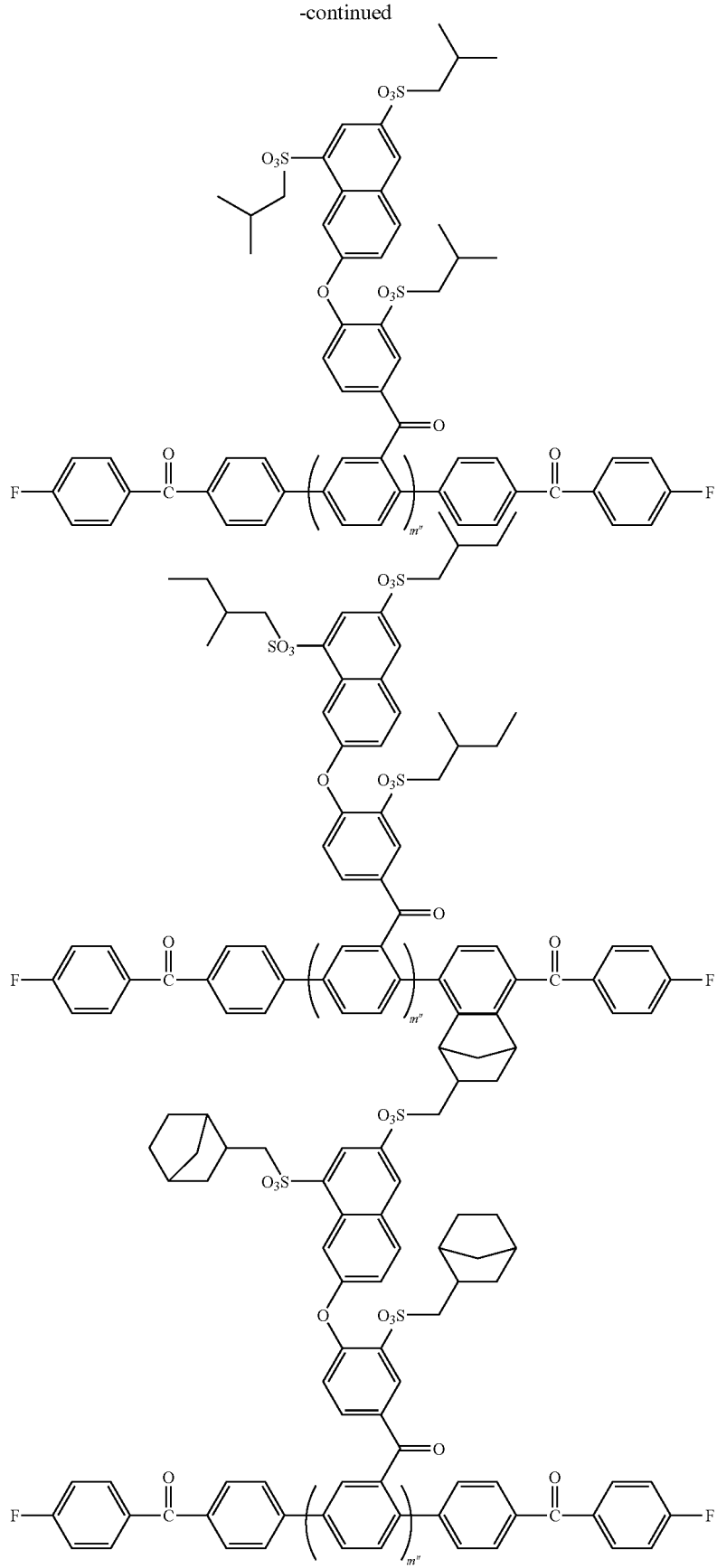

-continued
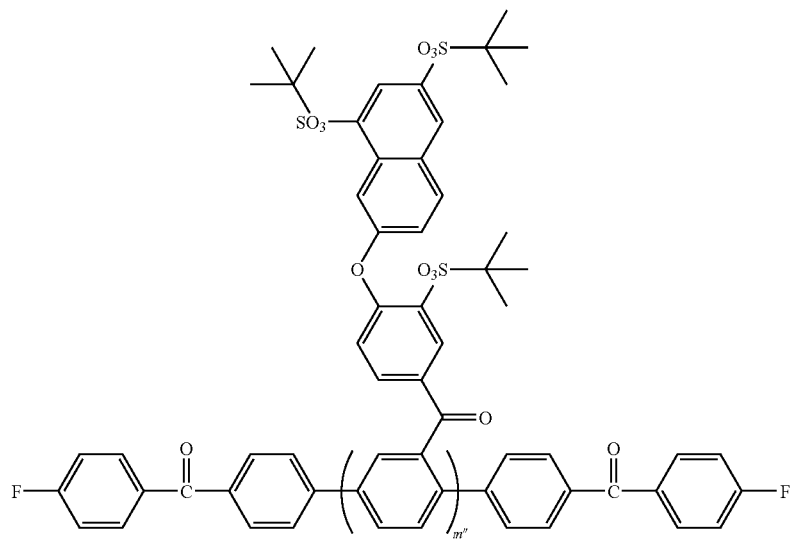
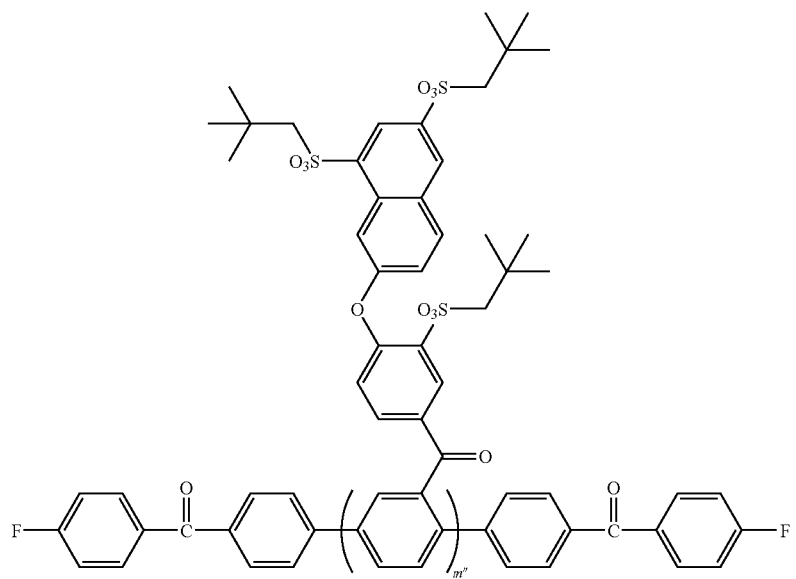

-continued

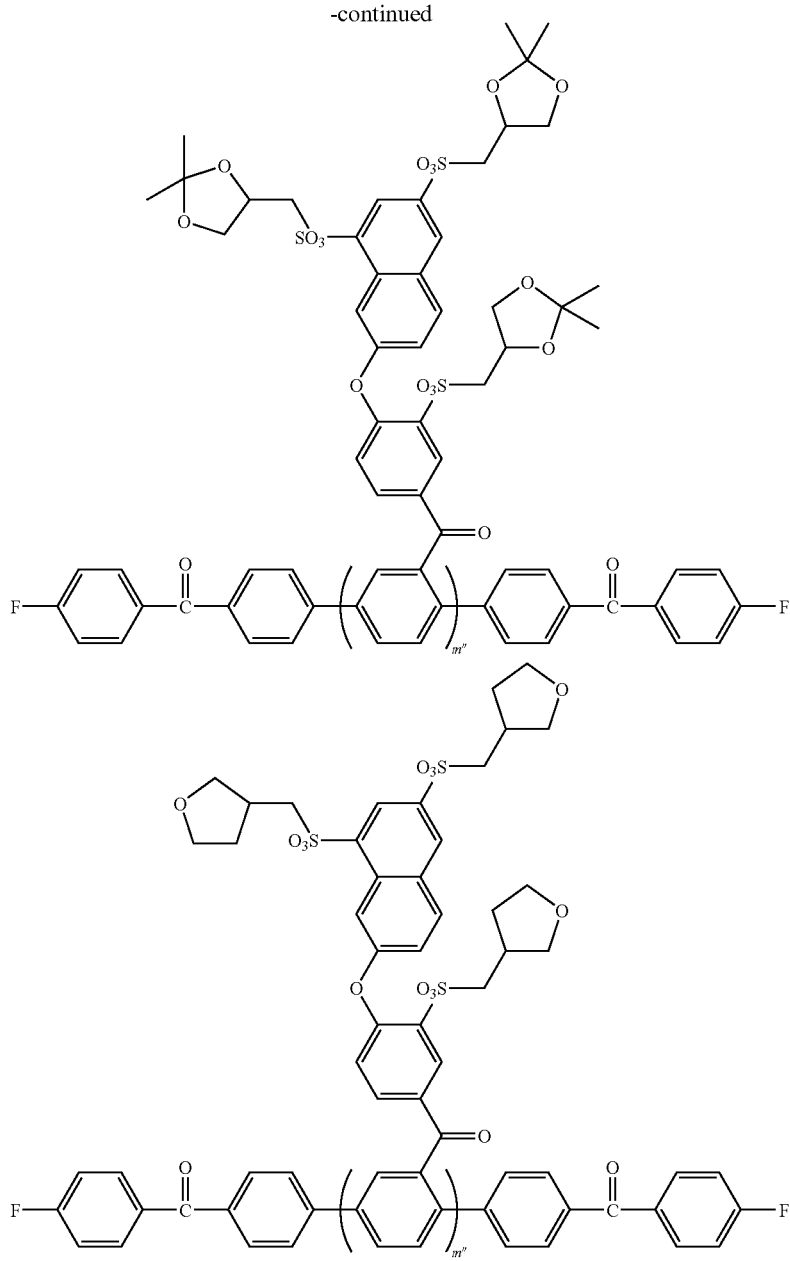

The compounds (5-2) may be synthesized by a method in which a compound capable of forming the constructional unit expressed by the formula (10) shown above and a compound capable of forming the constructional unit expressed by the formula (12) shown below (hereinafter sometimes referred to as "compound (12)") are employed as monomers and reacted together.

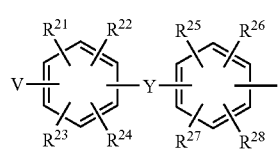 (12)

In the formula (12), the meanings of $R^{21}$ to $R^{28}$ and V are the same as those defined in formula (5-2); the meaning of Y is the same as that defined in formula (1).

The compounds (5-2) contain 5 to 99.99 mole %, preferably 10 to 99.99 mole %, more preferably 20 to 99.99 mole % of the constitutional unit expressed by the formula (10), and 0.01 to 95 mole %, preferably 0.01 to 90 mole %, more preferably 0.01 to 80 mole % of the constitutional unit expressed by the formula (12), and have a number average molecular weight of 5000 to 500,000, preferably 10,000 to 200,000.

The conditions to synthesize compounds (5-2) by reaction between compounds (10) and compounds (11) are similar to those to synthesize compounds (5-1) described above.

Preferable examples of compounds (12) are those shown below.

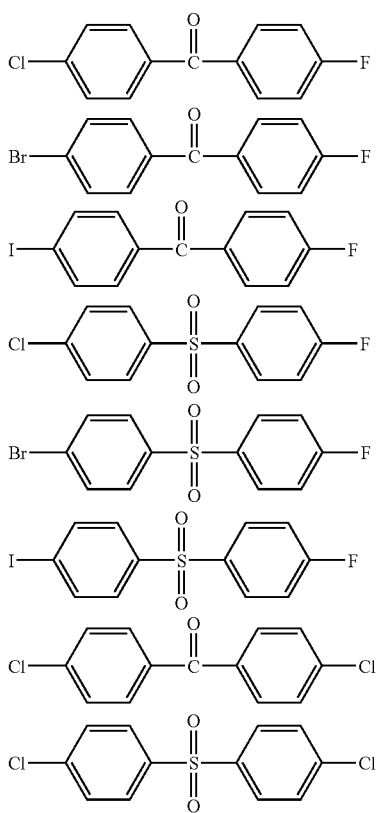

As such, the compounds having a fluorine atom and a halogen atom other than a fluorine atom are appropriately employed to prepare active fluoro-terminated compounds since the fluorine atom is inactive and the other halogen atoms are active in such compounds under reactions that utilize a catalyst described above.

Compound (6-1)

Preferable examples of compounds (6-1) are those shown below.

Compound (6-2)

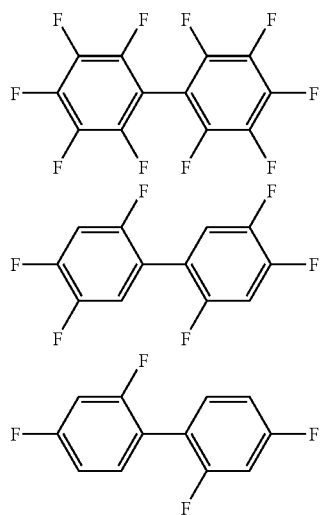

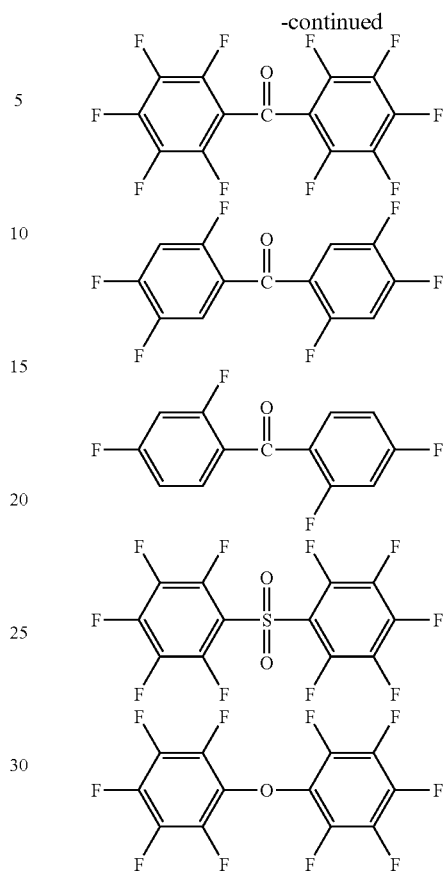

Examples of compounds (6-2) are those shown below.

Compound (7)

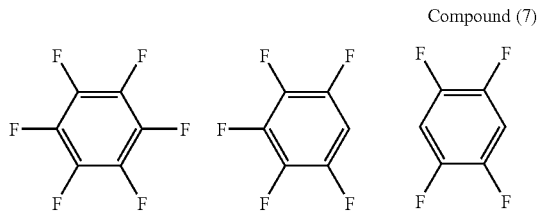

Preferable examples of compounds (7) are those shown below.

Compound (8-1)

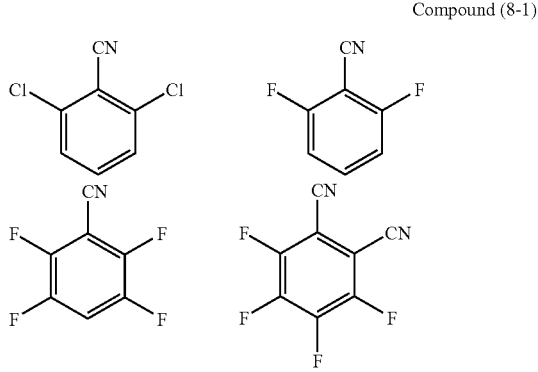

-continued

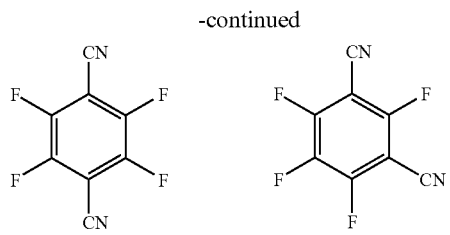

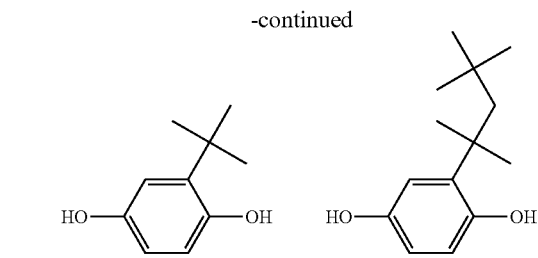

Preferable examples of compounds (8-1) are those shown below.

Examples of compounds (8-2) include 4,4'-biphenol, bis(4-hydroxyphenyl)sulfone, bis(4-hydroxyphenyl)ketone, 2,2-bis(4-hydroxyphenyl)propane, 2,2-bis(4-hydroxyphenyl)-1,1,1,3,3,3-hexafluoropropane, 2,2-bis(4-hydroxy-3,5-dimethylphenyl)propane, 2,2-bis(4-hydroxy-3-methylphenyl)propane, bis(4-hydroxy-2,5-dimethylphenyl)methane, bis(4-hydroxy-3,5-dimethylphenyl)methane, bis(4-hydroxyphenyl)methane, 1,1-bis(4-hydroxyphenyl)ethane, 2,2-bis(4-hydroxyphenyl)butane, 3,3-bis(4-hydroxyphenyl)pentane, 2,2-di(4-hydroxydiphenyl)-4-methylpentane, 2,2-bis(4-hydroxyphenyl)phenylethane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl)fluorene, 9,9-bis(3,5-diphenyl-4-hydroxyphenyl)fluorene, 1,1-bis(4-hydroxyphenyl)cyclohexane and 1,1-bis(4-hydroxyphenyl)cyclopentane.

Synthesis of Polyarylene Having Sulfonic Ester Group

Reaction formulas are exemplarily shown for synthesizing polyarylene copolymers from compounds (5-1) or (5-2), compounds (6-1) or (6-2), compounds (7), and compounds (8-1) or (8-2).

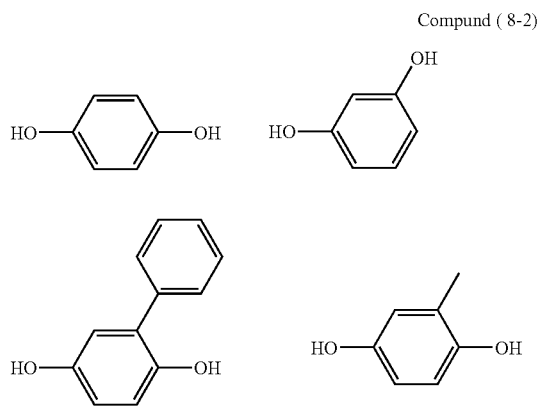

Compund (8-2)

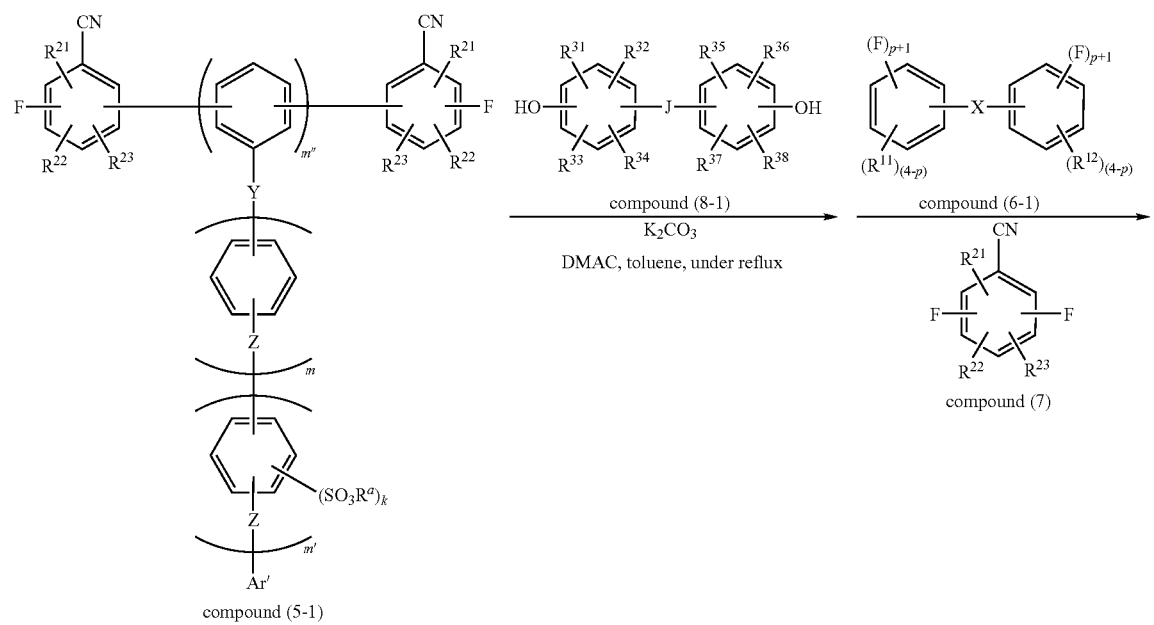

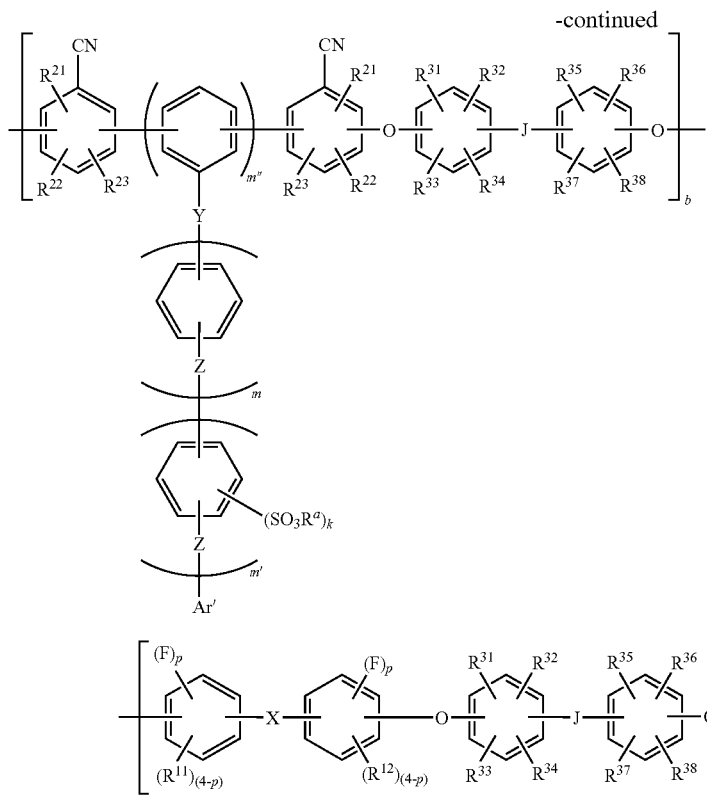

-continued

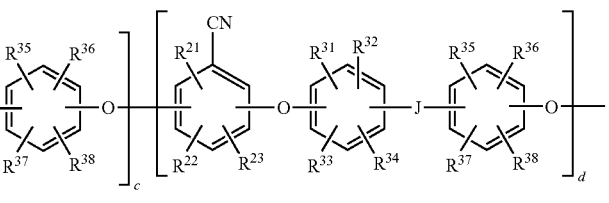

in the formulas above, the respective b, c and d represent the number of repeating units.

As shown, a polyarylene copolymer may be synthesized by converting a compound (8-2) into a reactive phenoxide through adding potassium carbonate, and reacting with compounds (5-1), (6-1) and (7) at 50 to 200 degrees C. for 1 to 30 hours using an aprotic polar solvent such as dimethylacetamide, N-methyl pyrrolidone and dimethyl sulfoxide.

Alkaline metals such as lithium, sodium and potassium, or hydrides, hydroxides or carbonates thereof and the like are added to the phenol compounds (8-2) within a polar solvent having a higher dielectric constant such as N-methyl-2-pyrrolidone, N,N-dimethylacetamide, sulfolane, dimethylsulfone and dimethylsulfoxide, in order to convert phenol compounds (8-2) into an alkaline metal salt.

Alkaline metals are added into the reaction in somewhat excessive amount over the hydroxyl group of the phenol compounds, usually 1.1 to 2.0 times, preferably 1.2 to 1.5 times of the hydroxyl equivalent weight. Another solvent may co-exist with the reaction solvent so as to remove the water generated under the condensation reaction from the reaction mixture through an azeotropic process; examples of the solvent for the azeotropic process include benzene, toluene, xylene, cumene, ethylbenzene, hexane, cyclohexane, heptane, octane, nonane, decane, decahydronaphthalene, chlorobenzene, dioxane, tetrahydrofuran, anisole and phenetol.

Usually, the amounts of the compounds expressed by mole ratio satisfy the following relation:

[(8-1) or (8-2)]/[(5-1) or (5-2)+(6-1) or (6-2)+ (7)]=1.25/1.00 to 1.00/1.25 in which the numeric sign between parentheses mean the mole number of the corresponding compound, e.g. (8-1) means the mole number of compound (8-1).

In terms of the number of repeating units in the formulas described above, the mole ratio [c/(b+c+d)] is 0.01 to 0.9999, preferably 0.05 to 0.9999, more preferably 0.10 to 0.9999.

Hydrolysis of Sulfonic Ester Group

The sulfonic ester group within the resulting polyarylenes having a sulfonic ester group may be hydrolyzed by the methods below:

(i) polyarylene having a sulfonic ester group is poured into an excess amount of water or alcohol containing a small amount of HCl and the mixture is stirred for no less than 5 minutes;

(ii) polyarylene having a sulfonic ester group is reacted in trifluoroacetic acid at 80 to 120 degrees C. for 5 to 10 hours;

(iii) polyarylene having a sulfonic ester group is reacted at 80 to 150 degrees for about 3 to 10 hours within a solvent such as N-methylpyrrolidone that contains lithium bromide of 1 to 5 times mole based on the amount of sulfonic ester group ($-SO_3R$) of the polyarylene, then HCl is added to the reaction mixture.

2. Production Method Through Sulfonation with Sulfonating Agent

Methods for producing sulfonated polyarylenes will be explained that utilize post-sulfonation in the following. The sulfonated polyarylenes in accordance of the present invention may be produced by reacting a compound expressed by formula (5-3) or (5-4) (hereinafter sometimes referred to as "compound (5-3)" or "compound (5-4)"), a compound expressed by formula (6-1) or (6-2), a compound expressed by formula (7) (hereinafter sometimes referred to as "compound (7)"), and a compound expressed by formula (8-1) or (8-2) (hereinafter sometimes referred to as "compound (8-1)" or "compound (8-2)") in a way similar to that described above, thereby to synthesize a non-sulfonated polyarylene, then the polyarylene is sulfonated by a conventional process using a sulfonating agent. The resulting sulfonated polyarylene in such a method possesses the constitutional units (1) to (4).

Compound (5-3)

In the formula (5-3), Ar″ represents an aromatic group having no substituent. Specific examples of the substituents include phenyl, naphthyl, anthryl, phenanthryl, biphenyl groups and the like; among these, phenyl and naphthyl groups are more preferable. Examples of the compounds (5-3) are as follows:

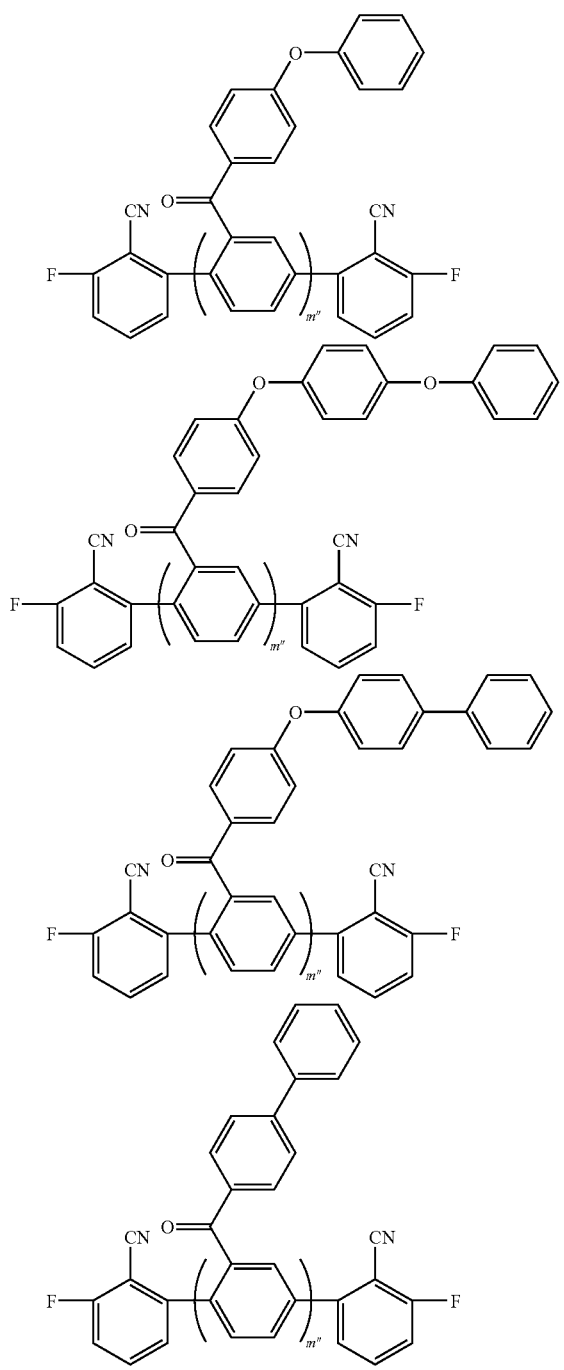

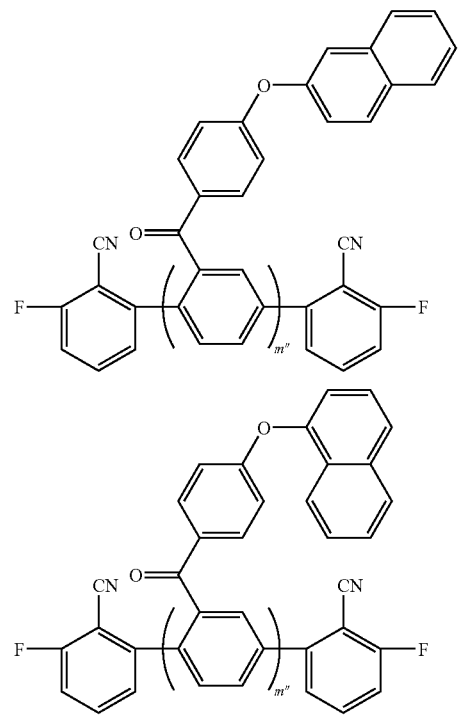

The compounds (5-3) may be synthesized by such a method that a compound capable of forming the constructional unit expressed by the formula (13) shown below (hereinafter sometimes referred to as "compound (13)") and the compound (11) described above are employed as monomers and reacted together.

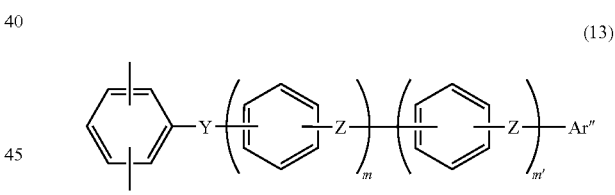

In the formula (13), the meanings of Y, Z, m and m' are the same as those defined in formula (1); the meaning of Ar″ is the same as that defined in formula (5-3).

The compounds (5-3) contain 5 to 99.99 mole %, preferably 10 to 99.99 mole %, more preferably 20 to 99.99 mole % of the constitutional unit expressed by the formula (13), and 0.01 to 95 mole %, preferably 0.01 to 90 mole %, more preferably 0.01 to 80 mole % of the constitutional unit expressed by the formula (11), and have a number average molecular weight of 5000 to 500,000, preferably 10,000 to 200,000.

The compounds (13) may be, for example, those described in Japanese Unexamined Patent Application Laid-Open Nos. 2001-342241 and 2002-293889.

The conditions for synthesizing compounds (5-3) by reaction between compounds (13) and compounds (11) are similar to those to synthesize compounds (5-1) described above.

Compound (5-4)
Preferable examples of the compounds (5-4) described above are shown below.
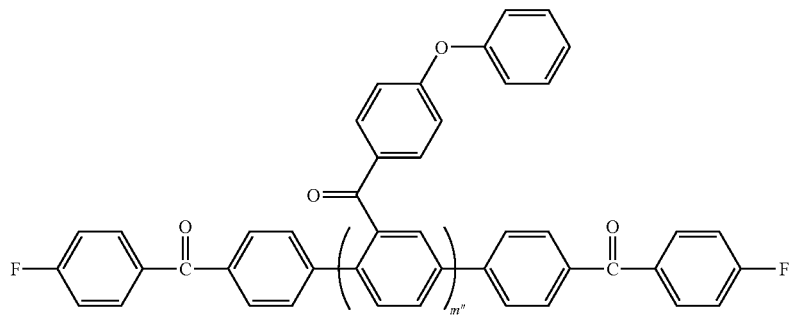
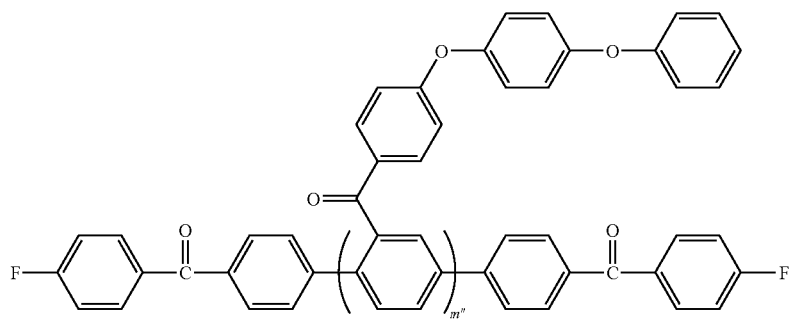
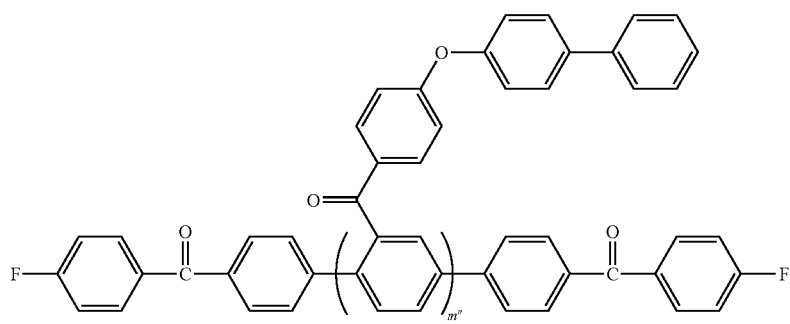
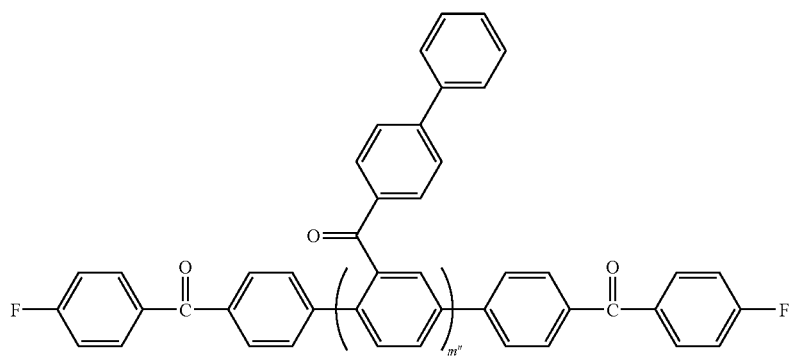

-continued

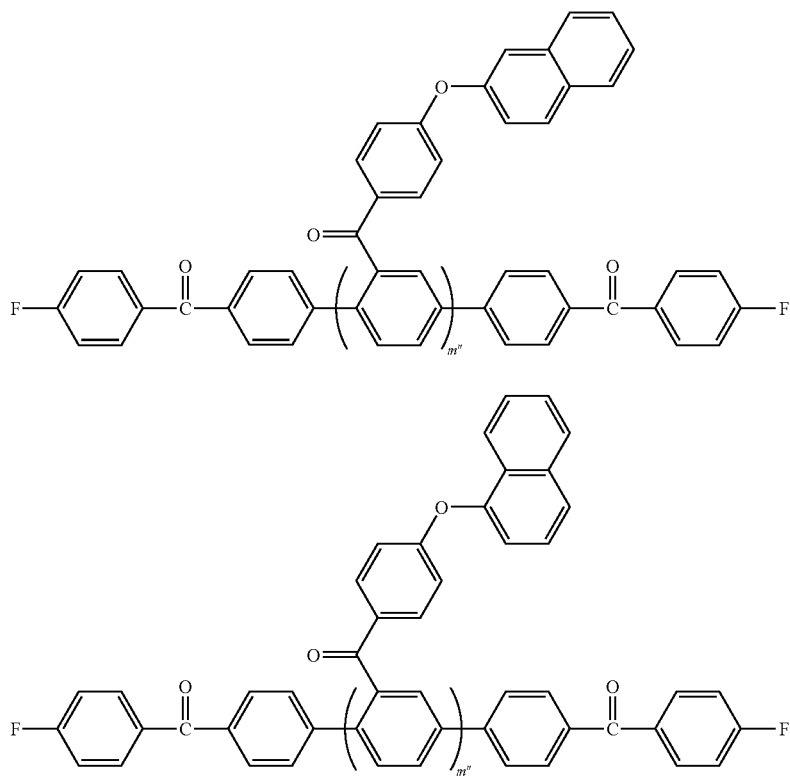

The compounds (5-4) may be synthesized by such a method that the compounds (13) and the compounds (12) described above are employed as monomers and reacted together. The compounds (5-4) contain 5 to 99.99 mole %, preferably 10 to 99.99 mole %, more preferably 20 to 99.99 mole % of the constitutional unit expressed by the formula (13), and 0.01 to 95 mole %, preferably 0.01 to 90 mole %, more preferably 0.01 to 80 mole % of the constitutional unit expressed by the formula (12), and have a number average molecular weight of 5000 to 500,000, preferably 10,000 to 200,000.

The conditions to synthesize compounds (5-4) by reaction between compounds (13) and compounds (12) are similar to those for synthesizing the compounds (5-1) described above.

Synthesis of Non-Sulfonated Polyarylene

Polyarylene copolymers for sulfonation precursors may be prepared by reaction of a compound (5-3) or (5-4), compound (6-1) or (6-2), compound (7), and compound (8-1) or (8-2).

Sulfonation

The resulting non-sulfonated polyarylenes may be sulfonated, for example, in the way described in Japanese Unexamined Patent Application Laid-Open No. 2001-342241, and thereby sulfonated polyarylenes according to the present invention may be prepared. The polymerization conditions are the same as those described above.

Preferably, the resulting sulfonated polyarylenes contain 0.5 to 3.0 meq/g, more preferably 0.8 to 2.8 meq/g of sulfonic acid group.

3. Production Method by Reaction of Reactive Functional Group and Sulfonating Agent Method for introducing sulfonic acid group into non-sulfonated polyarylenes will be explained in the following that utilize the reaction between a reactive functional group and a sulfonating agent. The sulfonated polyarylenes in accordance with the present invention may be produced by reacting a compound expressed by formula (5-5) or (5-6) (hereinafter sometimes referred to as "compound (5-5)" or "compound (5-6)"), a compound expressed by formula (6-1) or (6-2), a compound expressed by formula (7), and a compound expressed by formula (8-1) or (8-2), thereby producing a polyarylene copolymer having a functional group which a compound expressed by formula (9-1) or (9-2) (hereinafter sometimes referred to as "compound (9-1)" or "compound (9-2)") is reacted. The resulting copolymer having a sulfonic acid group has the constitutional units (1) to (4) described above.

Compound (5-5)

In the formula (5-5), Ar''' represents an aromatic group having a substituent expressed by —OM or —SM. Examples of the aromatic groups include phenyl, naphthyl, anthryl, phenanthryl and the like; among these, phenyl and naphthyl groups are more preferable. M represents a hydrogen atom or alkaline atom. Examples of the alkaline metal atoms include lithium, sodium and potassium atoms.

Examples of the compounds (5-5) are as follows:

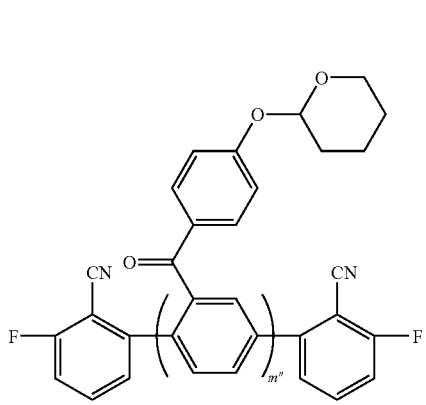

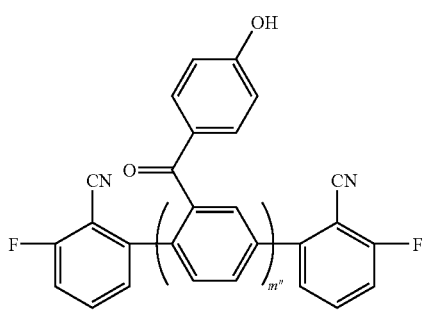

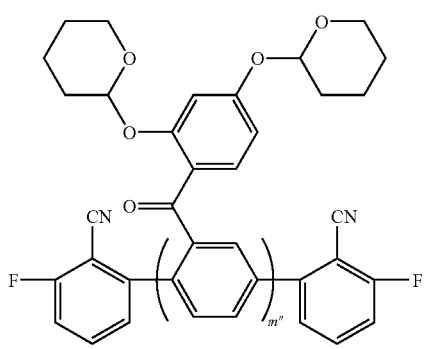

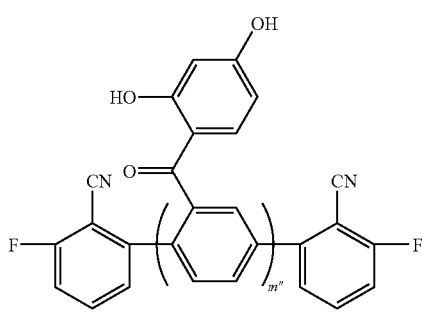

-continued

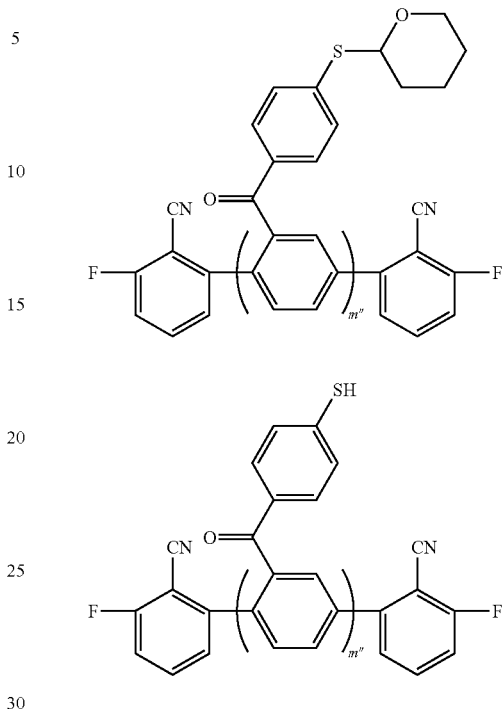

The compounds (5-5) may be synthesized by such a method that a compound capable of forming the constructional unit expressed by the formula (14) shown below (hereinafter sometimes referred to as "compound (14)") and a compound (11) are employed as monomers and reacted together.

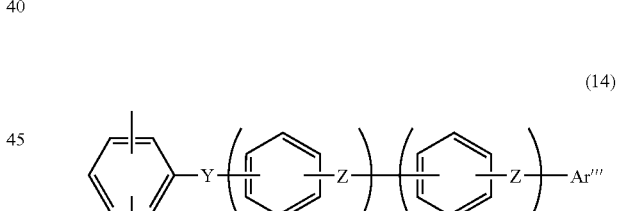

(14)

The compounds (5-5) contain 5 to 99.99 mole %, preferably 10 to 99.99 mole %, more preferably 20 to 99.99 mole % of the constitutional unit expressed by the formula (14), and 0.01 to 95 mole %, preferably 0.01 to 90 mole %, more preferably 0.01 to 80 mole % of the constitutional unit expressed by the formula (11), and have a number average molecular weight of 5,000 to 500,000, preferably 10,000 to 200,000.

The compounds (14) may be those described, for example, in Japanese Unexamined Patent Application Laid-Open Nos. 2005-36125 and 2005-60625.

The conditions to synthesize compounds (5-5) by reaction between compounds (14) and compounds (11) are similar to those to synthesize compounds (5-1) described above.

Compound (5-6)
Preferable examples of the compounds (5-6) described above are shown below.
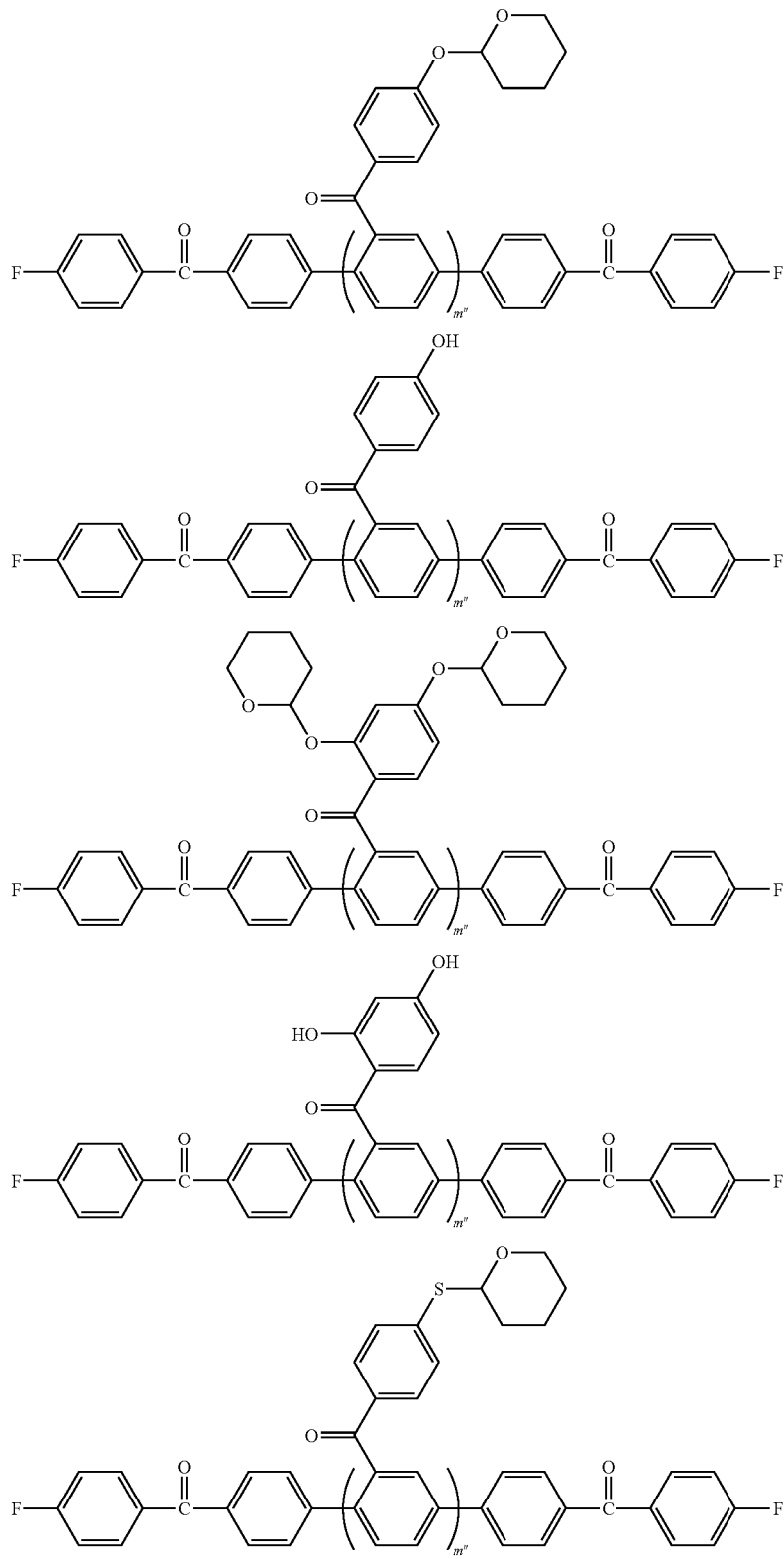

-continued

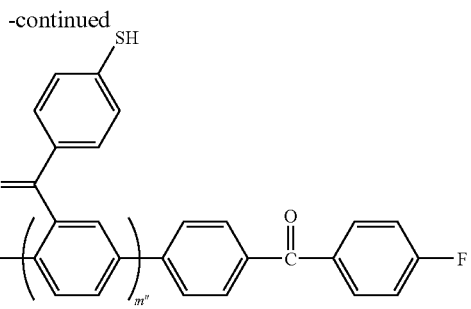

The compounds (5-6) may be synthesized by such a method that the compound (14) and the compound (12) described above are employed as monomers and reacted together. The compounds (5-6) contain 5 to 99.99 mole %, preferably 10 to 99.99 mole %, more preferably 20 to 99.99 mole % of the constitutional unit expressed by the formula (14), and 0.01 to 95 mole %, preferably 0.01 to 90 mole %, more preferably 0.01 to 80 mole % of the constitutional unit expressed by the formula (12), and have a number average molecular weight of 5,000 to 500,000, preferably 10,000 to 200,000.

The conditions to synthesize compounds (5-6) by reaction between compounds (14) and compounds (12) described above are similar to those to synthesize compounds (5-1) described above.

Compounds (9-1) and (9-2)

Examples of the compounds (9-1) and (9-2) described above may be those described, for example, in Japanese Patent Application No. 2003-295974.

Synthesis of Polyarylene Having Reactive Functional Group

Polyarylenes having a reactive functional group may be prepared by reaction of compounds (5-5) or (5-6), compounds (6-1) or (6-2), compounds (7) and compounds (8-1) or (8-2).

Introduction of Sulfonic Acid Group by Reaction of Reactive Functional Group and Sulfonating Agent Sulfonated polyarylenes according to the present invention may be obtained by reacting the resulting polyarylenes having a reactive functional group with the compounds (9-1) or (9-2). The conditions to react the compounds (9-1) or (9-2) may be, for example, those described in Japanese Unexamined Patent Application Laid-Open No. 2005-60625.

Solid Polymer Electrolyte Membrane

The sulfonated polyarylenes may be utilized in a condition of membrane, solution or powder, preferably is utilized in a condition of membrane or solution (hereinafter sometimes referring the condition of membrane as "polymer electrolyte membrane" or "proton conductive membrane").

The polymer electrolyte membranes may be produced by such a casting process that a sulfonated polyarylene is mixed with an organic solvent, then the mixture is flowed over a substrate to form a film.

The substrate may be properly selected without particular limitations from those utilized in conventional solution casting processes, for example, the substrate is of plastics or metals, preferably of thermoplastic resins such as polyethylene terephthalate (PET) film.

The solvent for mixing with the sulfonated polyarylenes may be properly selected without particular limitations from those capable of dissolving or swelling copolymers; examples thereof include aprotic polar solvents such as N-methyl-2-pyrrolidone, N,N-dimethyl formamide, gamma-butyrolactone, N,N-dimethyl acetamide, dimethyl sulfoxide, dimethyl urea, dimethyl imidazolidinone and acetonitrile; chlorinated solvents such as dichloromethane, chloroform, 1,2-dichloroethane, chlorobenzene and dichlorobenzene; alcohols such as methanol, ethanol, propanol, isopropyl alcohol, sec-butyl alcohol and tert-butyl alcohol; alkyleneglycol monoalkylethers such as ethyleneglycol monomethylether, ethyleneglycol monoethylether and propyleneglycol monoethylether; ketones such as acetone, methyl ethyl ketone, cyclohexanone and gamma-butyrolactone; ethers such as tetrahydrofuran and 1,3-dioxane. These solvents may be used alone or in combination. Among these, N-methyl-2-pyrrolidone (hereinafter referred to as "NMP") is preferable from the viewpoint of solubility and solution viscosity.

When a solvent mixture of aprotic polar solvent and the other solvent is employed for the solvent, the content of the aprotic polar solvent is 25 to 95 mass %, preferably 25 to 90 mass %, the content of the other solvent is 5 to 75 mass %, preferably 10 to 75 mass %, with a proviso that the total of the contents is 100 mass %. The other solvent within the range may provide an excellent effect to decrease the solution viscosity; preferably, the combination of the solvents is such that NMP is selected for the aprotic polar solvent and methanol is selected for the other solvent in order to decrease the viscosity in broader composition range.

The concentration of the polymer in the solution dissolving the polymer and additives depends on the molecular weight of the sulfonated polyarylene; typically the concentration of the polymer is 5 to 40 mass %, preferably 7 to 25 mass %. When the polymer concentration is below this range, thicker membranes are difficult to obtain, and pinholes tend to occur. On the other hand, when the polymer concentration is above the range, the solution viscosity is too high to properly form the films, and also the surface smoothness may be deteriorated.

The solution viscosity is typically 2,000 to 100,000 mPa·s, preferably 3,000 to 50,000 mPa·s, while the solution viscosity depends on the molecular weight of the polyarylene copolymer, concentration of the polymers, and concentration of additives. When the solution viscosity is below this range, the retaining property of the solution is likely to be insufficient, thus the solution sometimes flows out of the substrate, and when the solution viscosity is more than the range, the viscosity is too high to extrude the solution from dies, thus the films are difficult to produce under flowing processes.

The resulting non-dried films are immersed into water after the films are produced, thereby the organic solvent in the non-dried film can be replaced with water, and the residual solvent can be reduced within the proton conductive membranes. The non-dried films may be pre-dried before immersing them into water. The pre-drying is typically carried out under conditions of 50 to 150 degrees C. for 0.1 to 10 hours.

When the non-dried films (hereinafter including "non-dried film after pre-drying") are immersed into water, the film pieces may be immersed into water in a batch method; alternatively, a continuous method may be carried out such that an intact laminate film formed on a substrate film, e.g., PET or a membrane separated from the substrate, is immersed into water and wound up successively. In the batch method, it is preferred that the non-dried films be fitted into frames and then immersed into water so as to prevent wrinkles on the surface of the films after the processing.

The amount of water utilized when immersing the non-dried films is 10 weight parts or more, preferably 30 weight parts or more, more preferably 50 weight parts or more based on one weight part of the non-dried films. When the amount of water is in the range, the amount of solvent may be reduced that remains within the resulting proton conductive membranes. Furthermore, the control of the concentration of organic solvents at or under a certain level, because the water for immersion is exchanged or overflowed properly, for example, is effective to reduce the solvent that remains within the resulting solid polymer electrolyte membranes. Furthermore, the concentration of organic solvent in the water is effectively homogenized by stirring, for example, in order that the two-dimensional distribution of residual organic solvent can be reduced within the solid polymer electrolyte membranes.

The temperature of water, in which the non-dried films are immersed into water, is typically 5 to 80 degrees C., preferably 10 to 60 degrees C. from the viewpoint of replacing rate and easy handling. The higher the temperature, the higher the rate to replace the organic solvent with water; however, the surface condition of the polymer electrolyte membranes may be deteriorated after drying since the amount of water absorbed into the films tend to increase with increase in temperature. The immersing period of films depends on the initial content of residual solvent, amount of used water, and processing temperature; the period is typically 10 minutes to 240 hours, preferably 30 minutes to 100 hours.

When non-dried films are dried after immersing into water, membranes may be obtained with lower content of solvents. The content of residual solvents within membranes obtained in such processes is usually no more than 5 mass %. Due to selecting the immersion conditions appropriately, the content of the residual solvent may be decreased to as low as no more than 1 mass %; such lower solvent content may be due to the conditions, for example, that the water amount is 50 weight parts or more and the amount of the non-dried film is 1 weight part, the water temperature is 10 to 60 degrees C. at the immersion, and the immersion period is 10 minutes to 10 hours.

After immersing the non-dried films into water as described above, the films are dried at 30 to 100 degrees C., preferably at 50 to 80 degrees C. for 10 to 180 minutes, preferably for 15 to 60 minutes, then are dried at 50 to 150 C., preferably under a vacuum of 500 mmHg to 0.1 mmHg for 0.5 to 24 hours, and thereby the polymer electrolyte membranes may be obtained.

The thickness of the resulting proton conductive membranes is typically 10 to 100 μm, preferably 20 to 80 μm in the dried condition.

In addition, the polyarylene copolymers containing the sulfonic ester group or the alkaline metal salt of sulfonic acid may be formed into films by the processes described above and subjected to appropriate post-treatment such as hydrolysis or acid treatment, and thereby proton conductive membranes may be produced from the sulfonated polyarylenes.

In addition to the sulfonated polyarylenes, inorganic acids such as sulfuric acid or phosphoric acid, phosphoric acid glass, tungstic acid, phosphate hydrate, beta-alumina proton-derivative substitution, proton-conductive inorganic particles such as proton-including oxide, carboxylic acid-containing organic acid, sulfonic acid-containing organic acid, phosphoric acid-containing organic acid, or appropriate amount of water may also be incorporated in the process for producing proton conductive membranes.

The sulfonated polyarylenes may contain an antioxidant, preferably a hindered phenol compound having a molecular weight of no less than 500; such an antioxidant may enhance the durability with respect to electrolytes.

Specific examples of the hindered phenol compounds, which may be used in the present invention, are triethyleneglycol bis[3-(3-t-butyl-5-methyl-4-hydroxyphenyl)propionate (product name: IRGANOX 245), 1,6-hexanediol bis[3-(3,5-di-t-butyl-4-hydroxyphenyl)propionate] (product name: IRGANOX 259), 2,4-bis-(n-octylthio)-6-(4-hydroxy-3,5-di-t-butylanilino)-3,5-triazine (product name: IRGANOX 565), pentaerythrityl-tetrakis[3-(3,5-di-t-butyl-4-hydroxyphenyl)propionate] (product name: IRGANOX 1010), 2,2-thio-di-ethylenebis[3-(3,5-di-t-butyl-4-hydroxyphenyl)propionate] (product name: IRGANOX 1035), octadecyl-3-(3,5-di-t-butyl-4-hydroxyphenyl)propionate] (product name: IRGANOX 1076), N,N-hexamethylene bis(3,5-di-t-butyl-4-hydroxy-hydrocinnamamide) (product name: IRGANOX 1098), 1,3,5-trimethyl-2,4,6-tris(3,5-di-t-butyl-4-hydroxybenzyl)benzene (product name: IRGANOX 1330), tris-(3,5-di-t-butyl-4-hydroxybenzyl)-isocyanurate (product name: IRGANOX 3114), and 3,9-bis[2-[3-(3-t-butyl-4-hydroxy-5-methylphenyl)propionyloxy]-1,1-dimethylethyl]-2,4,8,10-tetraoxaspiro[5.5]undecane (product name: Sumilizer GA-80).

Preferably, the hindered phenol compounds are used in an amount of 0.01 to 10 weight parts based on 100 weight parts of the sulfonated polyarylenes.

Membrane-Electrode Assemblies for Solid Polymer Electrolyte Fuel Cell

The membrane-electrode assemblies according to the present invention utilized for solid polymer electrolyte fuel cells may be obtained by providing an anode electrode layer and a cathode electrode layer disposed on opposite sides of the solid polymer electrolyte membrane.

The catalysts on electrodes in the present invention are preferably a supported catalyst in which platinum or platinum alloy is supported on a porous carbon material. Carbon blacks or activated carbons may be preferably utilized for the porous carbon material. Examples of the carbon blacks include channel blacks, furnace blacks, thermal blacks, and acetylene blacks; the activated carbons may be those produced through carbonizing and activating various carbon-containing materials.

Catalysts formed by supporting platinum or a platinum alloy on a carbon carrier may be utilized; platinum alloys may afford stability and activity to electrode catalysts. Preferably, platinum alloys are utilized which are formed from platinum and at least a metal selected from platinum group metals other than platinum (i.e., ruthenium, rhodium, palladium, osmium or iridium), or metals of other groups such as cobalt, iron, titanium, gold, silver, chrome, manganese, molybdenum, tungsten, aluminum, silicon, rhenium, zinc or tin; the platinum alloys may include an intermetallic compound which is formed of platinum and the other metal alloyable with platinum.

Preferably, the supported content of platinum or platinum alloy (i.e. mass % of platinum or platinum alloy on the base of the overall weight of catalyst) is 20 to 80 mass %, in particular 30 to 60 mass %, since the range may afford higher output power. When the supported content is less than 20 mass %, sufficient output power may possibly not be attained, when over 80 mass %, the particles of platinum or platinum alloy may not be supported on the carrier of carbon material with sufficient dispersability.

The primary particle size of the platinum or platinum alloy is preferably 1 to 20 nm so as to attain highly active gas diffusion electrodes; in particular, the primary particle size is preferably 2 to 5 nm to ensure larger surface area of platinum or platinum alloy from the viewpoint of reaction activity.

The catalyst layers in the present invention include, in addition to the supported catalyst, an ion conductive polymer electrolyte or ion conductive binder that contains a sulfonic group. Usually, the supported catalysts are covered with the electrolyte, and thus protons ($H^+$) travel through the pathway of the connecting electrolyte.

Perfluorocarbon polymers represented by Nafion, Flemion and Aciplex are appropriately utilized for the ion conductive polymer electrolyte containing a sulfonic acid group. Ion conductive polymer electrolytes based on the aromatic hydrocarbon compounds such as sulfonated polyarylenes described in this specification may be utilized in place of the perfluorocarbon polymers.

Preferably, the ion conductive binders are included in a weight ratio of 0.1 to 3.0, preferably 0.3 to 2.0 in particular based on the weight of catalyst particles. When the ratio of the ion conductive binder is less than 0.1, proton may not be conducted into the electrolyte, thus resulting possibly in insufficient power output; when the ratio is more than 3.0, the ion conductive binder may cover the catalyst particles completely, thus gas cannot reach the platinum, possibly resulting in insufficient power output.

The method for forming the catalyst layer may be based on conventional methods such as: the supported catalyst and perfluorocarbon polymer having a sulfonic acid group are dispersed into a dispersion medium to prepare a dispersion, optionally, a water repellent agent, pore-forming agent, thickener, diluent solvent and the like are added to the dispersion, then the dispersion is sprayed, coated or filtered on an ion-exchange membrane, gas-diffusion layer or flat plate. In the case in which the catalyst layer is not formed on the ion-exchange layer directly, the catalyst layer and the ion-exchange layer are preferably connected by a hot-press or adhesion process (see Japanese Unexamined Patent Application Laid-Open No. 07-220741 etc.).

The assemblies of solid polymer electrolyte membranes and electrodes according to the present invention may be formed solely of an anodic catalyst layer, a solid polymer electrolyte membrane, and a cathodic catalyst layer; more preferably, a gas diffusion layer formed of conductive porous material such as carbon paper and carbon cloth is disposed outside the catalyst layer along with the anode and cathode. The gas diffusion layer may perform as an electric collector, therefore, the combination of the gas diffusion layer and the catalyst layer is referred to as "electrode" in this specification when the gas diffusion layer is provided.

The method for producing the assemblies of solid polymer electrolyte membranes and electrodes may be selected from various methods such as: a catalyst layer is formed directly on an ion-exchange membrane and is sandwiched with a gas diffusion layer as required; a catalyst layer is formed on a substrate for a gas diffusion layer such as carbon paper, then the catalyst layer is connected with an ion-exchange membrane; a catalyst layer is formed on a flat plate, the catalyst layer is transferred onto an ion-exchange membrane, then the flat plate is peeled away, and sandwiched with a gas diffusion layer as required.

In the solid polymer electrolyte fuel cells equipped with the assemblies of solid polymer electrolyte membranes and electrodes according to the present invention, oxygen-containing gas is supplied to the cathode and hydrogen-containing gas is supplied to the anode. Specifically, separators having channels for gas passage are disposed outside the both electrodes of the assembly of solid polymer electrolyte membrane and electrode, gas is flowed into the passage, and thereby the gas for fuel is supplied to the assembly of solid polymer electrolyte membrane and electrode.

EXAMPLES

The present invention will be explained more specifically with reference to examples, which are not intended to limit the scope of the present invention.

The methods or ways to determine various measurements in the examples are also illustrated in the following. The sulfonated polymer film utilized in the various measurements for a proton conductive membrane was prepared by a casting process after dissolving the resulting sulfonated polymer into N-methylpyrrolidone.

Molecular Weight

Weight average molecular weight (Mw) of the copolymers was determined as the molecular weight based on polystyrene standard by gel permeation chromatography (GPC) using an NMP buffer solution as the solvent. The NMP buffer solution was prepared so as to contain 3 L of NMP, 3.3 ml of phosphoric acid and 7.83 g of lithium bromide.

Ion-Exchange Capacity

The resulting sulfonated polymers were washed with distilled water until the washed water became neutral so as to remove free residual acid sufficiently, then were dried. The polymers were then weighed in a predetermined amount, dissolved into a mixture solvent of THF/water, and titrated with a NaOH standard solution. Ion-exchange capacity was determined from the neutralization point in terms of equivalents of sulfonic acid group (meq/g).

Content of Fluorine Atom

The content of fluorine atom was determined by X-ray fluorescence analysis.

Measurement of Tensile Strength and Elastic Modulus

Tensile strength and elastic modulus were determined in accordance with JIS K 7113 in which the pulling rate was 50 mm/min. The elastic modulus was calculated in a way that the distance between markers was regarded as the distance between chucks. Test samples were conditioned at 23±2 degrees C. of temperature and 50±5% of relative humidity (RH) for 48 hours in accordance with JIS K 7113. The test samples were punched out by use of 7th dumbbell according to JIS K 6251, the tensile property measuring equipment was INSTRON type 5543.

Bendability and Crack Proofing

Sulfonated polymer films, formed respectively into a membrane 50 μm thick, were measured as to the number of times flexed until breakage under the conditions of a bending rate of 166 times/min, a load of 200 g and bending angle of 135 degrees. When the number of times flexed was 500 or more until breakage, the test sample was evaluated as "satisfactory", and when the number of times flexed was less than 500 until the breakage, the test sample was evaluated as "unsatisfactory".

Measurement of Proton Conductivity

AC resistance was first measured by platinum wires 0.5 mm in diameter being pushed onto a surface of test membrane, formed into a strip of 5 mm width, the test membrane was disposed in a controlled temperature/humidity chamber and then AC impedance was measured between the platinum wires. The impedance was measured for AC 10 kHz in a condition of 85 degrees C. and relative humidity 90%. The measurements were performed by use of Chemical Impedance Measuring System (by NF Corporation), the controlled temperature/humidity chamber was JW241 (by Yamato Scientific Co., Ltd.). Five platinum wires were pushed onto the surface at an interval of 5 mm, the distance between the lines was varied within 5 to 20 mm, and AC resistance was measured. The specific resistance of membranes was then calculated from the slope of the relationship between line distances and resistances, and proton conductivity was determined as the inverse value of the specific resistance.

Specific Resistance $R$ (ohm·cm)=0.5 (cm)×Membrane Thickness (cm)×Slope (ohm/cm)

Hot Water Resistance

Films were cut into a size of 2.0 cm by 3.0 cm and weighed to prepare test pieces. The test pieces were conditioned at 24 degrees C. and 50% RH, then were disposed into a polycarbonate bottle of 250 ml, distilled water of about 100 ml was added into the bottle, then the test pieces were heated at 120 degrees C. for 24 hours by use of Pressure Cooker Tester (PC-242HS, by Hirayama MFS Corp.). After the heating period, the films were taken out of the hot water, the water on the surface was wiped off lightly by use of KimWipe paper, and weighed in the wet condition to thereby determine the moisture content. The films were also measured as to the dimensions to determine the swelling degree. In addition, the films were conditioned at 24 degrees C. and 50% RH, the moisture was evaporated off, and then the films were weighed after the hot water test to thereby determine the residual ratio of weight.

Fenton Test

Fenton reagent was prepared that contained 3 mass % of hydrogen peroxide and iron sulfate heptahydrate of which the concentration corresponded to 20 ppm of iron ion. The Fenton reagent of 200 g was added into a polyethylene container of 250 ml, into which sulfonated films cut into 3 cm by 4 cm were inserted, then the container was sealed and immersed into a water bath controlled at 40 degrees C. for 30 hours as the Fenton test. The films were taken out, rinsed with deionized water, subjected to conditions at 25 degrees C. and 50% RH for 12 hours, and then measured with respect to various physical properties. Weight retention under the Fenton test was calculated from the following equation.

Weight Retention (%)=Film Weight after Test/Film Weight before Test×100

Evaluation of Power Generating Property

MEAs according to the present invention were evaluated with respect to power generating property under the conditions in which the temperature was 70 degrees C., relative humidity was 60%/50% at fuel electrode side/oxygen electrode side, and the current density was 1 A/cm². Pure hydrogen was supplied to the fuel electrode side, and air was supplied to the oxygen electrode side. The durability in power generation was evaluated under two conditions of high load condition and OCV condition. The durability in the high load condition was evaluated under the power generating condition that the cell temperature was 95 degrees C., the current density was 1 A/cm², and relative humidity was 80%/50% at fuel electrode side/oxygen electrode side, then the period up to cross-leak was reported. Durable generating period of 1500 hours or more was considered to be superior and indicated as "satisfactory", while the period of less than 1500 hours was deemed to be poor and indicated as "unsatisfactory". The durability in the OCV condition was evaluated under the power generating conditions, in which the cell temperature was 115 degrees C., and relative humidity was 50%/50% at fuel electrode side/oxygen electrode side, and then the period up to cross-leak was reported. Durable generating period of 500 hours or more was considered to be superior and indicated as "satisfactory", while the period of less than 500 hours was considered to be poor and indicated as "unsatisfactory".

Example 1

Into a 1 L three-necked flask equipped with a stirrer, thermometer and nitrogen inlet were weighed 120.4 g (300 mmol) of 3-(2,5-dichlorobenzoyl)benzenesulfonic acid neopentyl, 2.8 g (18 mmol) of 2-chloro-6-fluorobenzonitrile, 3.93 g (6 mmol) of bis(triphenylphosphine)nickeldichloride, 1.35 g (9 mmol) of sodium iodide, 31.5 g (120 mmol) of triphenylphosphine, and 47.1 g (720 mmol) of zinc, then purging with dry nitrogen gas. To the mixture, 361 mL of N,N-dimethylacetamide (DMAC) was added, the reaction mixture was maintained at 80 degrees C. and was stirred successively for 3 hours, then the reaction mixture was diluted with 365 mL of DMAc, and insoluble matter was filtered. The filtrate was poured into methanol/HCl to solidify the polymer, the solidified polymer was rinsed with methanol, and was air-dried. The solidified and air-dried polymer was re-dissolved into tetrahydrofuran and re-solidified with methanol, and thereby was purified. The resulting polymer was confirmed to be of the formula (30-1) with a number average molecular weight (Mn) of 12,400 and a weight average molecular weight (Mw) of 28,500.

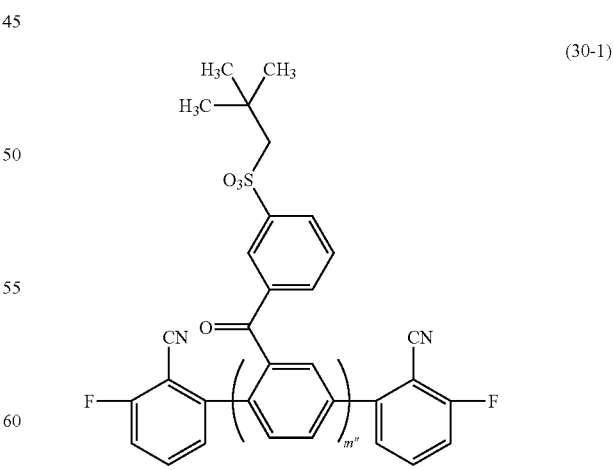

(30-1)

Into a 1 L three-necked flask equipped with a stirrer, thermometer, Dean-Stark apparatus, nitrogen inlet, and cooling pipe were weighed 67.0 g (5.4 mmol) of the resulting polymer of formula (30-1) (Mn: 12,400), 1.65 g (9.6 mmol) of 2,6- dichlorobenzonitrile (2,6-DBN), 20.2 g (60 mmol) of 2,2-bis (4-hydroxyphenyl)-1,1,1,3,3,3-hexafluoropropane (Bis-AF), and 11.7 g (78 mmol) of potassium carbonate. After purging with nitrogen gas, 300 ml of DMAc and 150 ml of toluene were added and stirred, then the reaction liquid was heated to 150 degrees C. and refluxed by use of an oil bath. Water generated through the reaction was trapped in the Dean-Stark apparatus. When water generation fell to nearly zero after three hours, toluene was removed from the Dean-Stark apparatus, the reaction solution was further reacted at 160 degrees C. for 5 hours. Then the reaction solution was cooled to 50 degrees C., followed by adding 15.0 g (45 mmol) of perfluorobiphenyl (PFBP) and polymerizing for additional 2 hours. After the reaction, the reaction solution was diluted with 900 ml of DMAc, to which was added 51.7 g (595 mmol) of lithium bromide. The mixture was stirred for 7 hours, then the reaction liquid was poured into 5 L of acetone to thereby precipitate the product. The resulting product was rinsed with 1N HCl and pure water in order, then dried to obtain the intended polymer of 93 g. The Mw of the resulting polymer was 135,000, and was considered to be the polymer expressed by the formula (30-2). The ion-exchange capacity of the polymer determined to be 2.32 meq/g.

and dried on one side of a carbon paper to form an underlying layer, and thereby two gas diffusion layers formed of the underlying layer and the carbon paper were prepared.

iii) Preparation of Electrode-Coating Membrane (CCM)

To both sides of the solid polymer electrolyte membrane, prepared in the example described above, the catalyst paste described above was coated by use of a bar coater in an amount in which the platinum content was 0.5 mg/cm$^2$, and was dried to prepare an electrode-coating membrane (CCM). In the drying step, a first drying at 100 degrees C. for 15 minutes was followed by a secondary drying at 140 degrees C. for 10 minutes.

iv) Preparation of MEA

An MEA was prepared in a way in which the CCM was gripped with the side of the underlying layer of the gas diffusion layer, then subjected to hot-pressing. In the hot-pressing step, a first hot-pressing at 80 degrees C. and 5 MPa for 2 minutes was followed by a second hot-pressing at 160 degrees C. and 4 MPa for 1 minute.

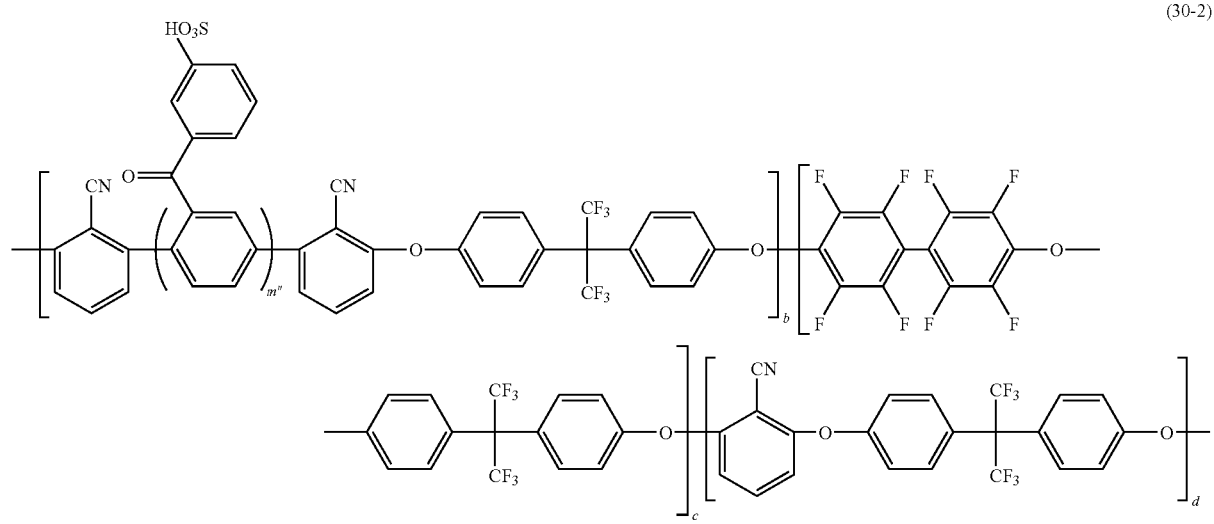

(30-2)

A film 40 μm thick was prepared by a casting process after dissolving the resulting sulfonated polymer in N-methylpyrrolidone.

Preparation of MEA i) Catalyst Paste

Platinum particles were supported onto a carbon black of furnace black having an average particle size of 50 nm in a weight ratio 1:1 of carbon black:platinum thereby to prepare catalyst particles. The catalyst particles were dispersed uniformly in a solution of perfluoroalkylene sulfonic acid polymer compound (Nafion (product name), by DuPont) as an ion conductive binder in a weight ratio 8:5 of ion conductive binder:catalyst particles thereby to prepare a catalyst paste.

ii) Gas Diffusion Layer

The carbon black and polytetrafluoroethylene (PTFE) particles were mixed in a weight ratio 4:6 of carbon black:PTFE particles, the resulting mixture was dispersed uniformly into ethylene glycol to prepare a slurry, then the slurry was coated In addition, a solid polymer electrolyte fuel cell may be constructed by the way that a separator, being also a gas passage, is laminated on the gas diffusion layer.

Example 2

A sulfonated polymer with Mw of 155,000 was prepared in the same manner as Example 1, except that the 2-chloro-6-fluorobenzonitrile was changed to 4.2 g (18 mmol) of 4-chloro-4'-fluorobenzophenone (CFBP), the polymerization was carried out with the resulting copolymer (Mn: 12,000) of 64.8 g (5.4 mmol), and hydrolysis was performed using 49.33 g (294 mmol) of lithium bromide. The ion-exchange capacity of the polymer was 2.29 meq/g.

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 2 was employed.

Example 3

A sulfonated polymer with Mw of 128,000 was prepared in the same manner as Example 1, except that 52.8 g (4.2 mmol) of the polymer expressed by formula (30-1) (Mn: 12,400) and 1.86 g (10.8 mmol) of 2,6-DBN were utilized, PFBP was changed to 8.37 g (45 mmol) of perfluorobenzene (PFB), and 40.2 g (463 mmol) of lithium bromide was utilized. The ion-exchange capacity of the polymer was 2.31 meq/g.

A film of 40 µm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 3 was employed.

Example 4

A sulfonated polymer with Mw of 135,000 was prepared in the same manner as Example 1, except that 63.24 g (5.1 mmol) of the polymer expressed by formula (30-1) (Mn: 12,400), 1.73 g (9.9 mmol) of 2,3,5,6-tetrafluorobenzonitrile and 48.8 g (562 mmol) of lithium bromide was utilized. The ion-exchange capacity of the polymer was 2.28 meq/g.

A film 40 µm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 4 was employed.

Example 5

Into a 1 L three-necked flask equipped with a stirrer, thermometer and nitrogen inlet were weighed 208.1 g (300 mmol) of 1,3-[7-(2,5-dichlorobenzoyl)phenoxy]naphthalene disulfonic acid neopentyl, 2.8 g (18 mmol) of 2-chloro-6-fluorobenzonitrile, 3.93 g (6 mmol) of bis(triphenylphosphine)nickeldichloride, 1.35 g (9 mmol) of sodium iodide, 31.5 g (120 mmol) of triphenylphosphine and 47.1 g (720 mmol) of zinc, then purging with dry nitrogen gas. To the mixture, 361 mL of DMAc was added, the reaction mixture was maintained at 80 degrees C. and was stirred successively for 3 hours, then the reaction mixture was diluted with 365 mL of DMAc, and insoluble matter was filtered. The filtrate was poured into methanol/HCl to solidify the polymer, the solidified polymer was rinsed with methanol, and was air-dried. The solidified and air-dried polymer was re-dissolved into tetrahydrofuran and re-solidified with methanol, thereby was purified. The resulting polymer was confirmed to be of formula (30-3) with Mn of 11,000 and Mw of 23,400.

(30-3)

Into a 1 L three-necked flask equipped with a stirrer, thermometer, Dean-Stark apparatus, nitrogen inlet, and cooling pipe were weighed 52.8 g (4.8 mmol) of the resulting polymer of formula (30-3) (Mn: 11,100), 1.76 g (10.2 mmol) of 2,6-DBN, 20.2 g (60 mmol) of Bis-AF, and 11.7 g (78 mmol) of potassium carbonate. After purging with nitrogen gas, 300 ml of DMAc and 150 ml of toluene were added and stirred, then the reaction liquid was heated to 150 degrees C. and refluxed by use of an oil bath. Water generated through the reaction was trapped into the Dean-Stark apparatus. When water generation fell to nearly zero after three hours, toluene was removed from the Dean-Stark apparatus, the reaction solution was further reacted at 160 degrees C. for 5 hours. Then the reaction solution was cooled to 50 degrees C., followed by adding 15.0 g (45 mmol) of PFBP and polymerization reaction for an additional 2 hours. After the reaction, the reaction solution was diluted with 900 ml of DMAc, to which was added 21.8 g (252 mmol) of lithium bromide. The mixture was stirred for 7 hours, then the reaction liquid was poured into 5 L of acetone to thereby precipitate the product. The resulting product was rinsed with 1N HCl and pure water in order, then dried to obtain the intended polymer of 93 g. The Mw of the resulting polymer was 145,000, and was considered to be the polymer expressed by the formula (30-4). The ion-exchange capacity of the polymer determined to be 2.28 meq/g.

(30-4)

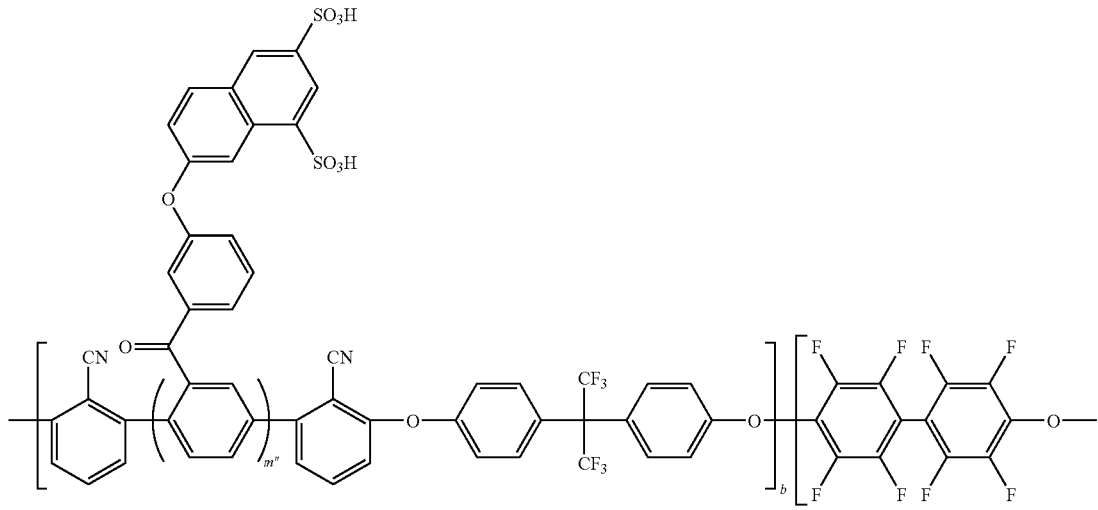

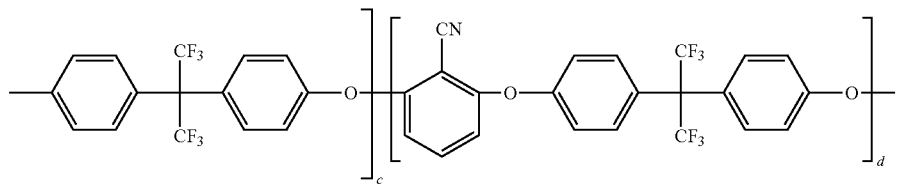

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 5 was employed.

Example 6

A sulfonated polymer containing a sulfonic acid group with Mw of 152,000 was prepared in the same manner as Example 1, except that the 2-chloro-6-fluorobenzonitrile was changed to 4.2 g (18 mmol) of CFBP, the polymerization was carried out with the resulting copolymer (Mn: 11,500) of 62.1 g (5.4 mmol), and hydrolysis was performed using 25.5 g (294 mmol) of lithium bromide. The ion-exchange capacity of the polymer was 2.27 meq/g.

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 6 was employed.

Example 7

Into a 500 ml three-necked flask equipped with a stirrer, thermometer and nitrogen inlet were weighed 84.0 g (193 mmol) of 2,5-dichloro-4'-(4-phenoxyphenoxy)benzophenone (2,5-DCPPB), 1.64 g (7 mmol) of CFBP, 3.93 g (6 mmol) of bis(triphenylphosphine)nickel dichloride, 3.90 g (26 mmol) of sodium iodide, 21.0 g (80 mmol) of triphenylphosphine, and 31.4 g (480 mmol) of zinc. The flask was immersed into an oil bath heated to 70 degrees C., and the content was dried under a vacuum for two hours. The inside of the flask purged several times with dry nitrogen gas, then 187 ml of N-methylpyrrolidone was added to initiate the polymerization reaction. The polymerization reaction was continued for 3 hours while controlling the reaction temperature so as not to exceed 90 degrees C. Then, 250 ml of tetrahydrofuran was added to dilute the reaction solution and insoluble matter was filtered out. The filtrate was poured into 4 L of methanol, thereby to solidify the reaction product, which was filtered and dried to obtain the target polymer 69 g of formula (30-5). Mn of the product was 13,700 by GPC (polystyrene conversion) and Mw was 43,300.

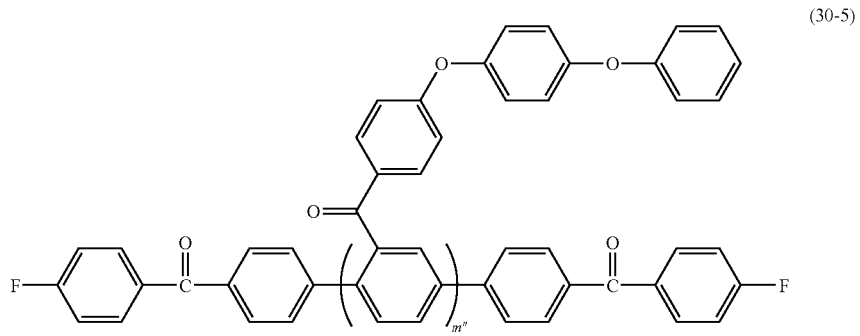

(30-5)

Into a 500 ml three-necked flask equipped with a stirrer, thermometer, Dean-Stark apparatus, reflux condenser, nitrogen inlet, and cooling pipe were weighed 65.8 g (4.8 mmol) of the polymer expressed by formula (30-5) (Mn: 13,700), 1.76 g (10.2 mmol) of 2,6-DBN, 20.2 g (60 mmol) of Bis-AF, 11.7 g (78 mmol) of potassium carbonate, 300 ml of DMAc and 150 ml of toluene. The reaction liquid was heated while stirring and refluxed for 2 hours. Water generated through the reaction and about 300 ml of toluene were removed from the Dean-Stark apparatus. The reaction solution was cooled to 50 degrees C., 15.0 g (45 mmol) of PFBP was added, and polymerization was performed for 2 hours. The reaction solution was diluted with 900 ml of DMAc, and insoluble salts were filtered out. The filtrate was poured into 7.5 L of methanol, thereby to precipitate polymer, which was filtered and dried to obtain the target copolymer 95 g of formula (30-6). Mw of the resulting copolymer was 184,000.

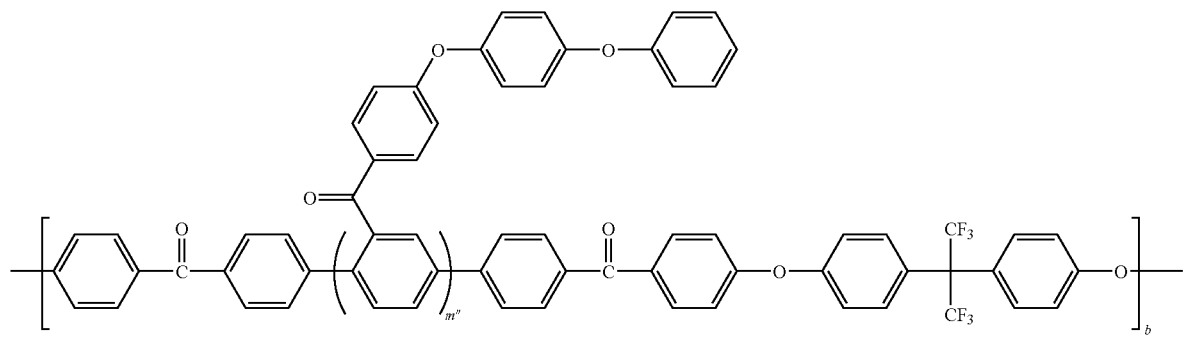

(30-6)

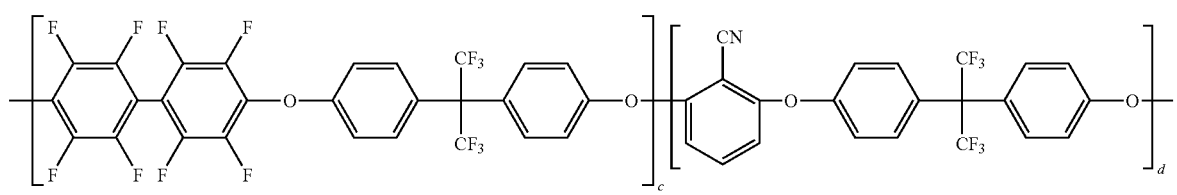

Into a 300 ml three-necked flask equipped with a stirrer, thermometer and nitrogen inlet were weighed 20 g of the resulting polymer expressed by formula (30-6) and 200 ml of concentrated sulfuric acid, the mixture was stirred at 70 degrees C. for 5 hours. The polymer was filtered and washed with distilled water until the pH of the washing water became neutral, then was dried under a vacuum to obtain the intended sulfonated polymer 23 g of formula (30-7). The Mw of the resulting copolymer was 194,000. The ion-exchange capacity of the polymer was 2.29 meq/g.

Preparation of MEA

An MEA was prepared in the same manner as Example 1, except that the solid polymer electrolyte membrane of Example 8 was employed.

Example 9

Into a 1 L flask equipped with a stirrer, thermometer and nitrogen inlet were weighed 105.4 g (300 mmol) of 2,5-

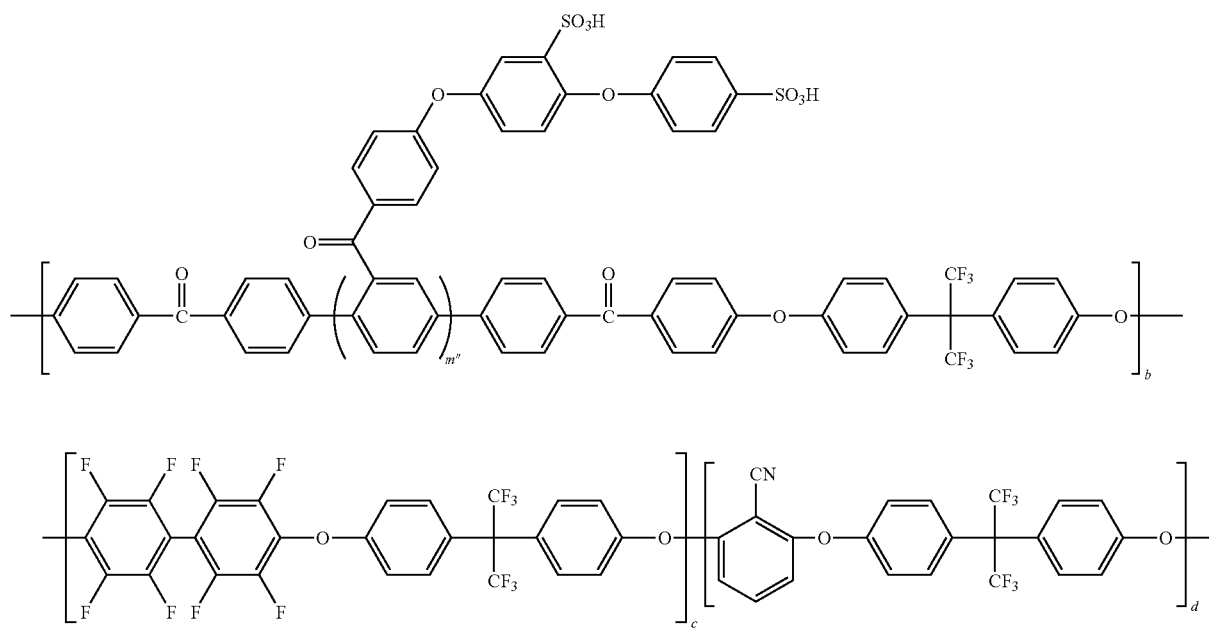

(30-7)

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 7 was employed.

Example 8

A sulfonated polymer with Mw of 173,000 was prepared by synthesizing similarly as Example 7, except that CFBP was changed into 1.09 g (7 mmol) of 2-chloro-6-fluorobenzonitrile, and 61.0 g (4.8 mmol) of the resulting copolymer (Mn: 12,700) was utilized. The ion-exchange capacity of the polymer was 2.31 meq/g.

A film 40 μm thick was prepared by a casting process after dissolving the resulting sulfonated polymer into N-methylpyrrolidone.

dichloro-4'-(tetrahydro-2-pyranyloxy)benzophenone, 2.8 g (18 mmol) of 2-chloro-6-fluorobenzonitrile, 3.93 g (6 mmol) of bis(triphenylphosphine)nickeldichloride, 1.35 g (9 mmol) of sodium iodide, 31.5 g (120 mmol) of triphenylphosphine and 47.1 g (720 mmol) of zinc, and the mixture was dried under vacuum. The inside of the flask purged with dry nitrogen gas, then 316 ml of DMAc was added to initiate the polymerization reaction. The polymerization was controlled such that the temperature of the reaction liquid was in a range of 70 to 90 degrees C. Three hours later, 1200 ml of DMAc was added to the reaction, insoluble matter was filtered out, and the filtrate of polymer solution was obtained.

A small amount of the filtrate of the polymer solution was sampled, which was poured into methanol to precipitate the polymer, then the resulting precipitate was filtered out and was dried. The Mn measured by GPC was 12,800 and Mw was 30,000 for the solid precipitate. The remainder of the filtrate of the polymer solution was poured into 6 L of methanol containing 10% by volume of concentrated HCl, thereby to precipitate. the polymer. Next, the precipitate was separated by filtration, the resulting solid was dried to thereby obtain the target polymer 80.2 g of formula (30-8).

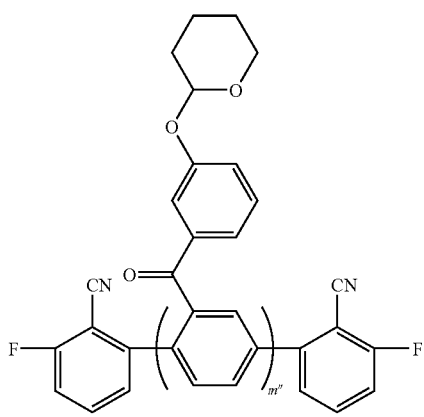

(30-8)

Into a 500 ml three-necked flask equipped with a stirrer, thermometer, Dean-Stark apparatus, reflux condenser, nitrogen inlet, and cooling pipe were weighed 69.1 g (5.4 mmol) of the polymer expressed by formula (30-8) (Mn: 12,800), 20.2 g (60 mmol) of Bis-AF, 1.65 g (9.6 mmol) of 2,6-DBN, 11.7 g (78 mmol) of potassium carbonate, 300 ml of DMAc, and 150 ml of toluene. The reaction liquid was heated while stirring and refluxed for 2 hours. Water generated through the reaction and about 300 ml of toluene were removed from the Dean-Stark apparatus. The reaction solution was cooled to 50 degrees C., 15 g (45 mmol) of PFBP was added, and polymerization was performed for 2 hours. The reaction solution was diluted with 900 ml of DMAc, and insoluble salts were filtered out. The filtrate was poured into 7.5 L of methanol, thereby to precipitate polymer, which was filtered and dried to obtain the intended copolymer 98 g of formula (30-9).

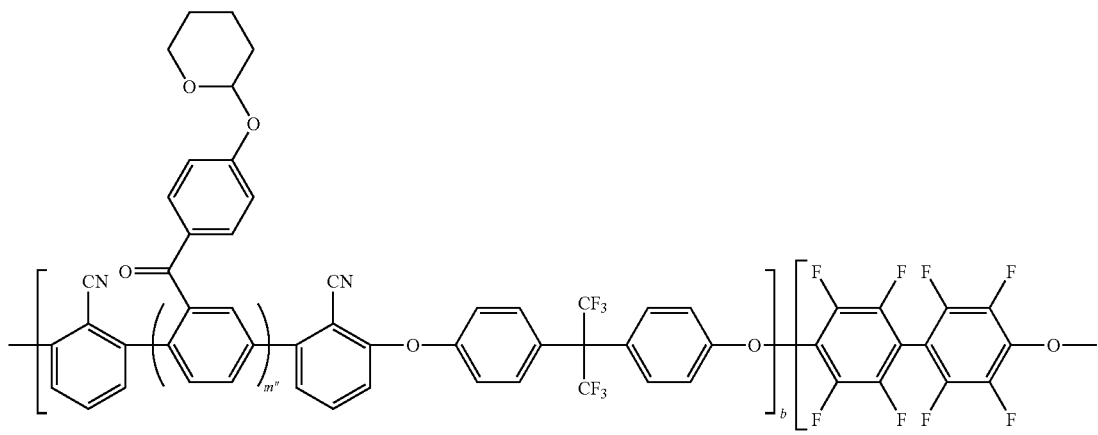

(30-9)

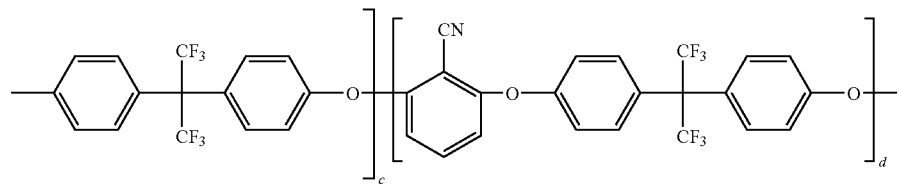

The resulting copolymer 15.2 g expressed by formula (30-9) was added to 250 ml of DMAC, which was heated to 100 degrees C. while stirring thereby to dissolve the copolymer. Then, 1.06 g (133 mmol) of lithium hydride was added to the solution, the mixture was stirred for 2 hours, then 18.1 g (133 mmol) of butane sultone was added and allowed to react for 8 hours. Then, insoluble matter in the reaction liquid was filtered, the filtrate was poured into 1N HCl thereby to precipitate a polymer. The precipitated polymer was washed with 1N HCl, followed by with distilled water until pH of the washed water came to neutral. The polymer was dried at 75 degrees C. to obtain powdery sulfonated polyarylene 18.2 g of formula (30-10). Mw of the resulting copolymer was 140,000. The ion-exchange capacity of the polymer was 1.83 meq/g.

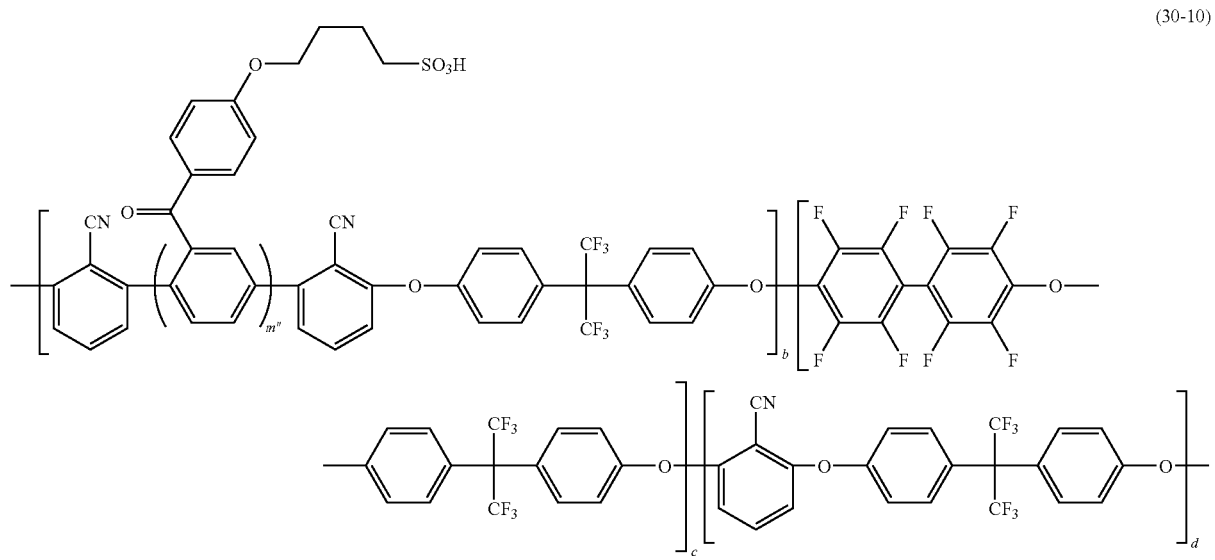

(30-10)

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 9 was employed.

Example 10

A copolymer expressed by formula (30-11) was prepared in the same manner as Example 9, except that 2,5-dichloro-4'-(tetrahydro-2-pyranyloxy)benzophenone was changed to 135.4 g (300 mmol) of 2,5-dichloro-2',4'-di(tetrahydro-2-pyranyloxy)benzophenone, and the resulting polymer (Mn: 11,200) of 47.0 g (4.2 mmol) was utilized.

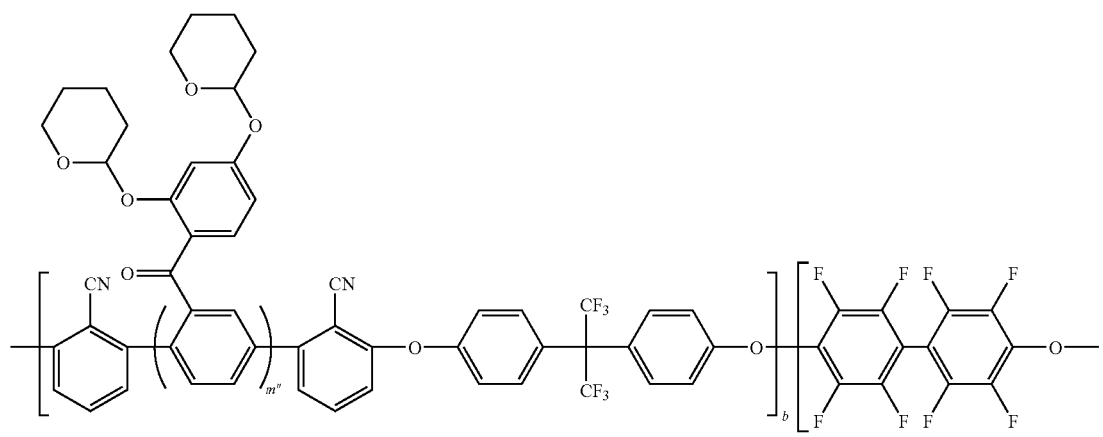

(30-11)

-continued

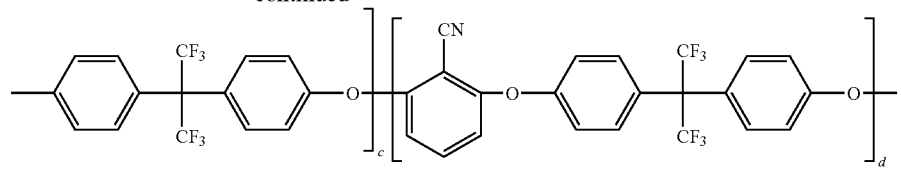

In addition, a copolymer was prepared in the same manner as Example 9, except that 15.2 g of the resulting copolymer expressed by formula (30-11), 2.16 g (266 mmol) of lithium hydride and 36.2 g (266 mmol) of butane sultone were utilized. Mw of the resulting copolymer of formula (30-12) was 135,000. Ion-exchange capacity of the polymer was 2.25 meq/g.

(30-12)

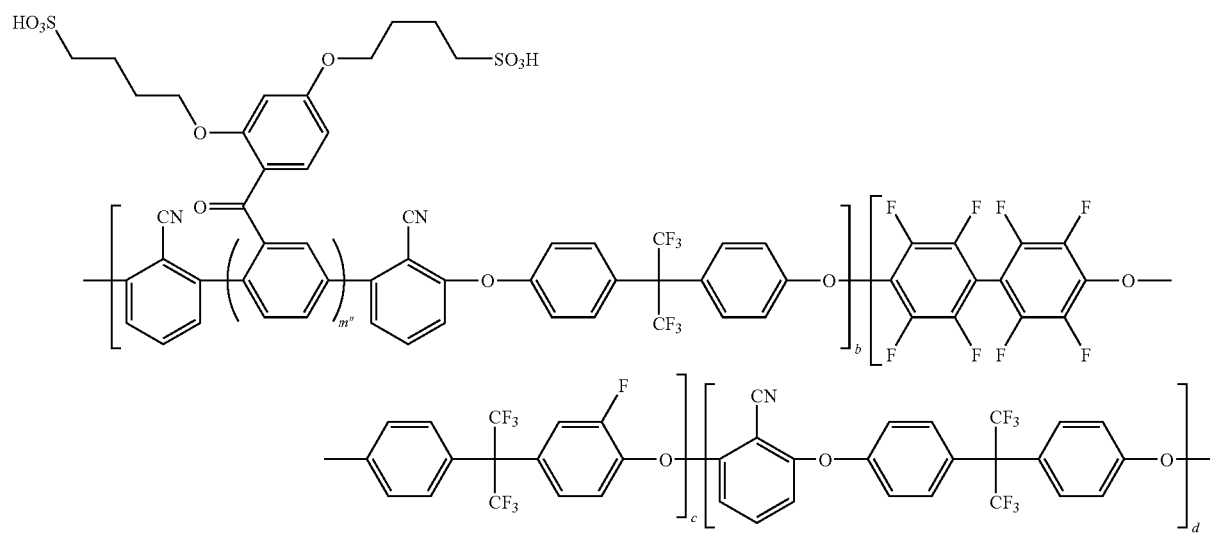

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Example 10 was employed.

Comparative Example 1

A sulfonated polymer with Mw of 138,000 was prepared in the same manner as Example 1, except that 93.0 g (7.5 mmol) of the polymer expressed by formula (30-1), 9.0 g (52.2 mmol) of 2,6-DBN, 20.2 g (60 mmol) of Bis-AF, 0.1 g (0.3 mmol) of PFBP and 1.8 g (827 mmol) of lithium bromide were used. The ion-exchange capacity of the polymer was 2.68 meq/g.

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Comparative Example 1 was employed.

Comparative Example 2

A sulfonated polymer with Mw of 183,000 was prepared in the same manner as Example 7, except that 90.4 g (6.6 mmol) of the polymer expressed by formula (30-5), 9.1 g (53.1 mmol) of 2,6-DBN, 20.2 g (60 mmol) of Bis-AF and 0.1 g (0.3 mmol) of PFBP were utilized. The ion-exchange capacity of the polymer was 2.65 meq/g.

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Comparative Example 2 was employed.

Comparative Example 3

A sulfonated polymer with Mw of 143,000 was prepared in the same manner as Example 9, except that 115.2 g (9 mmol)

of the polymer expressed by formula (30-8), 8.72 g (5.1 mmol) of 2,6-DBN, and 0.1 g (0.3 mmol) of PFBP were used. The ion-exchange capacity of the polymer was 2.25 meq/g.

A film 40 μm thick was prepared by a casting process after dissolving the resulting sulfonated polymer into N-methylpyrrolidone.

Preparation of MEA

An MEA was prepared in the same manner as Example 1, except that the solid polymer electrolyte membrane of Comparative Example 3 was employed.

Result of Evaluation

Table 1 shows the various properties of MEAs prepared from sulfonated polymers each synthesized in Examples 1 to 10 and Comparative Examples 1 to 3.

TABLE 1

|  | Polymer Properties | | | Mechanical Properties | | | | Proton Conductivity (S/cm) | Hot Water Resistance Weight Retention (%) | Fenton Reagent Resistance Weight Retention (%) | Power Generating Performance (V) | Power Generating Durability | |
|---|---|---|---|---|---|---|---|---|---|---|---|---|---|
|  | Weight Average Molecular Weight | Ion-Exchange Capacity | Fluorine Content (wt %) | Breaking Strength (Mpa) | Elongation (%) | Elastic Modulus (Gpa) | Bendability and Crack Proofing |  |  |  |  | OCV | 1 A/cm2 |
| Ex. 1 | 135,000 | 2.32 | 13.5 | 120 | 38 | 4.1 | satisfactory | 0.32 | 100 | 100 | 0.659 | satisfactory | satisfactory |
| Ex. 2 | 155,000 | 2.29 | 13.8 | 124 | 40 | 4.2 | satisfactory | 0.31 | 99 | 100 | 0.660 | satisfactory | satisfactory |
| Ex. 3 | 128,000 | 2.30 | 12.8 | 134 | 36 | 3.9 | satisfactory | 0.34 | 100 | 100 | 0.654 | satisfactory | satisfactory |
| Ex. 4 | 135,000 | 2.28 | 14.3 | 142 | 41 | 3.8 | satisfactory | 0.30 | 100 | 100 | 0.655 | satisfactory | satisfactory |
| Ex. 5 | 145,000 | 2.28 | 15.7 | 130 | 37 | 4.0 | satisfactory | 0.31 | 99 | 100 | 0.657 | satisfactory | satisfactory |
| Ex. 6 | 152,000 | 2.27 | 14.1 | 136 | 35 | 3.9 | satisfactory | 0.29 | 99 | 100 | 0.659 | satisfactory | satisfactory |
| Ex. 7 | 194,000 | 2.29 | 13.5 | 110 | 50 | 3.2 | satisfactory | 0.31 | 98 | 100 | 0.662 | satisfactory | satisfactory |
| Ex. 8 | 173,000 | 2.23 | 14.3 | 105 | 52 | 2.9 | satisfactory | 0.28 | 98 | 100 | 0.658 | satisfactory | satisfactory |
| Ex. 9 | 140,000 | 1.83 | 13.0 | 103 | 29 | 2.9 | satisfactory | 0.21 | 99 | 100 | 0.647 | satisfactory | satisfactory |
| Ex. 10 | 135,000 | 2.25 | 15.6 | 101 | 32 | 2.8 | satisfactory | 0.27 | 99 | 100 | 0.650 | satisfactory | satisfactory |
| Com. Ex. 1 | 138,000 | 2.68 | 9.9 | 115 | 34 | 4.0 | satisfactory | 0.30 | 97 | 73 | 0.663 | satisfactory | unsatisfactory |
| Com. Ex. 2 | 183,000 | 2.65 | 9.3 | 105 | 49 | 2.8 | satisfactory | 0.28 | 95 | 65 | 0.665 | satisfactory | unsatisfactory |
| Com. Ex. 3 | 143,000 | 2.25 | 7.9 | 98 | 28 | 2.7 | satisfactory | 0.24 | 96 | 55 | 0.650 | satisfactory | unsatisfactory |

The results shown in Table 1 demonstrate definitely that polyarylene copolymers, with a fluorine atom and nitrile group introduced in their principal chains, may improve hot water resistance and chemical stability of solid polymer electrolyte membranes, which may lead to MEAs having superior power generating performance and high-temperature durability.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A membrane-electrode assembly, utilized for solid polymer electrolyte fuel cells, comprising: an anode electrode; a cathode electrode; and a solid polymer electrolyte membrane, the anode electrode and the cathode electrode disposed on opposite sides of the solid polymer electrolyte membrane, wherein the solid polymer electrolyte membrane contains an aromatic polymer which includes a constitutional unit expressed by formula (1) below, a constitutional unit expressed by formula (2-1) or (2-2) below and a constitutional unit expressed by formula (3) below,

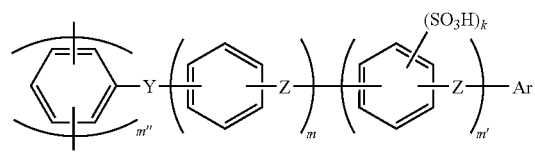
(1)

in the formula (1), Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—;

Z represents independently a single bond, or at least a group selected from the group consisting of —O—, —S—, —(CH$_2$)$_j$— (j is an integer of 1 to 10) and —C(CH$_3$)$_2$—;

Ar represents an aromatic group having a substituent expressed by —SO$_3$H, —O—(CR$_2$)$_e$SO$_3$H or —S—(CR$_2$)$_e$SO$_3$H, in which R is an atom or a group selected independently from the group consisting of a hydrogen atom, fluorine atom, alkyl group and partly or fully halogenated alkyl group; e is an integer of 1 to 20; m is an integer of 0 to 10; m' is an integer of 0 to 10; m" is an integer of 1 to 100; and k is an integer of 1 to 4;

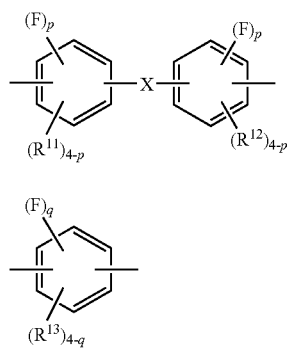

in the formulas (2-1) and (2-2), X represents a divalent group or a single bond; R$^{11}$ to R$^{13}$ represent independently of each other a hydrogen atom or alkyl group; p is an integer of 1 to 4; and q is an integer of 1 to 4;

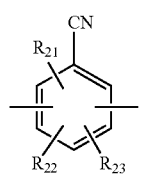

in the formula (3), R$^{21}$ to R$^{23}$ represent independently of each other at least an atom or a group selected from the group consisting of a hydrogen atom, fluorine atom, alkyl group, partly or fully halogenated alkyl group, allyl group, aryl group and nitrile group.

2. The membrane-electrode assembly utilized for solid polymer electrolyte fuel cells according to claim 1, wherein the aromatic polymer further includes a constitutional unit expressed by formula (4-1) or (4-2) below;

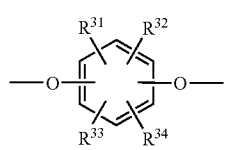

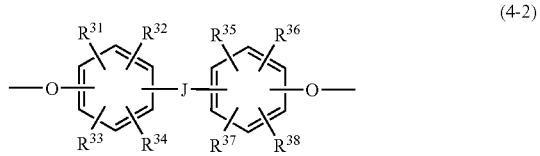

in the formulas (4-1) and (4-2), R$^{31}$ to R$^{38}$ represent independently of each other at least an atom or a group selected from the group consisting of a hydrogen atom, fluorine atom, alkyl group, partly or fully halogenated alkyl group, allyl group and aryl group, J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

3. The membrane-electrode assembly utilized for solid polymer electrolyte fuel cells according to claim 1, wherein the aromatic polymer includes 30 to 70 mole % of a constitutional unit expressed by the formula (1), 10 to 30 mole % of a constitutional unit expressed by the formula (2-1) or (2-2) and 5 to 30 mole % of a constitutional unit expressed by the formula (3).

4. The membrane-electrode assembly utilized for solid polymer electrolyte fuel cells according to claim 1, wherein the solid polymer electrode membrane contains 0.5 to 3.0 meq/g of sulfonic acid group.

5. The membrane-electrode assembly utilized for solid polymer electrolyte fuel cells according to claim 1, wherein the solid polymer electrode membrane contains 6 mass % or more of fluorine atom.

6. A method for producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, comprising the steps of:

reacting a compound expressed by formula (5-1) or (5-2), a compound expressed by formula (6-1) or (6-2), a compound expressed by formula (7), and a compound expressed by formula (8-1) or (8-2) to prepare an aromatic polymer;

forming the solid polymer electrolyte membrane by use of the aromatic polymer; and forming an anode electrode and a cathode electrode on the solid polymer electrolyte membrane;

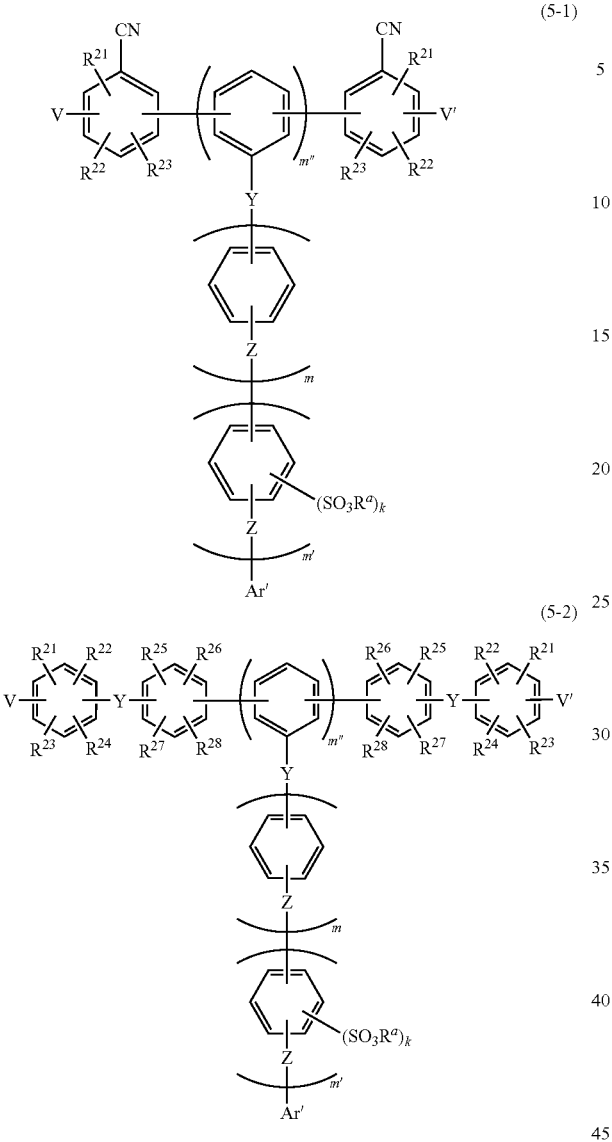

(5-1)

(5-2)

in the formulas (5-1) and (5-2), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group;

Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—;

Z represents independently a single bond, or at least a group selected from the group consisting of —O—, —S—, —(CH$_2$)$_j$— (j is an integer of 1 to 10) and —C(CH$_3$)$_2$—;

m is an integer of 0 to 10; m' is an integer of 0 to 10; m''' is an integer of 1 to 100; and k is an integer of 1 to 4;

$R^a$ represents a hydrocarbon group having carbon atoms of 1 to 20, a hydrogen atom or alkaline metal atom;

Ar' represents an aromatic group having a substituent expressed by —SO$_3$R$^b$, —O—(CR$_2$)$_e$SO$_3$R$^b$ or —S—(CR$_2$)$_e$SO$_3$R , in which R$^b$ represents a hydrocarbon group having carbon atoms of 1 to 20, a hydrogen atom or alkaline metal atom, and R represents an atom or a group selected independently from the group consisting of a hydrogen atom, fluorine atom, alkyl group, and partly or fully halogenated alkyl group;

e is an integer of 1 to 20; and

V and V' represent independently of each other fluorine or chlorine atom;

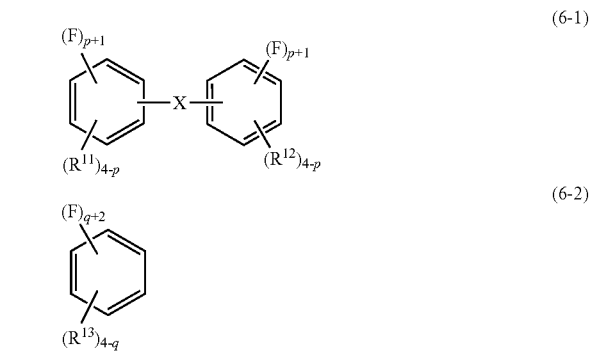

(6-1)

(6-2)

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

(7)

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other fluorine or chlorine atom;

(8-1)

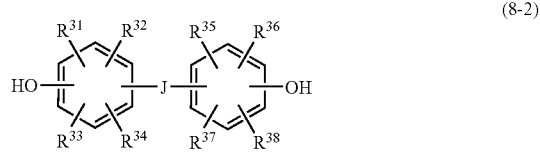

(8-2)

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

7. A method for producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, comprising the steps of:

reacting a compound expressed by formula (5-3) or (5-4), a compound expressed by formula (6-1) or (6-2), a compound expressed by formula (7) and a compound expressed by formula (8-1) or (8-2) to prepare an aromatic polymer;

sulfonating the aromatic polymer;

forming the solid polymer electrolyte membrane by use of the sulfonated aromatic polymer; and forming an anode electrode and a cathode electrode on the solid polymer electrolyte membrane;

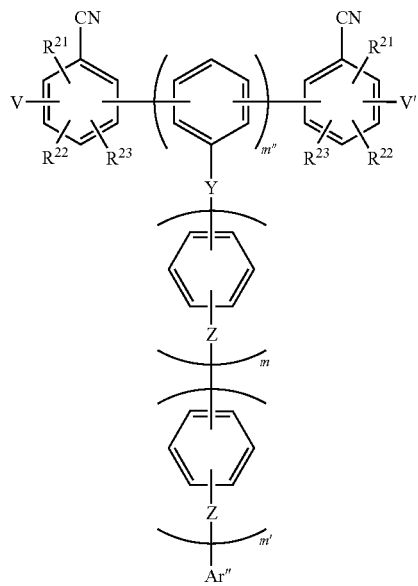

(5-3)

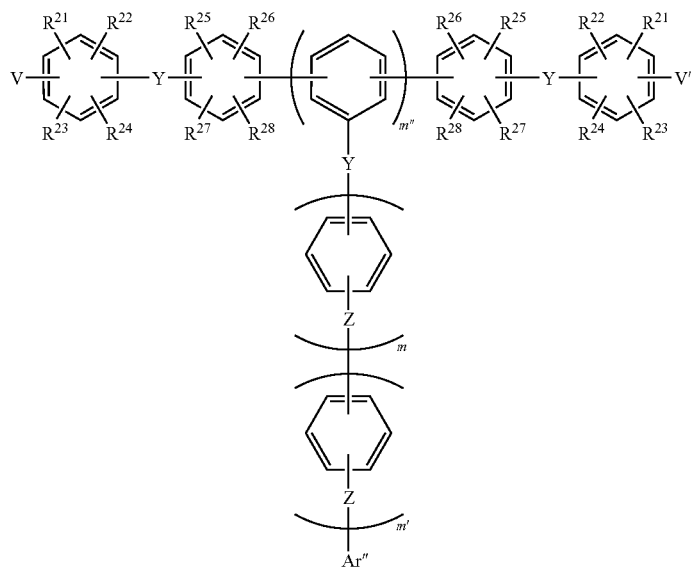

(5-4)

in the formulas (5-3) and (5-4), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group;

Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—;

Z represents independently a single bond, or at least a group selected from the group consisting of —O—, —S—, —(CH$_2$)$_j$— (j is an integer of 1 to 10) and —C(CH$_3$)$_2$—;

m is an integer of 0 to 10; m' is an integer of 0 to 10; m" is an integer of 1 to 100;

Ar" represents an aromatic group having no substituent; and

V and V' represent independently of each other fluorine or chlorine atom;

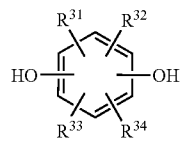

(6-1)

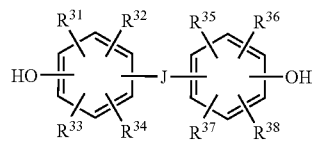

(6-2)

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

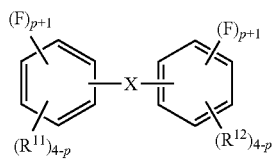

(7)

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other fluorine or chlorine atom;

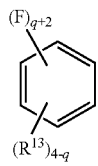

(8-1)

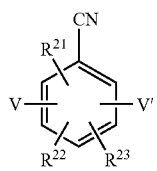

(8-2)

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—.

8. A method for producing a membrane-electrode assembly utilized for solid polymer electrolyte fuel cells, having an anode electrode, a cathode electrode and a solid polymer electrolyte membrane, the anode electrode and the cathode electrode disposed on opposite sides of the solid polymer electrolyte membrane, comprising the steps of:

reacting a compound expressed by formula (5-5) or (5-6), a compound expressed by formula (6-1) or (6-2), a compound expressed by formula (7), and a compound expressed by formula (8-1) or (8-2) to prepare an aromatic polymer having a functional group;

reacting secondarily the aromatic polymer having a functional group with a compound expressed by the formula (9-1) or (9-2);

forming the solid polymer electrolyte membrane by use of the sulfonated aromatic compound; and forming an anode electrode and a cathode electrode on the solid polymer electrolyte membrane;

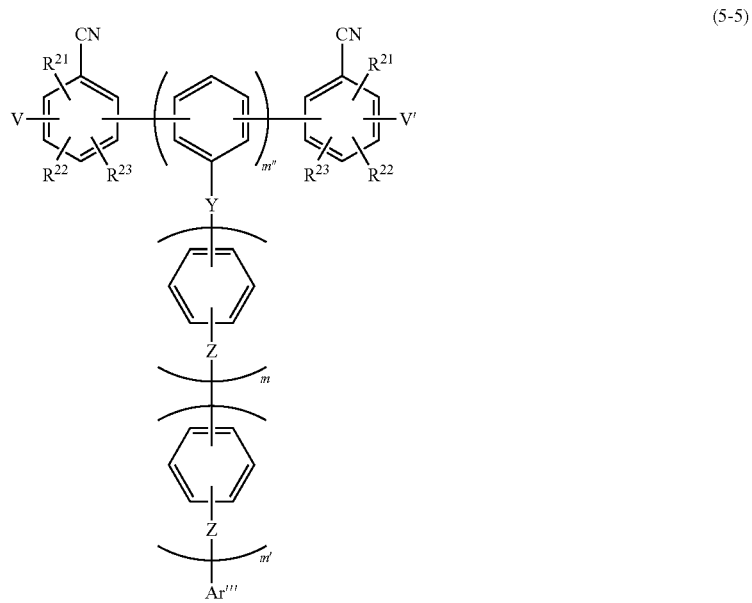

(5-5)

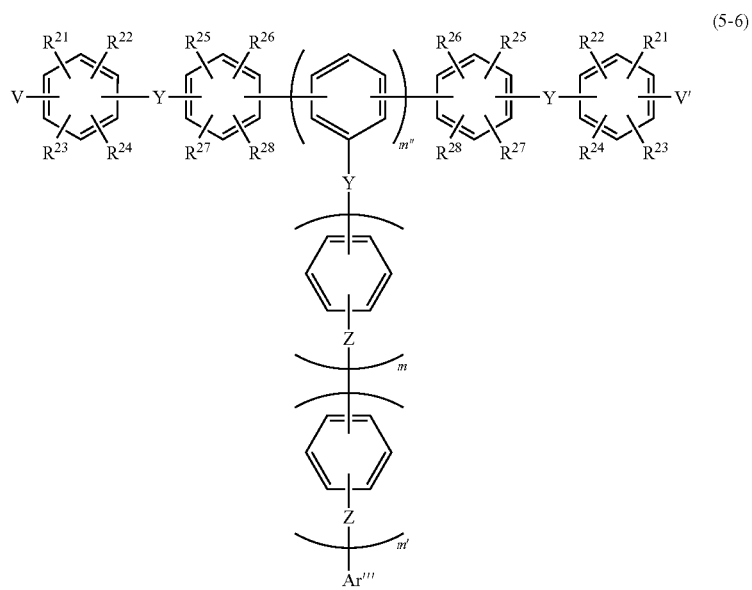

(5-6)

in the formulas (5-5) and (5-6), $R^{21}$ to $R^{28}$ represent independently of each other at least an atom or a group selected from the group consisting of a hydrogen atom, fluorine atom, alkyl group, partly or fully halogenated alkyl group, allyl group, aryl group and nitrile group;

Y represents at least a group selected from the group consisting of —CO—, —SO$_2$—, —SO—, —CONH—, —COO—, —(CF$_2$)$_i$— (i is an integer of 1 to 10) and —C(CF$_3$)$_2$—;

Z represents independently a single bond, or at least a group selected from the group consisting of —O—, —S—, —(CH$_2$)$_j$— (j is an integer of 1 to 10) and —C(CH$_3$)$_2$—;

m is an integer of 0 to 10; m' is an integer of 0 to 10; m" is an integer of 1 to 100;

Ar''' represents an aromatic group having a substituent expressed by —OM or —SM;

M represents a hydrogen atom or alkaline metal atom; and

V and V' represent independently of each other fluorine or chlorine atom;

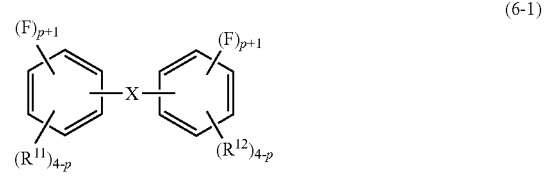

(6-1)

-continued

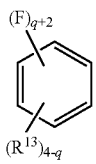
(6-2)

in the formulas (6-1) and (6-2), X represents a divalent group or a single bond; $R^{11}$ to $R^{13}$ represent independently of each other a hydrogen atom or alkyl group; p is an integer of 1 to 4; and q is an integer of 1 to 4;

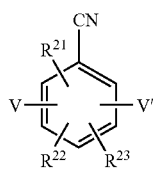
(7)

in the formula (7), $R^{21}$ to $R^{23}$ represent independently of each other at least an atom or a group selected from the group consisting of a hydrogen atom, fluorine atom, alkyl group, partly or fully halogenated alkyl group, allyl group, aryl group and nitrile group; and V and V' represent independently of each other fluorine or chlorine atom;

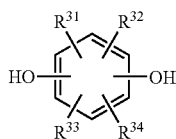
(8-1)

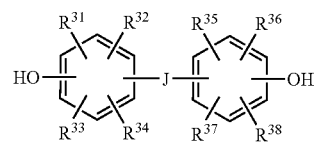
(8-2)

in the formulas (8-1) and (8-2), $R^{31}$ to $R^{38}$ represent independently of each other at least an atom or a group selected from the group consisting of a hydrogen atom, fluorine atom, alkyl group, partly or fully halogenated alkyl group, allyl group and aryl group; and J represents at least a group selected from the group consisting of an alkylene group, fluorine-substituted alkylene group, aryl-substituted alkylene group, alkenylene group, alkynylene group, arylene group, fluorenylidene group, —O—, —S—, —CO—, —CONH—, —COO—, —SO— and —SO$_2$—;

(9-1)

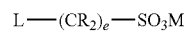
(9-2)

$L-(CR_2)_e-SO_3M$ in the formulas (9-1) and (9-2), R represents independently at least an atom or a group selected from the group consisting of a hydrogen atom, fluorine atom, alkyl group and partly or fully halogenated alkyl group; e is an integer of 1 to 20; and L represents a chlorine, bromine, or iodine atom; and M represents a hydrogen atom or alkaline metal atom.

\* \* \* \* \*